United States Patent [19]
Marik

[11] Patent Number: 5,903,718
[45] Date of Patent: May 11, 1999

[54] REMOTE PROGRAM MONITOR METHOD AND SYSTEM USING A SYSTEM-UNDER-TEST MICROCONTROLLER FOR SELF-DEBUG

[75] Inventor: Mark Douglas Marik, Charlotte, N.C.

[73] Assignee: International Business Machines Corporation, Armonk, N.Y.

[21] Appl. No.: 08/714,729

[22] Filed: Sep. 16, 1996

[51] Int. Cl.$^6$ .................................................. G06F 11/00
[52] U.S. Cl. ......................................................... 395/183.14
[58] Field of Search ......................... 395/183.01, 183.03, 395/183.04, 183.05, 183.06, 183.14, 568, 704

[56] References Cited

U.S. PATENT DOCUMENTS

| | | | |
|---|---|---|---|
| 5,157,782 | 10/1992 | Tuttle et al. | 371/67.1 |
| 5,375,228 | 12/1994 | Leary et al. | 395/183.04 |
| 5,528,661 | 6/1996 | Siu et al. | 379/27 |
| 5,590,273 | 12/1996 | Balbinot | 395/182.01 |
| 5,590,354 | 12/1996 | Klapproth et al. | 395/183.06 |

*Primary Examiner*—Albert DeCady
*Attorney, Agent, or Firm*—A. Peter Tennent; Brian F. Russell; Andrew J. Dillon

[57] ABSTRACT

A remote program monitor method and system using a system-under-test microcontroller for self-debug comprises a system-under-test (SUT) that includes a read-only memory (ROM) and a microcontroller for executing a program under test. The microcontroller has an interrupt input, wherein one or more enable debugger signals received at the interrupt input causes the microcontroller to execute a debugger program contained in the ROM. The SUT is connected with a host computer over a standard serial connection. When the SUT receives one or more debugger signals as an interrupt input, the signal causes the microcontroller to execute a debugger program contained in the ROM.

27 Claims, 31 Drawing Sheets

DEBUG PARAMETER TABLE

| Target System Program Counter | Boolean flags | | | | No. of addr pairs | XRAM begin addr | XRAM end addr | XRAM begin addr | XRAM end addr | XRAM begin addr | XRAM end addr | XRAM begin addr | XRAM end addr | |
|---|---|---|---|---|---|---|---|---|---|---|---|---|---|---|
| | T | B | S | R | | | | | | | | | | |
| pc1 | t | b | s | r | N1 | ba-11 | ea-11 | ba-12 | ea-12 | | | ba-1N | ea-1N | record 1 |
| pc2 | t | b | s | r | N2 | ba-21 | ea-21 | ba-22 | ea-22 | ba-2N | ea-2N | | | record 2 |
| pc3 | t | b | s | r | 1 | ba-31 | ea-31 | | | | | | | record 3 |
| pcn | t | b | s | r | Nn | ba-n1 | ea-n1 | ba-n2 | ea-n2 | | | ba-nN | ea-nN | record n |
| 0000 | Table Terminator | | | | | | | | | | | | | |

*Fig. 2*

REMOTE PROGRAM MONITOR METHOD AND SYSTEM USING A SYSTEM-UNDER-TEST MICROCONTROLLER FOR SELF-DEBUG

BACKGROUND OF THE INVENTION

1. Technical Field

The present invention relates in general to techniques for correcting or "debugging" computer software code and, in particular, to a source-level run-time software code debugging instrument using a built-in software debugger that is transparent to and co-resident with a target system code.

2. Description of the Related Art

A program monitor is intrusive software code located in target memory to debug computer programs. The program monitor operates in conjunction with and monitors the operation of a main computer program that controls the functions of a microcontroller-based target circuit. The program monitor code is intrusive in that it is linked to the main program code, both of which are either downloaded into memory sites provided in the target circuit or stored in a read only memory (ROM) used by the programmer. The use of a monitor program requires that a universal asynchronous receiver-transmitter or other communication hardware be provided in the target circuit so that the monitor can communicate apart from the main program to the programmer.

The use of program monitors is advantageous because they are relatively inexpensive and find the majority of errors or "bugs" located in the main program. One drawback of program monitors is that they require the use of resources in the target circuit and typically are ineffective in detecting more difficult problems present in the associated program code.

The in-circuit emulator has become a standard tool for debugging microcontrollers and microprocessors. A variety of emulators are available often consisting of an adapter board which plugs directly into an IBM PC/XT/AT bus with cable attachment to a pod containing a "bond-out" microcontroller. The "bond-out" microcontroller in the pod plugs directly into the target system in lieu of the target system's microcontroller. A PC debugger software application program is then invoked to display and manipulate the target system's registers, to start and stop traces, and to set and reset breakpoints at specific program addresses or at specific reads or writes to data addresses.

Besides the burden of considerable expense of the emulator adapter board and pod unit, valuable slot space within the PC is used. To get around PC slot usage, emulator manufacturers offer a stand-alone emulator called an Expansion Box, allowing the emulator to operate outside the PC. The Expansion Box has its own power supply and is either serial, parallel or modem attached to the PC. Examples of emulator manufacturers include Nohau Corporation (EMUL51-PC emulator), and Intel Corporation (ICE-51 emulator).

One type of debugger function, single stepping, is described by Intel's Microcontroller User Manual, 1982, page 6–28, section 6.8.3, "How to Single-Step the 8051". This article specifies that one of the external interrupts be level activated and held normally low. It further describes how an external interrupt routine can be made to execute following each instruction of the target system by toggling the external interrupt input pin high and low with a push button switch. The article does not however, describe a software debug tool. Instead, it describes a hardware technique of examining the 8031 port 0 and port 2 address and data lines in conjunction with single stepping the code with the push button.

As will be appreciated, one major drawback of emulation in the prior art is that emulators are relatively expensive, thereby making them inaccessible to a significant percentage of the growing number of software engineers participating in microcontroller-based circuit design tasks. Besides the considerable expense of emulator adaptor boards and pod units, valuable slot space within in the PC is used to accommodate such debugging techniques. Further, prior art techniques involve complicated hardware manipulations and analyzation to perform the debugging procedure. What is needed is a debugging method and system that performs the emulator debugging functions on an off-the-shelf microcontroller in place in the system under test without the need for in-circuit emulator technology, additional microcontroller on-board circuitry, or a supporting microcontroller designed into the system under test.

SUMMARY OF THE INVENTION

According to the present invention, a remote program monitor method and system using a system-under-test microcontroller for self-debug comprises a system-under-test (SUT) that includes a read-only memory (ROM) and a microcontroller for executing a program under test. The microcontroller has an interrupt input, wherein one or more enable debugger signals received at the interrupt input causes the microcontroller to execute a debugger program contained in the ROM. The SUT is connected with a host computer over a standard serial connection for bidirectional debug information transmission. When the SUT receives one or more debugger signals as an interrupt input, the signal causes the microcontroller to execute a debugger program contained in the ROM. The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

FIG. 2 is a Data Structure diagram depicting the Debug Parameter Table.

DETAILED DESCRIPTION OF THE PREFERRED EMBODIMENT

Figure 1:
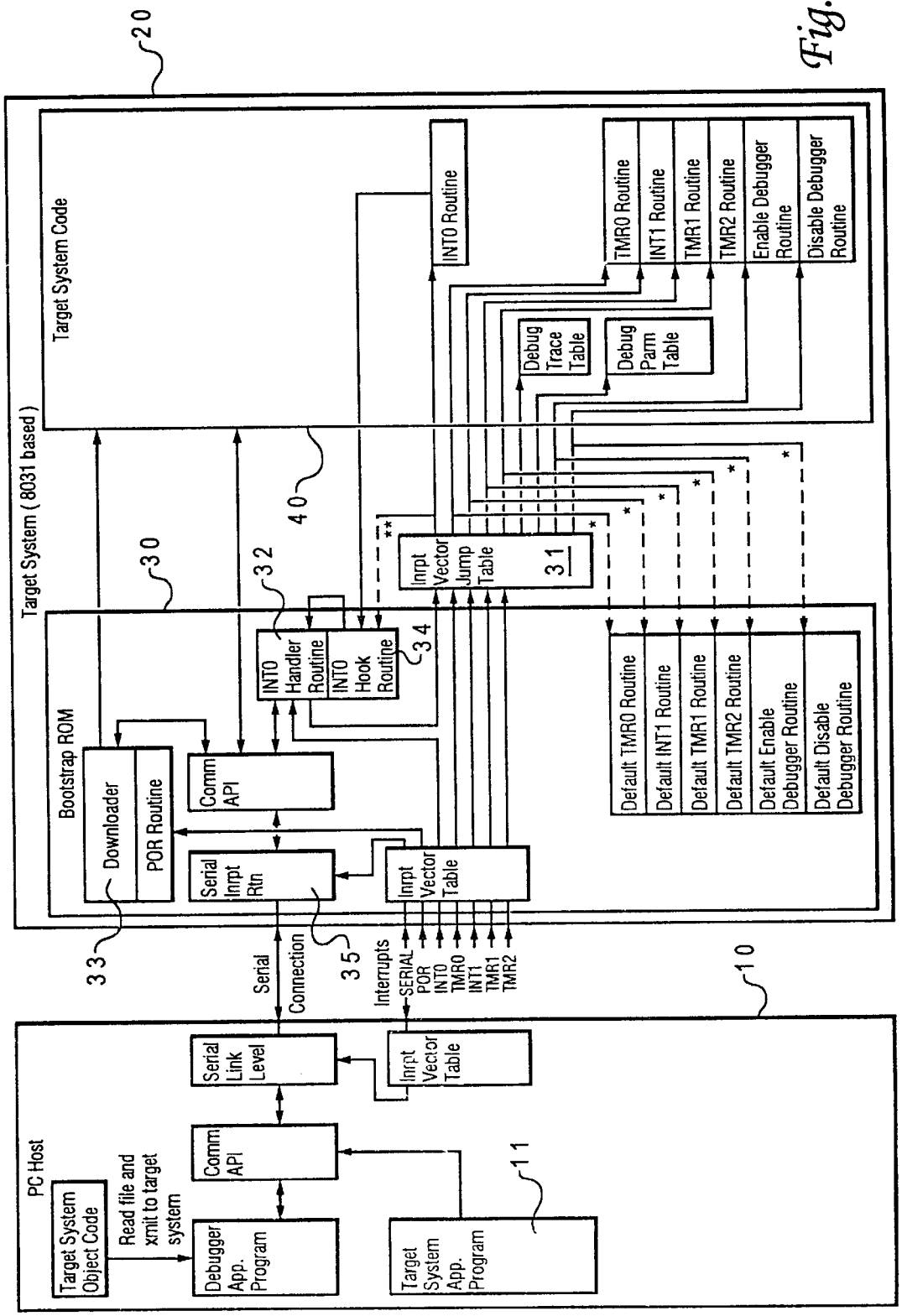
FIG. 1 is a high level block diagram of the software components of the invention.

The 8031 microcontroller, a term generically used to include its variations: the 8032, 8051, 8052, 8751, and 8752, is widely used in all types of hardware mechanism control applications. The 8031 microcontroller software is often debugged using a debug tool known as an in-circuit emulator. The Debug Tool of a preferred embodiment of the present invention is a 8031 debug tool with emulator types of functions which needs only a minicomputer, such as a PC, running a user-interactive PC Host Debugger Application program and a serial cable attaching the standard communication port of a PC to the 8031 based target system. Prior art emulators are extravagant and expensive hardware tools for most prototype debug applications and are often very awkward or impractical to insert into a product's microcontroller socket in a customer environment to debug a field problem. The present invention contains built-in 8031 software used to debug 8031 based systems without the need for an in-circuit emulator and its associated hardware. A developer can actually use the target system to debug itself with the present invention target system bootstrap ROM code and Host Debugger Application program. The Host Debugger Application program can multitask with any Host Target System Application program that interfaces to the target system's code through the serial link connection. The present invention software is transparent to and co-resident with 8031 target system code. The present invention requires no additional minicomputer hardware adapter to operate and runs with all manufacturers' 8031 microcontrollers.

Therefore, an object of the present invention is to provide a method and system of debugging 8031 based systems using a PC Host with a standard serial port and without installing a PC emulator adapter and without purchasing an Expansion Box.

Another object of the present invention is to provide a method and system of downloading the 8031 target system code from the PC Host serial port to the target system's external program memory using the 8031's onboard UART.

A further object of the present invention is to provide a method and system of debugging 8031 based systems in the customer environment without attaching an emulator pod to the product's microcontroller socket in lieu of the product's microcontroller.

Another object of the present invention is to provide a method and system of debugging 8031 based systems using a PC Host with a standard serial port running a Debug Application Program and using the target system microcontroller itself as part of the debugging means, without the use of an emulator pod with a bond-out chip.

A further object of the present invention is to provide a method and system having debugger microcode in ROM that shares the 8031 Serial and INT0 interrupts with the target system code.

Another object of the present invention is to provide a method and system having debugger microcode in ROM that is co-resident and transparent to the target system code.

A further object of the present invention is to provide a method and system having debugger microcode in ROM that provides a unique serial communication link protocol to the PC host that supports 2 communication channels simultaneously. A field called a "debug switch" within a D-packet indicates whether a given D-packet is owned by the debugger or the target system code.

Another object of the present invention is to provide a method and system having debugger microcode in ROM that provides a serial communication application program interface, or API, that supports functions: Put Debug D-packet, Get Debug D-packet, Query Transmitter Busy, and Query Debug D-packet Available, for the debugger code.

A further object of the present invention is to provide a method and system having debugger microcode in ROM that provides a serial communication application program interface, or API, that supports functions: Put Target System D-packet, Get Target System D-packet, Query Transmitter Busy, and Query Target System D-packet Available, for the target system code.

Another object of the present invention is to provide a method and system having debugger microcode in ROM that provides a serial communication application program interface, or API, that supports functions: Query Write Debug D-packet Allowed, Write Debug D-packet, Query Read D-packet Available, Read D-packet, Query Write Target System D-packet Allowed, and Write Target System D-packet, for the serial link interrupt handler code.

A further object of the present invention is to provide a method and system having debugger microcode in ROM that provides an Interrupt Vector Jump Table in external RAM that can be used to "chain" to, "hook" to, or replace existing interrupt vectors.

Another object of the present invention is to provide a method and system having debugger microcode in ROM that provides a jump instruction in the Interrupt Vector Jump Table for use by the target system code to hook into the existing INT0 interrupt debugger routine.

A further object of the present invention is to provide a method and system having debugger microcode in ROM that provides an INT0 interrupt service precursive routine that is non-interruptable and can be neither "chained" to nor replaced. This INT0 precursive routine is always the first routine to execute at the time of an INT0 interrupt and is responsible for calling the INT0 hook vector provided in the Interrupt Vector Jump Table.

Another object of the present invention is to provide a method and system having debugger microcode in ROM that provides an INT0 interrupt service precursive routine which is re-entrant and that:
(1) gets control immediately following the INT0 interrupt.
(2) can simulate a 3 level interrupt priority scheme on a 2 level interrupt priority microcontroller.
(3) can branch to the present invention debugger routine in order to debug a target system's INT0 routine already in progress.
(4) can Query for, Put, or Get the present invention Debugger D-packets via the Communications API.

A further object of the present invention is to provide a method and system of the most commonly used In-circuit emulator types of operations including:
a. Tracing
   1) Setting tracepoints in the target system 8031 software
   2) Selectively enabling and disabling these tracepoints from the PC Host Debug Application program.
   3) When a tracepoint is encountered within the target system code that is enabled, a trace record is constructed and appended to the trace table. When a tracepoint is encountered that is disabled, and single stepping is also disabled, trace activity stops.
   4) A trace record which consists of:
      a) Length field
      b) Forward chain pointer
      c) Backward chain pointer
      d) Registers at the time of interrupt
      e) Program Counter at the time of interrupt
      f) Next program instruction to be executed
      g) Internal RAM
      h) A number of external RAM contiguous areas
b. Breaking
   1) Setting breakpoints in the target system 8031 software.
   2) Selectively enabling and disabling breakpoints from the PC Host Debug Application.
   3) When an enabled breakpoint is encountered, a trace record is built and appended to the existing trace table and the entire trace table is transmitted to the PC Host Debug Application. The PC Host displays this information to the developer. The breakpoint routine awaits a message from the PC Host through the communication API for an indication to resume execution of the target system code.
   4) When a disabled breakpoint is encountered, and single stepping is also disabled, no status to the PC host is transmitted.
c. Single Stepping
   1) Setting steppoints in the target system 8031 software
   2) Selectively enabling and disabling steppoints from the PC Host Debug Application program.
   3) When an enabled steppoint is encountered, a trace record is built and appended to the existing trace table. If break is not also enabled, the trace record is subsequently transferred to the PC Host using the communication API. If break is enabled when an enabled steppoint is encountered, the entire trace table is transmitted to the PC Host. The PC Host displays this information to the developer. The steppoint routine waits for a message from the PC Host through the communication API for an indication to resume execution of the target system code. The steppoint differs from a breakpoint in that it affects each subsequent instruction executed in the target system code until a disabled steppoint is encountered.
   4) When a disabled steppoint is encountered at a debugpoint which also does not have an enabled breakpoint, no status to the PC Host is transmitted.
d. A method of activating the present invention debug features: tracing, breaking, and single stepping, within the target system by using one of the target system's external interrupts running in level-activated mode. At the designer's discretion, this external interrupt can be used exclusively for the present invention debug interrupt routine or shared between the target system hardware and the present invention using minimal hardware logic in the target system at the external interrupt pin. In the preferred embodiment, INT0 is used. However, INT1 may also be used.
e. A method of selectively enabling and disabling the present invention debug features: tracing, breaking, and single stepping, by downloading a Debug Parameter Table to the target system. An "escape" or interrupt from the target system code to the INT0 interrupt handler debug routine is referred to as a "debugpoint". The Debug Parameter Table contains a record for each specified debugpoint in the target system. Each record consists of:
   1) A program memory address which is compared to the target system program counter at the time the debugpoint occurs. If a match occurs, the debugpoint takes action based upon the contents of the remainder of this record.
   2) A boolean flag for tracing
      "1"=enabled
      "0"=disabled
   3) A boolean flag for breaking
      "1"=enabled
      "0"=disabled 4) A boolean flag for single stepping
   "1"=enabled
   "0"=disabled
5) A boolean flag for internal RAM size tracing
   "1"=256 bytes
   "0"=128 bytes
6) An integer, "N", representing the number of pairs of external RAM beginning address and ending address pointers, delimiting the areas of contiguous external RAM that are to be traced in a trace record.
7) "N" pairs of external RAM addresses:
   An external RAM address specifying where to begin tracing external RAM.
   An external RAM address specifying where to stop tracing external RAM.

Another object of the present invention is to provide a method and system to stop target system code execution on the fly by a Forced Break command from the PC Host Debugger Application program.

A further object of the present invention is to provide a method and system to enable the debugger on the fly by an Enable Debugger Command from the PC Host Debugger Application program.

Another object of the present invention is to provide a method and system to disable the debugger on the fly by a Disable Debugger Command from the PC Host Debugger Application program. If the target system has hooked to INT0, the Debugger Routine portion of the INT0 Handler will be bypassed. The target system INT0 Hook routine will still be allowed to operate.

A further object of the present invention is to provide a method and system to modify 8031 register contents on the fly, or while the debugger is at a Forced Break, Breakpoint, or Steppoint.

Another object of the present invention is to provide a method and system of tracing the target system opcode and operands of each instruction executed. Upon entry to the debug interrupt handler, the top of the stack contains the address the next instruction of the routine that was interrupted. The byte pointed to by this address is the opcode. The opcode determines how many bytes in length the instruction is. The opcodes and operands are then copied into a trace table record.

A further object of the present invention is to provide a method and system of uploading the Debugger generated trace table record(s) at an enabled breakpoint, steppoint, or forced break, to the PC Host Debugger Application program for viewing on an application's screen.

Another object of the present invention provides multiple target system software modules built into a bootstrap ROM 30 module allowing the microcontroller to perform the self-debug of the present invention. The target system software modules built into the bootstrap ROM module include:
 a. Target system download routine
 b. Initialization of Interrupt Vector Jump Table into external RAM
 c. INT0 Debug routine which supports functions typically found in most emulators:
    Enable Debugger
    Disable Debugger
    Tracepoints
    Breakpoints
    Steppoints
    Patch Code (code download)
    Forced Breakpoints
    Register Modification
    Restart Target System
    Reboot Target System
 d. Serial Link Level Interface and Communication API for target system and debugger.

With reference now to the figures and in particular with reference to FIG. 1, Bootstrap ROM 30 interfaces between the PC Host 10 and the Target system code 40 as shown. Initially, the target system 8031 source code is assembled on the PC. The resulting executable object code is downloaded by the PC Host 10 through the serial connection to the target system Bootstrap ROM Downloader routine 33. The Downloader routine copies the object code to target system RAM. After the download is complete, the Downloader routine branches to the target system code 40. The target system code 40 can then chain onto any entry in the Interrupt Vector Jump Table 31. The target system code 40 may also replace any Interrupt Vector Jump Table entry except the INT0 Hook entry. The Serial Interrupt Vector is unavailable for either chaining or replacement. The target system 20 can communicate to a PC Host 10 application other than the PC Host Debugger application using the present invention serial link protocol with the "debugger switch" field in the D-packet set to a value indicating "target system".

The first step in enabling the INT0 Debug routine involves the PC Host Debugger application sending an "Enable Debugger" D-packet. Receipt of this D-packet will cause the -Enable Debugger hardware signal to be activated. With the INT0 input pin held low by the -Enable Debugger signal and INT0 programmed to be level-activated, INT0 interrupts can be enabled or disabled by the target system code 40 unmasking or masking INT0 respectively with an "enable INT0 interrupt" instruction (i.e. SETB EX0) or "disable INT0 interrupt" instruction (i.e. CLR EX0) respectively.

Having the Enable Debugger signal activated and INT0 unmasked will cause an escape from the target system code 40 to the INT0 interrupt handler. This escape is referred to as a "debugpoint". Included in the assembly of the target system source code is the Debug Parameter Table and "enable INT0 interrupt" instructions placed at strategic locations where debugpoints are desired. Having the -Enable Debugger signal deactivated and INT0 unmasked disables debugpoints but still allows target system INT0 interrupts to occur as long as the INT0 pin of the 8031 is shared between the target system logic and the -Enable Debugger signal. The Debug Parameter Table, shown in FIG. 2 is a look-up table used by the Debugger in the Bootstrap ROM 30 to determine what actions to take at a debugpoint. Actions include tracing enable/disable, breaking enable/disable, and single stepping enable/disable, or any combination of these, yielding a variety of possible actions. Debug data in the form of trace table records is uploaded to the PC Host Debugger Application during single-stepping, breakpoint, or forced break.

A D-packet can be sent from the PC Host Debugger Application to (1) enable the present invention Debugger, (2) disable the present invention Debugger, (3) modify register(s) in the target system 20, (4) load or patch the target system code 40, (5) update the Debug Parameter Table, (6) force break the target system code 40 execution, (7) continue execution of the target system code 40, (8) restart the target system code 40 beginning at the entry point used by the Bootstrap ROM 30 when initial target system downloading is complete, and (9) Reboot the target system at address 0000h just as if a hardware power on reset occurred. D-packets can be sent from the PC Host Debugger Application to the present invention Debugger to perform sequences of operations such as (1) force break the target system 20, (2) update Debug Parameter Table, and (3)

continue execution of the target system code 40. The present invention Debugger can respond to PC Host D-packets with status such as (1) acknowledge, (2) negative acknowledge, (3) trace table record(s) or (4) Trace Error. Status is sent to the PC Host 10 as either Synchronous or Asynchronous form. The difference being that synchronous status is sent to the PC Host 10 as a D-packet response to a PC Host D-packet command. Asynchronous status is a D-packet that is sent to the PC Host 10 which is not a response to a PC Host D-packet command. An example of asynchronous status is a D-packet that is sent to the PC Host 10 during single stepping or when a breakpoint occurs. An example of synchronous status is an "Acknowledge" D-packet that is sent to the PC Host 10 in response to an "Update Debug Parameter Table" D-packet command.

The PC Host Debugger Application presents all information from the target system debugger to the developer on a user-friendly screen. The PC Host Debugger Application can disable the present invention debugger by sending a "Disable Debugger" D-packet command. Receipt of this D-packet will cause the -Enable Debugger logic signal to become deactivated. The INT0 mask will remain unaffected because the target system code 40 may have its own INT0 service routine hook which must be functional at the time the Disable Debugger D-packet command is received.

Figure 4:
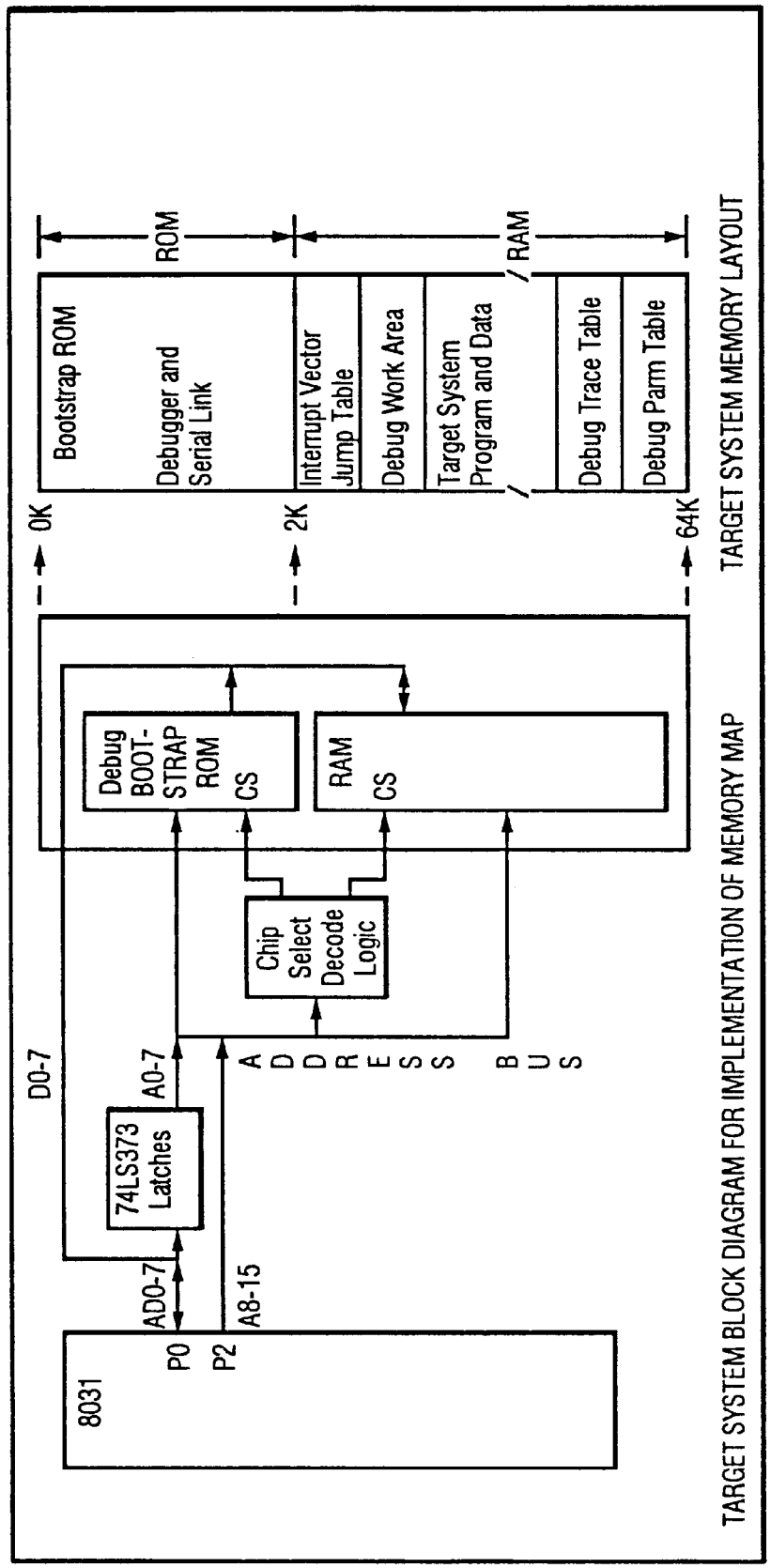
FIG. 4 is a block diagram of the memory mapping of the invention.

In order for the present invention package to work properly, the following target system 20 hardware requirements are necessary as shown in FIG. 4.

1. A memory requirement such that the external program memory the present invention Bootstrap ROM 30 be located at address 0 and all other target system external program and data memory resides in RAM. This is necessary to facilitate downloading of target system code 40 with breakpoints. The external program memory and external data memory are combined by applying the -RD and -PSEN signals to the inputs of an AND gate and using the output of the AND gate as the read strobe to the external Program/Data memory. External Program/Data RAM memory resides from 2K to 64K. The ROM bootstrap resides from 0 to 2K.

Figure 5:
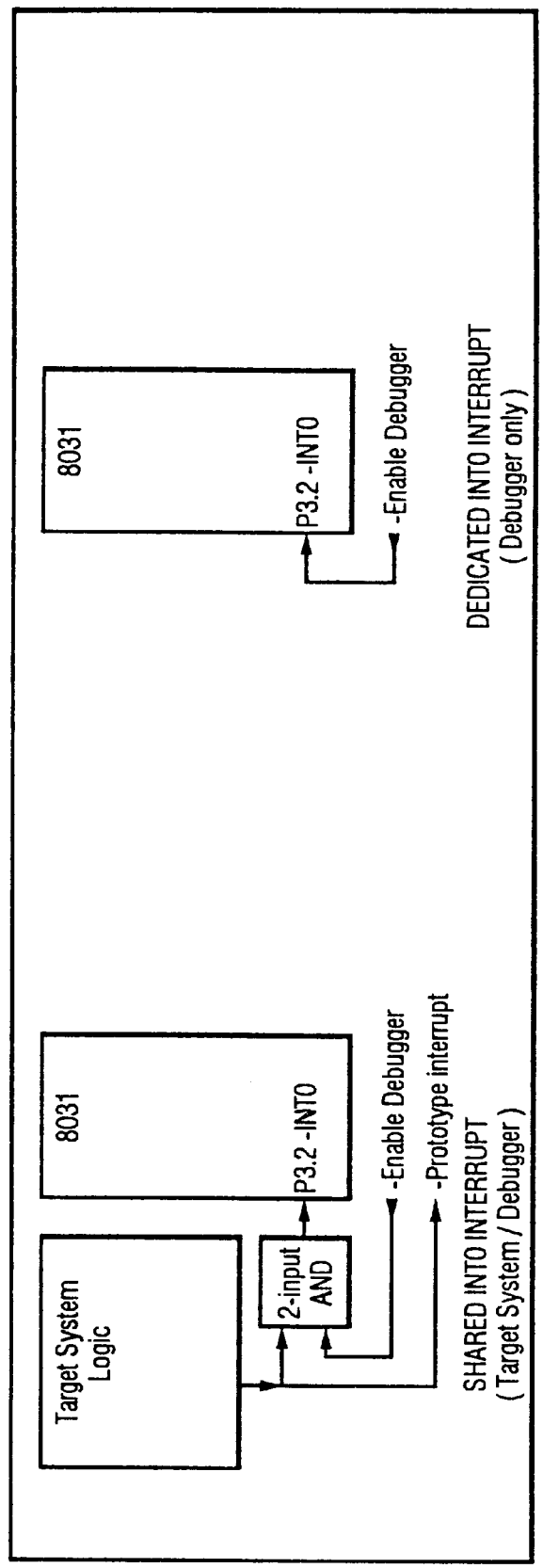
FIG. 5 is a hardware block diagram of the INT0 pin being shared between the Debugger and the Target system hardware, and another block diagram of the INT0 pin being dedicated to the Debugger.
Figure 6:
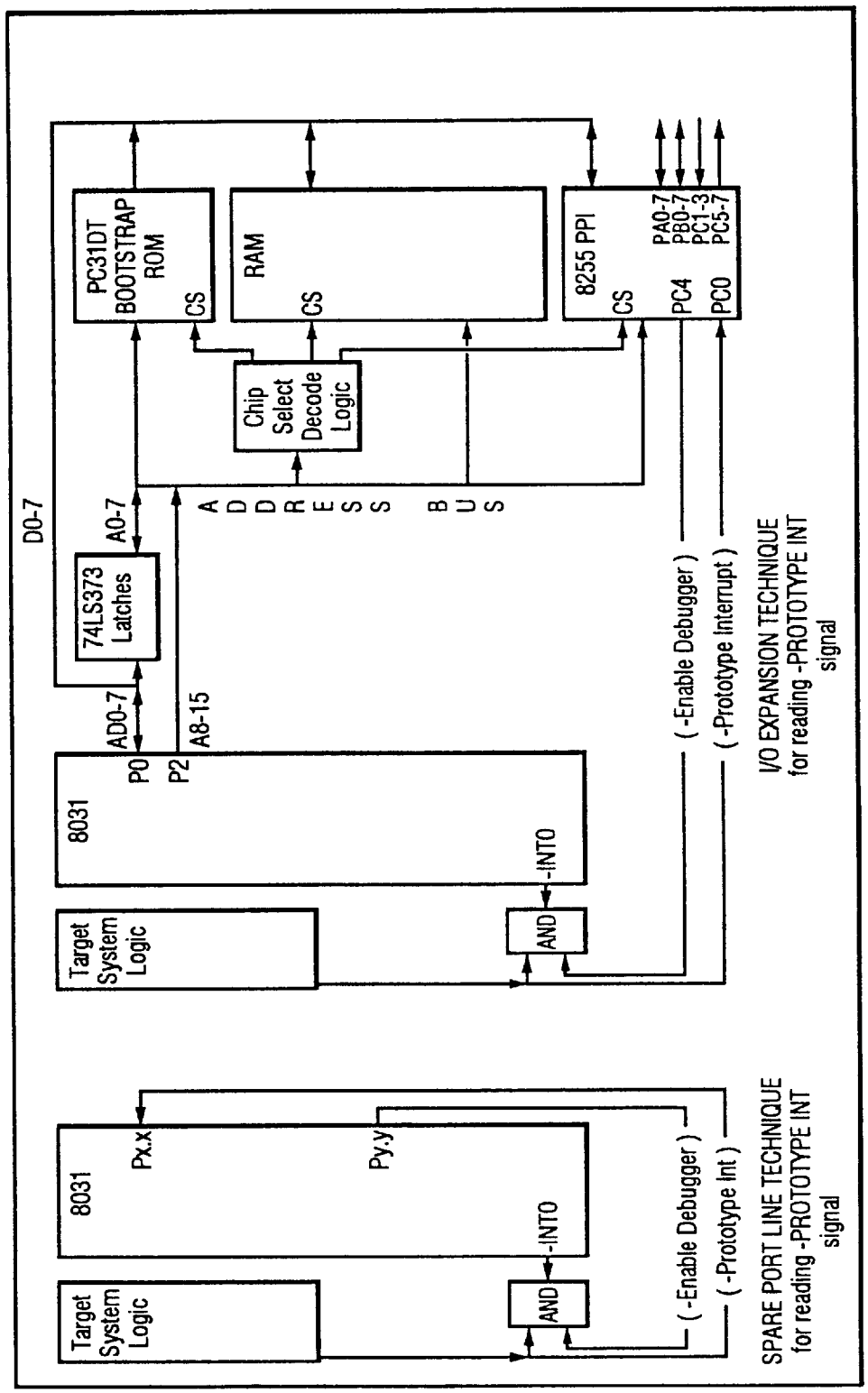
FIG. 6 is a block diagram depicting two methods which can be incorporated into the target system to determine whether the source of the INT0 interrupt was only from the Target system, only from the present invention Debugger, or from both the Target system hardware and the present invention Debugger.

2. Sharing INT0 between the debugger and the target system hardware control requires a 2-input AND gate with the output of the AND driving the INT0 input. The inputs to the AND gate are a -Enable Debugger signal and a target system -Prototype Interrupt signal. The diagram in FIG. 5 shows how INT0 can be shared between the debugger and the target system 20, and how INT0 can be used exclusively for the debugger. INT0 must be set to level-activated for the debugger to operate.

a. INT0 interrupts will only occur when the target system code 40 executes a "SETB EX0" instruction. The "CLR EX0" instruction will mask off (i.e. disable) the INT0 interrupt handler.

b. -Prototype Interrupt and -Enable Debugger are signals that can be connected to spare 8031 port lines or to other I/O expansion logic in the target system 20 as shown in FIG. 6. The -Prototype Interrupt signal is read by the target system's INT0 service routine that was hooked to the INT0 Hook vector in the Interrupt Vector Jump Table. This target system INT0 service routine determines whether the source of the interrupt is from the target system 20 and if so, services the interrupt. After servicing the interrupt, or if the source of the interrupt was not the target system 20, control is returned to the present invention INT0 Hook routine 34 which returns to the present invention INT0 Handler 32 as shown in FIG. 1 for further debug processing.

c. When the -Enable Debugger signal is set low, the Debugger is enabled and a debugpoint will occur after every target system 20 instruction as long as INT0 interrupts are unmasked. Setting -Enable Debugger high disables the debugger.

Software

The present invention package contains a Power On Reset (POR) routine, a Downloader routine, an Interrupt Vector Jump Table, an INT0 Handler which contains the debugger, a default INT0 Hook routine, a serial interrupt handler which supports a 2 channel communication protocol, a communications Application Program Interface (API), default timer 0, timer 1, timer 2, and INT1 interrupt service routines, default Enable Debugger routine, and default Disable Debugger routine.

The Power On Reset Routine executes following a POR vector jump at power on time. Its purpose is to perform rudimentary diagnostic functions on the 8031 microcontroller, initialize the Interrupt Vector Jump Table with default jump vectors, initialize the on-board UART, enable serial interrupts, and branch to the Downloader Routine.

Figure 3:
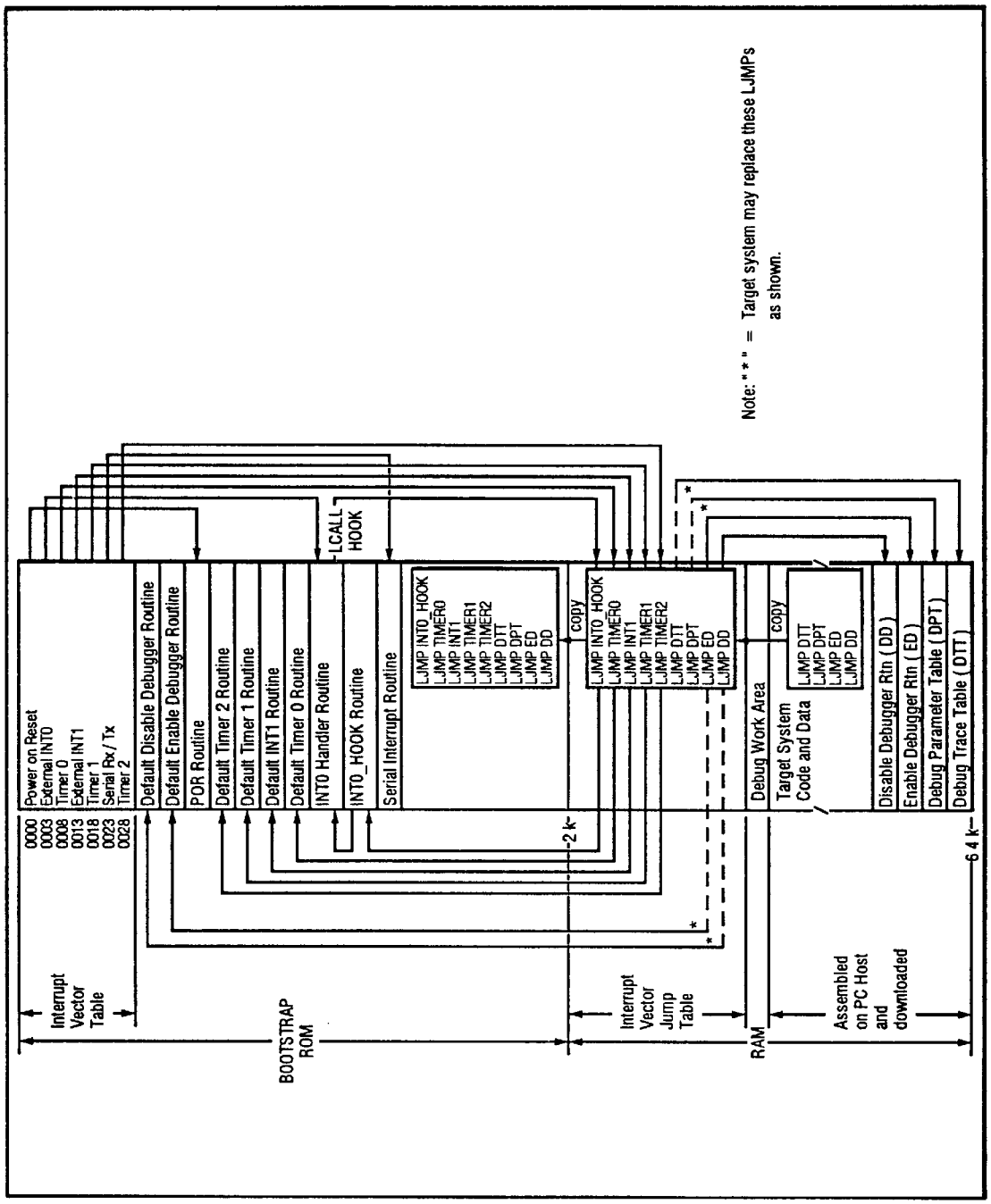
FIG. 3 is a block diagram depicting how the Interrupt Vector Jump Table is initialized to either branch to or point to the other software modules or data modules respectively, in memory.

The Downloader Routine is responsible for querying the communication API for D-packet available, reading the D-packets received from the host, and testing the D-packet's Debug Switch field for "Target System Code Download". If the Debug Switch is not equal to "Target System Code Download", the D-packet is discarded because the target system code 40 must be totally downloaded before other types of PC Host D-packets are accepted. If the Debug Switch is equal to "Target System Code Download", the target system object code is loaded into external RAM by the Downloader code at a location following the present invention Work Area as shown in FIG. 3. A field within the "Target System Code Download" D-packet contains an address indicating where the D-packet's object code record is to be placed in RAM. Downloading is complete when a "Target System Code Download" D-packet is received from the Host in which the executable object code field is null. After downloading is complete, the Downloader branches to the target system code 40 in external RAM at the address following the present invention Work Area as shown in the memory map layout of FIG. 3.

8031 microcontrollers have hardcoded interrupt vectors starting at address 0. Specifically, these are:

Power On Reset, vector address 0000 d External Interrupt 0 (INT0), vector address 0003h

Timer 0 Overflow Interrupt, vector address 000Bh

External Interrupt 1 (INT1), vector address 0013h

Timer 1 Overflow Interrupt, vector address 001Bh

Serial Receive and Transmit Interrupt, vector address 0023h

Timer 2 Overflow Interrupt, vector address 002Bh (8052, 8032, 8752 only)

Program memory is organized with a 2 kb present invention Bootstrap ROM 30 and 62 kb of RAM with the seven interrupt vectors at location zero assembled to point to an Interrupt Vector Jump Table as shown in FIG. 3. Referring to FIG. 3, these vectors, except for the Power On Reset vector, Serial Interrupt vector, and INT0 Interrupt vector, are coded to point to the Interrupt Vector Jump Table in RAM. The Power On Reset vector points to the present invention bootstrap ROM 30 POR routine. After power on, the bootstrap ROM 30 POR code will initialize the Interrupt Vector Jump Table so that all interrupts can be serviced by the default handlers contained in the ROM. The default interrupt handlers for Timer 0, Timer 1, Timer 2, and External Interrupt 1 (INT1), contain only one instruction which is the return from interrupt instruction, RETI. The purpose of the Interrupt Vector Jump Table is to provide a means for the target system code, once downloaded, to chain to, hook to, or replace these jump vectors so that the target system code can service the hardware interrupts. LJMP instructions are used in the Interrupt Vector Jump Table so that the address can be obtained from the operand of the LJMP, for the purpose of chaining or hooking to these vectors.

The term "hook" will differ from "chaining" in that "chaining" involves executing the new, or chained, routine followed by the old, or existing, routine specified in the operand field of the jump instruction located in the Interrupt Vector Jump Table, without having first been called from a precursive routine at the time of interrupt. "Hooking" involves first executing a precursive routine at the time of interrupt, then executing the new, or hooked, routine followed by the old, or existing, routine specified in the operand field of the jump instruction located in the Interrupt Vector Jump Table. In the preferred embodiment, only the INT0 interrupt vector jump instruction in the Interrupt Vector Jump Table can be hooked to. The following interrupt vector jump instructions in the Interrupt Vector Jump Table can be chained to or replaced:

Timer 0 Overflow Interrupt
External Interrupt 1
Timer 1 Overflow Interrupt
Timer 2 Overflow Interrupt The Serial interrupt vector can be neither chained to nor replaced by the target system code. The serial interface is a non-substitutable part of the present invention and therefore a serial interrupt jump vector has been purposely omitted from the Interrupt Vector Jump Table. The serial interface provides a means within the protocol for the target system code 40 to communicate to a PC Host 10 Application in parallel with the debugger's communication link to its PC Host Debugger Application.

The Bootstrap POR routine initializes the INT0 Hook Jump Vector to jump back to the default ROM INT0 Hook routine to close the code branching loop as shown in FIG. 3. The INT0 Hook vector may not be replaced and is provided only for hooking by the target system 20 for the purpose of sharing INT0 with the debugger. This hook allows the present invention INT0 Handler routine to interrupt the target system INT0 routine already in progress using code re-entrancy techniques.

The Interrupt Vector Jump Table, Debug Work Area, Debug Parameter Table, and Debug Trace Table require work space in RAM along with the target system code and data. The size of the Debug Parameter Table (DPT) and Debug Trace Table (DTT) is limited by the size of the Target System program code and data. A larger target system code 40 and data requirement reduces the available RAM for the DPT and DTT. The debugger locates the DPT and DTT by way of the Debug Parameter Table jump vector and the Debug Trace Table jump vector respectively in the Interrupt Vector Jump Table. These two vectors are initialized by the Bootstrap POR Routine to point to 1k blocks at the end of RAM in the event that the downloaded target system code 40 does not initialize them. The default Debug Parameter Table will be a null table containing only the table terminator value, 0000h. Typically, the DPT and DTT vectors are assembled with the target system source code on the PC Host 10. Once downloaded, the target system code 40 then initializes the DPT vector and the DTT vector to its own tables as shown in FIG. 3.

Similarly, the present invention INT0 Handler locates the "Enable Debugger" (ED) and "Disable Debugger" (DD) routines via the ED and DD jump vectors respectively in the Interrupt Vector Jump Table. As with the DPT and DTT jump vectors, the ED and DD jump vectors are assigned a default LJMP to a ROM routine to handle the enable and disable debugger requests in the event that the target system code 40 does not initialize the jump vectors to its own routines. The default ED and DD routines will assign port bit P1.0 to the -Enable Debugger signal. P1.0 was not chosen for any particular reason. Typically, the Enable Debugger and Disable Debugger vectors, the Enable Debugger routine, and the Disable Debugger routine are assembled with the target system source code on the PC Host 10. Once downloaded, the target system code 40 initializes the ED and DD vectors to its own routines as shown in FIG. 3.

Figure 7:
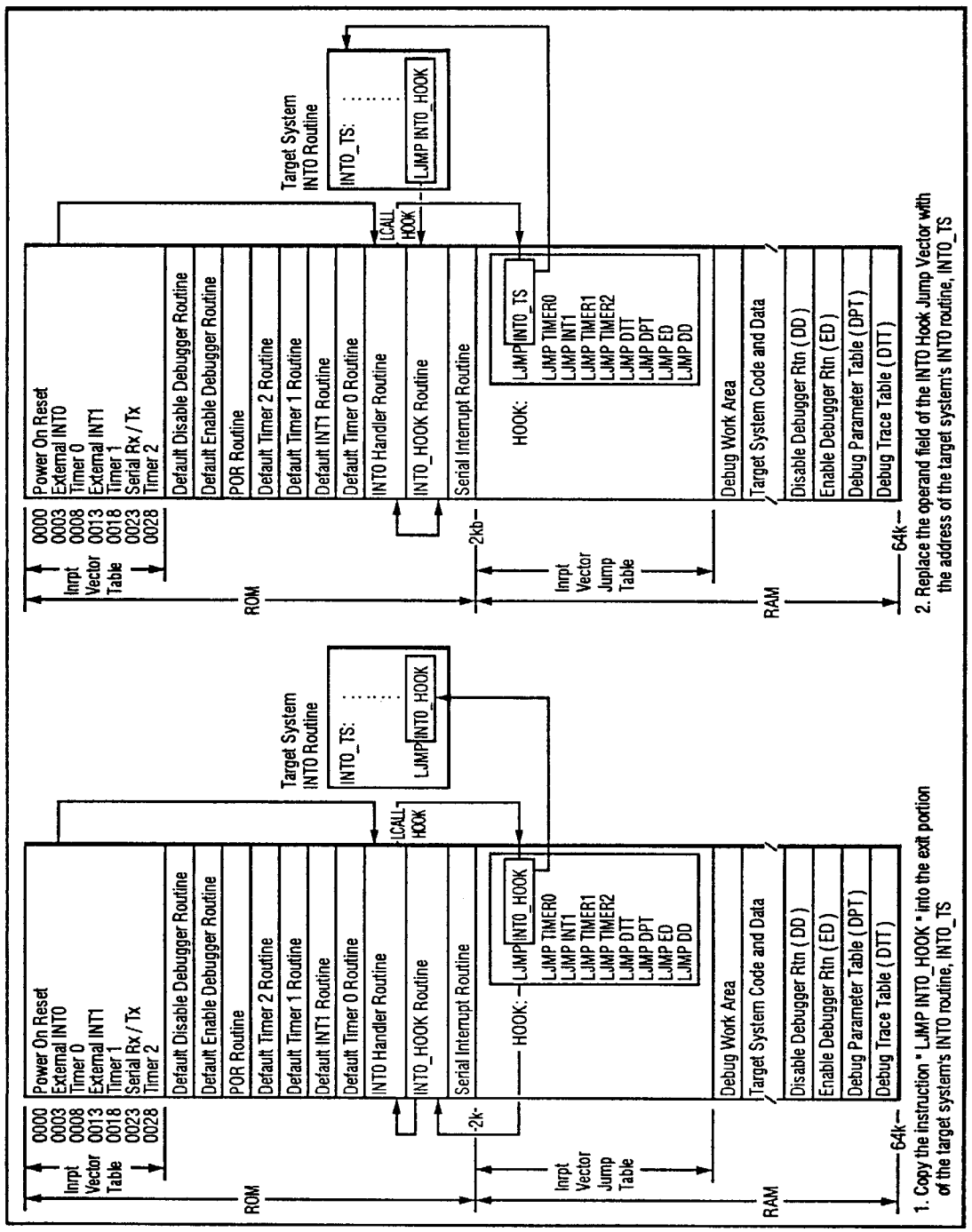
FIG. 7 is a block diagram depicting a method of hooking to the INT0 Interrupt Vector Jump Table entry named "Hook".

It is the responsibility of the target system code 40 to unmask INT0 when a debugpoint is desired. When the target system 20 has unmasked INT0 via a "SETB EX0" instruction and an INT0 interrupt occurs, the INT0 Handler routine will call the INT0 Hook vector as shown in FIG. 3. If the target system code 40 did not hook to the INT0 Hook vector, calling this vector will result in a long jump to the INT0 Hook routine in ROM, which simply returns to the INT0 Handler routine. The target system code 40 can "hook" into INT0 by exchanging the address in the operand field of the long jump instruction within the INT0 Hook Interrupt Jump Vector with the address of the target system INT0 handler routine. This is depicted in FIG. 7.

Since the target system code 40 knows its hardware configuration, the target system's INT0 routine has the responsibility of determining whether the source of the INT0 interrupt is the target system hardware or not. If it is determined by the target system INT0 routine that the interrupt was not caused by the target system hardware, the target system INT0 routine will perform the long jump back to the default ROM INT0 Hook routine, which returns back to the debugger. If the interrupt was caused by the target system hardware, the target system INT0 Hook routine will execute its algorithm to service it, then perform the long jump back to the default ROM INT0 Hook routine, which returns back to the debugger. In either case, once the target system INT0 Hook routine returns to the debugger, the debugger will then check the Debug Parameter Table for any action, if any, to be taken upon the interrupted target system code 40. The target system INT0 service routine must make sure that the stack and all registers are restored as they were at its routine entry point before jumping back to the INT0 Hook routine. In the preferred embodiment, the External Interrupt 0 (INT0) and Serial Interrupt should be set to high priority while all other interrupts in the system should be set to low priority. The invention does not preclude the developer from changing the priority levels. However, the reason the Serial interrupt is set to high priority is to prevent receiver overruns and timeouts which might occur if other target system 20 interrupts were set to an interrupt priority greater than or equal to the Serial interrupt.

The INT0 interrupt is set to high priority so that debugpoints can occur during the execution of low priority interrupt service routines in the target system 20. This allows debugging of the low priority interrupt handlers by the high priority INT0 debugger routine. The present invention INT0 Handler is designed to debug a hooked target system INT0 routine. This is possible through the use of a precursive reentrant routine built in ROM that executes at the time of an INT0 interrupt then branches to either the hooked target system INT0 routine, or if the hooked target system INT0 routine is already in progress, to the debugger routine. The INT0 debugger cannot debug other interrupts in the system that are set to the same priority level as itself because precursive reentrant routines are not supplied for the other interrupt handlers. The reason for this is reentrant routines add overhead and the intent of the preferred embodiment is to be as non-intrusive to target system 20 performance as possible. Setting other interrupts in the system to a low priority level allows the debugger to execute debugpoints on these low level priority interrupts without the overhead associated with reentrant code.

The means of accomplishing INT0 reentrancy is to mask off INT0 while in the INT0 interrupt routine, then to subsequently clear the priority inprogress flip flop within the 8031 hardware with a RETI instruction while remaining in the INT0 interrupt handler. After accomplishing this means, the INT0 hook in the Interrupt Vector Jump Table can be called, and the target system's INT0 routine can actually be debugged by the present invention INT0 debugger routine. The target system's INT0 routine need only unmask INT0 interrupts to cause an immediate re-entry into the INT0 Handler provided that the -Enable Debugger logic signal is activated. The INT0 Handler's re-entry algorithm branches to the debugger to debug the target system's INT0 service routine already in progress. Furthermore, with serial interrupts also unmasked, communication with the PC Host Debugger Application can occur while executing the Debugger Routine.

The present invention INT0 Handler consists of three parts: a Reentrant Routine, a Debugger Routine, and an Exit Routine.

The Reentrant Routine is non-interruptable and handles: checking of the communication API for D-packets from the PC Host Debugger Application and taking appropriate action upon them, exiting back to the interrupted target system code 40, reenabling the current interrupt priority level in progress while remaining in the software interrupt handler, executing the target system's hooked INT0 routine if not already in progress, and branching to the INT0 debugger routine.

Reenabling the current interrupt priority in progress is necessary to allow serial interrupts to occur. This is accomplished by masking off all interrupts except the serial link interrupt, then exiting the hardware interrupt level by pushing the address of the instruction following the interrupt return instruction (RETI) onto the stack, then performing the RETI to the instruction. RETI reenables interrupts for the current priority. Therefore, with INT0 masked off and the current interrupt priority level reenabled, a serial interrupt is allowed to be serviced. From a software perspective, this technique simulates a tri-level priority system with the serial communication interrupt being the highest priority although in reality the Serial and INT0 interrupts share the high priority level. The Reentrant Routine executes the target system's INT0 hooked routine if not already in progress and then branches to the Debugger Routine.

The Debugger Routine runs with INT0 masked off. To exit back to the target system 20, the interrupt enable state (i.e. the IE register), must first be restored. Given the fact that an interrupt request will not be responded to after a write to IE until at least one other instruction has been executed, performing a RETURN instruction after restoring the IE register will transfer program execution back to the target system code 40 before the next INT0 interrupt occurs. However, the RETURN instruction would be the only instruction to execute before an INT0 interrupt occurs and thus the Debugger would be "stuck" at one target system code 40 program address during tracing and single-stepping, rendering the target system code 40 as well as the Debugger useless.

A method was needed to resolve the problem of being "stuck" at the same target system code 40 program address when another INT0 interrupt occurred during single stepping and tracing. This solution involves allowing the reentrant portion of INT0 to complete transfer back to the interrupted target system code 40 instead of performing the following two steps in the Exit Routine: restoring the Interrupt Enable register (IE) and executing the RETURN instruction. The solution is to have the Exit Routine unmask INT0 thereby permitting an immediate reentry into the INT0 Handler one instruction later. The NOP is provided for this purpose. See FIG. 28. Upon completion of the NOP execution, an immediate interrupt to the Reentrant Routine will occur. Exit to the target system code 40 from where the INT0 interrupt first occurred is actually accomplished by the INT0 Reentrant Routine as follows: the Reentrant Routine will restore the IE register, decrement the stack pointer by two, and perform a RETI to return to the target system code 40 instead of returning to the Exit Routine. Note that at the time the IE register is restored, the current interrupt priority has not been reenabled. Therefore, an INT0 request will not be responded to until one instruction execution after the RETI has executed. Thus, one instruction in the target system code 40 is guaranteed to execute before another INT0 interrupt occurs provided INT0 remains unmasked. This technique allows tracing and single stepping to operate properly. Note that decrementing the stack pointer (SP) does not affect flags and thus does not alter the Program Status Word (PSW) register when returning back to the target system code 40.

The Debugger Routine handles breakpoints, tracepoints, and steppoints which are determined by a table called the Debug Parameter Table (DPT). The Debug Parameter Table contains a record for each coded debugpoint within the code as shown in FIG. 2. A debugpoint is defined as an escape from the target system code 40 to execute the INT0 Handler routine. Debugpoints commence following the Enable Debugger command from the PC Host 10 which activates the -Enable Debugger signal and INT0 being in an unmasked state. The latter is accomplished by either the execution of the "SETB EX0" instruction which is assembled into the target system source code by the designer, or alternately, by receiving the Register Modification command from the PC Host Debug application. The Register Modification command can be used to set the EX0 bit within the IE register and thereby unmasking INT0. Each record in the DPT consists of an instruction address and boolean flags indicating whether to enable or disable tracing, breaking, single stepping, or a combination of these functions. The record also contains the amount of internal RAM to be traced, and a range or ranges of contiguous external RAM data to be traced. As long as INT0 is unmasked and the -Enable Debugger signal is activated, an INT0 interrupt will occur after every target system 20 instruction.

The Debugger Routine compares the program counter at the top of the stack upon entry into the INT0 Reentrant Routine with the program counter field of each record in the DPT until a match is found. If a match is found, the "active" DPT record is replaced by the new matched record. The debug boolean flags in the DPT record dictate what action is to be taken.

If a match is not found, the last "active" DPT record remains in effect with the Break boolean flag being ignored.

In other words, if the last active DPT record contained either the Trace or the Single Step boolean flags set, or both set, these functions would remain in effect. If the last active DPT had the Break boolean flag set, the break would be ignored for subsequent debugpoints until a new match is found with the Break boolean set.

Each DPT record contains the following information as shown in FIG. 2:

1. The target system 20 program counter field, "pc", occupies 2 bytes.
2. The boolean flags occupy 4 bits in a byte:
   a. T=Trace (1=enable, 0=disable)
   b. B=Break (1=enable, 0=disable)
   c. S=Step (1=enable, 0=disable)
   d. R=IRAM size (1=trace all 256 bytes of internal RAM, 0=trace first 128 bytes of internal RAM). Note: for 8031, 8051, and 8751 microcontrollers, the Debug Parameter Table should specify "0" for this bit since the internal RAM size is only 128 bytes. Specifying "1" for these microcontrollers will result in valid values for the first 128 bytes of internal RAM and indeterminate values for the last 128 bytes of the internal RAM trace.
3. The number of external RAM begin and end address pairs, N, representing the number of external RAM blocks of memory to be traced in a trace table entry.
4. The external RAM beginning address and external RAM ending address are both two byte fields delimiting the area in external RAM that should be contained in the trace record. If either one of these values is less than 800 h (i.e. 2 kb), then no external RAM will be traced for that particular external RAM address pair. The external RAM in the target system 20 will typically start after the present invention bootstrap ROM 30 module.

Therefore, the minimum value allowed in these fields is 800 h, which is the address following the last address in the bootstrap ROM 30 module. The ending address must be greater than or equal to the beginning address for external RAM tracing to occur for a particular external RAM address pair. If the ending address is equal to the beginning address, only 1 byte of external RAM at that address will be traced. The allowable number of external RAM beginning and ending address pairs depends upon how much space in RAM is used by the target system code 40 and data.

5. The number of records, n, allowed depends upon how much space in RAM is used by the target system code 40 and data.

To selectively disable or enable debugpoints, the PC host 10 can update the Debug Parameter Table boolean flags. For example, to change a Break Boolean flag from active to inactive, a new Debug Parameter Table can be downloaded with the Debug Parameter Table Update command. To remove a range of existing debugpoints delimited by the "SETB EX0" and "CLR EX0" instructions, or add a new range of debugpoints in the target system code 40, the target system code 40 is reassembled with new "SETB EX0" and "CLR EX0" instructions added or deleted, then redownloaded to the target system 20 by issuing the Reboot command to the target system 20. Alternately, if redownloading is not desired, INT0 can be masked or unmasked on the fly by sending a Modify Registers command to the present invention Debugger in order to modify the Interrupt Enable register. Still another alternate method to add or remove ranges of existing debugpoints is to send a Forced Break command to the debugger, followed by a Target System Code Download command to patch the "SETB EX0" and "CLR EX0" instructions to No-operation instructions (NOPs) or vice versa, followed by a Restart command.

If the target system code 40 is to hook to INT0, the target system code 40 may by design need to have INT0 always unmasked. If this is the case, delimiting debugpoints with "SETB EX0" and "CLR EX0" instructions would violate the target system code 40 design and therefore could not be used. In this case, debugpoints would occur after every target system code 40 instruction. The PC Host can send Enable Debugger and Disable Debugger commands on the fly to start and stop debugpoints respectively, without disturbing the normal occurrences of INT0 interrupts caused by the target system 20. Alternately, if debugpoints are not desired during time critical sections of code, the target system code 40 itself may be implemented to call the Enable Debugger and Disable Debugger routines directly, independent of the PC Host commands.

A breakpoint is a point in target system code 40 where the entire trace table is uploaded to the PC host 10 and the target system 20 is suspended until a message from the host commands the debug routine to continue execution of the target system code 40. When a debugpoint is reached, the INT0 interrupt handler checks the Debug Parameter Table to verify that the breakpoint is enabled. A break is enabled if the Break Boolean flag is set true and the program counter value in the Debug Parameter Table matches the program counter at the top of the stack upon entry into the INT0 interrupt handler. The INT0 interrupt handler will build a trace record and append it to the top of the chain of records in the existing trace table. The INT0 routine will then invoke the Communication API to transfer the contents of the trace table to the PC host 10 for display, then query the Communication API for a message from the PC host 10 to continue processing the target system code 40.

A steppoint is a point in target system code 40 where instruction single stepping is or becomes active. Stepping is enabled if the Step Boolean flag is set true and the program counter value in the Debug Parameter Table matches the program counter at the top of the stack upon entry into the INT0 interrupt handler. Once stepping begins, it remains in effect until disabled. Each time the INT0 Handler is invoked, the debugger routine will look through the Debug Parameter Table for an entry matching the current program counter on the top of the stack upon entry to the INT0 interrupt routine. If no match is found, stepping continues. If a match is found and the stepping boolean is disabled, stepping stops. If stepping is enabled, the INT0 interrupt handler will build a trace record and append it to the top of the chain of records in the existing trace table. The routine will then invoke the Communication API to transfer the most current trace table record to the PC Host 10 for display, then query the Communication API for a message from the PC Host 10 to continue processing the target system code 40.

A tracepoint is a point in target system code 40 where instruction tracing is or becomes active. The trace table is circular. That is, when the trace table becomes full, further records are wrapped around to the beginning of the trace table, overlaying old trace entries. Tracing is enabled if two conditions are met: (1) a match is found between the program counter at the top of the stack upon entry into the INT0 interrupt handler and a program counter field in the Debug Parameter Table, and (2) the Trace Boolean flag is set true. Once tracing begins, it remains in effect until disabled. An INT0 interrupt will occur following each instruction execution in the target system code 40 provided INT0 remains unmasked. The INT0 Handler builds a trace table record of debug data and appends it to the top of the chain of records in the trace table. Each record of the trace record, contains the following:

1. A length of the record excluding the length bytes: L (2 bytes)
2. A forward chain pointer to the next trace entry: FPTR (2 bytes).

This pointer is zero if this trace record is the most current entry in the chain of records.

3. A backward chain pointer to the previous trace entry: BPTR (2 bytes). This pointer is zero if this trace record is the last in the chain.
4. Microcontroller register contents: ACC, B, PSW, IP, P0, P1, P2, P3, IE, SCON, TCON, SBUF, TMOD, SP, TL0, TL1, TH0, TH1, DPL, DPH, PCON, TL2, TH2, RCAP2L, RCAP2H, and T2CON. The last five registers apply only to the 8032, 8052, and 8752 microcontrollers. For the 8031, 8051, and 8751 the value of these registers are indeterminate.
5. The program counter value at the top of the stack. The top of the stack will contain the address of the next instruction to be executed in the target system code 40 when the INT0 Handler is first invoked.
6. The length of the next instruction to be executed in the target system code 40. This is a one byte field. An instruction's length can range from 1 byte (eg. RET) to 3 bytes (eg. LJMP).
7. The next instruction to be executed when INT0 exits back to the interrupted target system code 40. This next instruction is determined by examining the first byte, or opcode, pointed to by the program counter residing at the top of the stack upon entry into the INT0 interrupt handler. The instruction opcode byte is used as an offset into a translate table to fetch a number "N". "N" is the number of bytes associated with the instruction for the given opcode. "N" bytes are then copied from program memory pointed to by the program counter at the top of the stack, to the trace table record.
8. A 2 byte length field indicating the length of internal microcontroller RAM data to follow. This length field will equal 128 or 256 depending upon the value of the "R" boolean in the active DPT record.
9. Internal microcontroller RAM data starting with the 4 banks of registers R0–R7 (bank 0), R0–R7 (bank 1), R0–R7 (bank 2), R0–R7 (bank 3).
10. A 1 byte number of contiguous external RAM memory area sections traced. The maximum number for this field is 255.
11. A 2 byte length field indicating the length of external RAM data to follow. This length value excludes the length bytes. If this length field equals zero, then no external RAM data exists for this particular beginning and ending address pair. This could occur if the beginning and ending addresses are improperly coded into the active DPT record. For example, the ending address may be coded to a value less than the beginning address.
12. External RAM data delimited by the beginning and ending address pair specified in the DPT.
13. A repeat of items 11 and 12 up to the number specified in item 10.

Records are chained together with forward and backward chain pointers. This permits the PC host debugger application easy scrolling capability from one record to the next in either direction. The Backward Chain Pointer, in the record which exists at the bottom of the chain, has a value of zero. The Forward Chain Pointer, in the record which exists at the top of the chain, also has a value of zero. Trace record chaining occurs when the Trace Boolean flag is set true, the Single Step Boolean flag is set true, or the Break Boolean flag is set true. Whenever tracing is to be performed, a record is created and appended to the top of the chain of trace records.

Tracing can be disabled whenever a DPT record becomes active with the Trace Boolean flag set false. However, if stepping is enabled even though tracing is disabled, the tracing function remains in effect with the added function of transmitting the most current trace record to the PC Host 10 at each steppoint.

Figure 29:
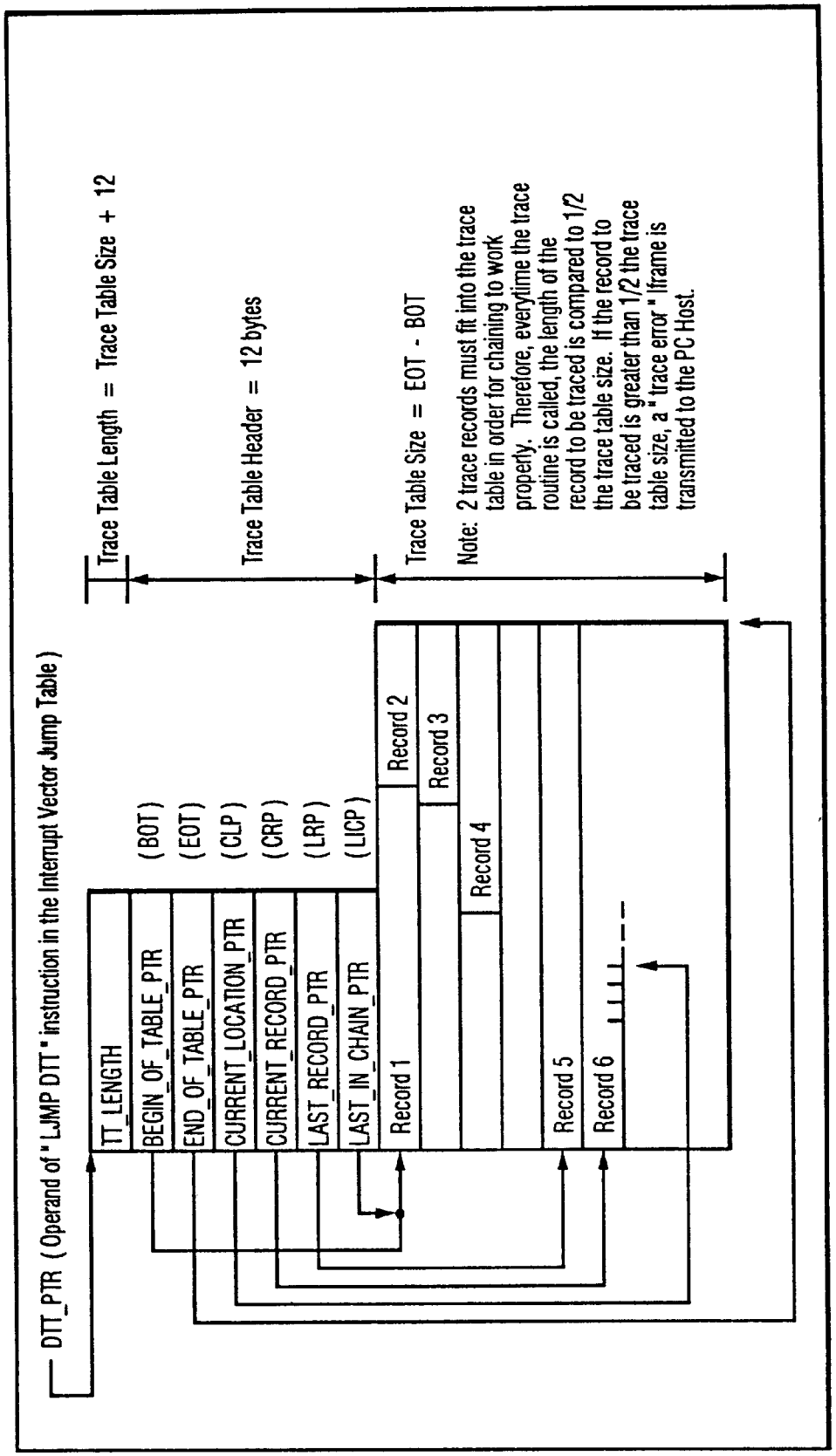
FIG. 29 is a Data Structure diagram depicting the Trace Table.

The trace table is managed by six pointers as shown in FIG. 29. Referring now to FIG. 29:

1. The "beginning of table pointer" (BEGIN OF TABLE PTR, or simply BOT) points to the first byte of the trace table where trace data is to be entered.
2. The "end of trace table pointer" (END OF TABLE PTR, or simply EOT) points to the byte position just past the last byte of the trace table.
3. The "current location pointer" (CURRENT LOCATION PTR, or simply CLP) points to the area in the trace table where the next trace data byte will be placed.
4. The "current record pointer" (CURRENT RECORD PTR, or simply CRP) points to the start of the current record being built.
5. The "last record pointer" (LAST RECORD PTR, or simply LRP) points to the start of the most recent record that was completed in the trace table.
6. The "last in chain pointer" (LAST IN CHAIN PTR, or simply LICP) points to the last record in the chain of records. The record this pointer points to has a Backward Chain Pointer of zero contained within the record. As trace records wrap around the BOT, the LICP will be adjusted to point to the "next-to-oldest" record in the trace table before the "oldest" record is overlayed with a new trace record.

Initially the CURRENT LOCATION PTR, CURRENT RECORD PTR, LAST RECORD PTR, and LAST IN CHAIN PTR are initialized to the value of the BEGIN OF TABLE PTR. Both the BEGIN OF TABLE PTR and END OF TABLE PTR are fixed values that do not change per given trace table. The EOT points to the byte past the end of RAM and has a value of (FFFFh+1=0000h). The pointer to the trace table length field is fetched from the operand field of the Interrupt Vector Jump Table entry "LJMP DTT".

Figure 30:
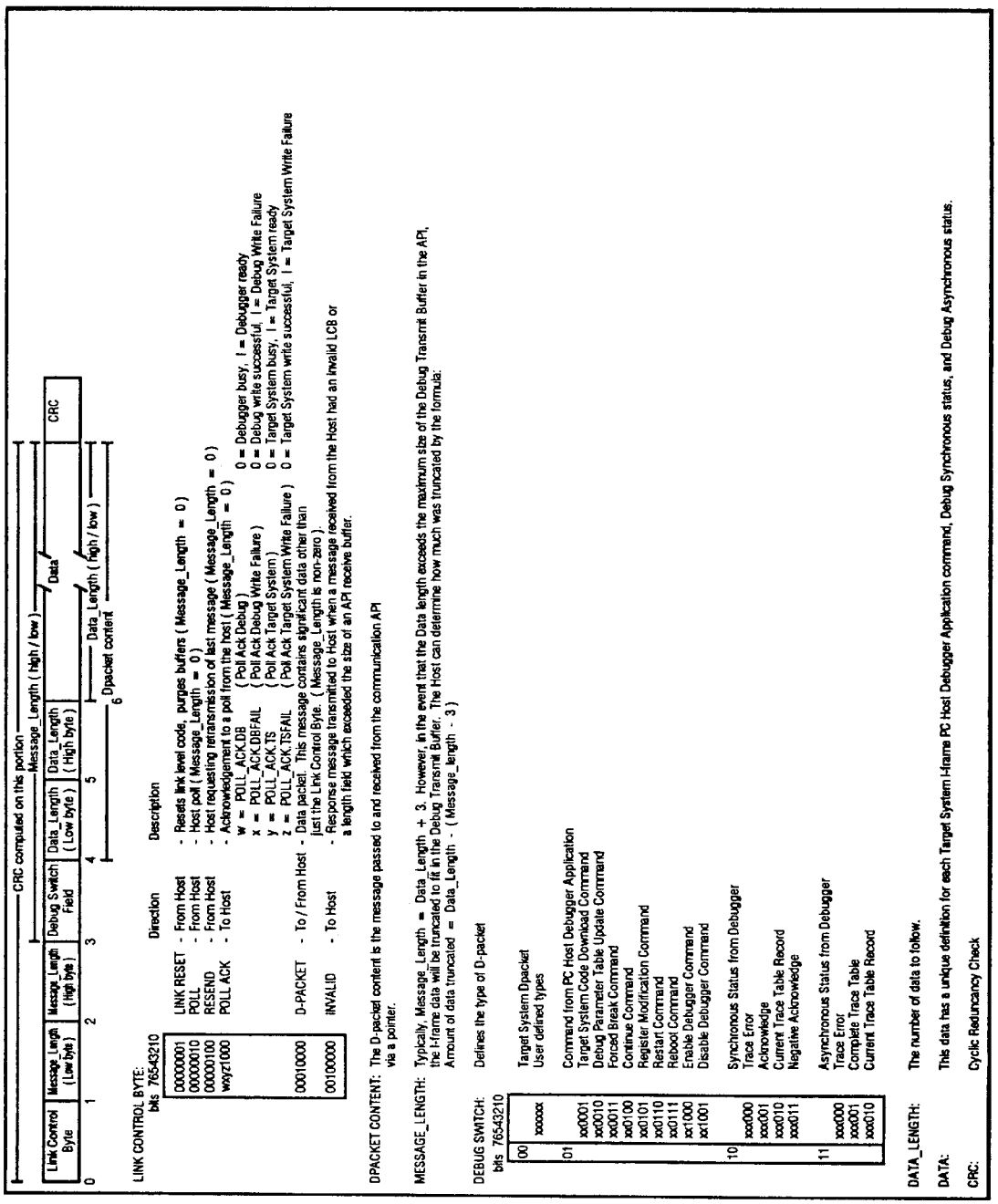
FIG. 30 is a Data Structure diagram depicting a generic serial link Data packet, hereafter referred to as a D-packet.
Figure 31:
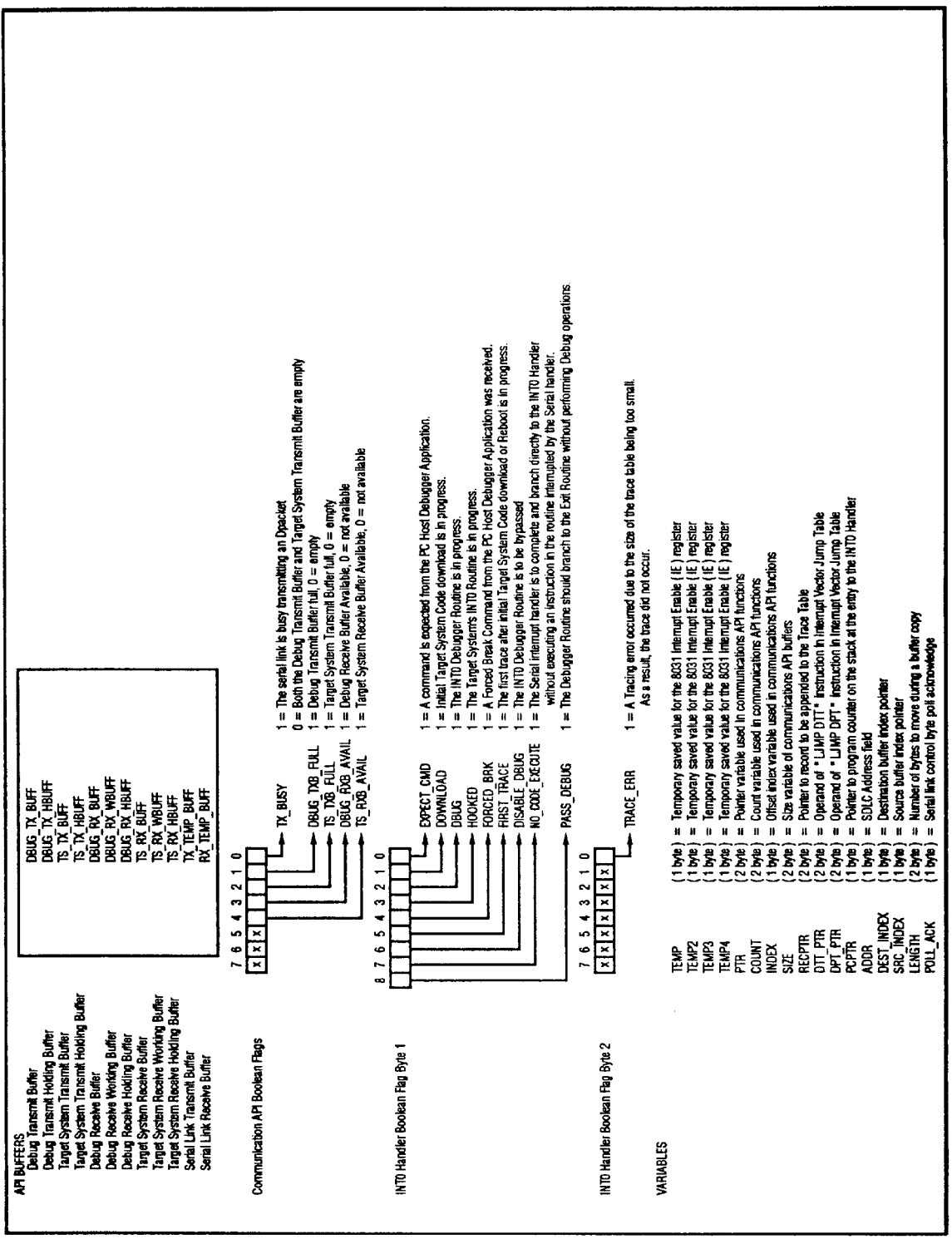
FIG. 31 is a memory mapping of the present invention RAM Work Area.

The debugger interfaces to the serial link exclusively through the Communication Application Program Interface (API) while servicing the INT0 interrupt. The D-packets contain a field called the Debug Switch. The Debug Switch field is depicted in FIG. 30 at offset 3 of the D-packet. When the serial link interrupt handler receives a D-packet from the PC Host, the Debug Switch field is examined. If the Debug Switch is set to target system 20, the routine puts the D-packet in a buffer designated for the target system 20 within the communication API. Access to this D-packet is only allowed by the target system code 40. If the debug switch is set to debugger command, the serial link routine will save the state of the interrupt enable register and unmask INT0 if the debugger is not already in progress. The D-packet is then put in a buffer designated for the debugger within the communication API. Access to this D-packet is only allowed by the debugger.

An INT0 interrupt will occur following completion of the Debugger and Exit routines or following completion of the serial interrupt depending upon whether the Debugger was in progress at the time the Debug D-packet was received or not, respectively. The INT0 Reentrant Routine will query the communication API for Debug D-packet available. When a Debug D-packet is found to be available, it is read from the communication API and processed. After processing, the Reentrant Routine queries the communication API for Transmit Busy. When the transmitter is idle, a Status D-packet is returned to the PC Host 10.

Status D-packets that are sent to the PC Host Debugger Application as a response to a Command D-packet are called synchronous Status D-packets. Asynchronous status is sent to the PC Host Debugger Application when the debugger encounters a breakpoint or steppoint. Asynchronous status is not a response to a Command D-packet from the PC Host Debugger Application. Note that if the Debugger Routine is already in progress when a debug D-packet command is received, the PC Host Debugger Application may receive an asynchronous status D-packet from the Debugger Routine already in progress before the Command D-packet is responded to with a synchronous status D-packet.

Figure 13:
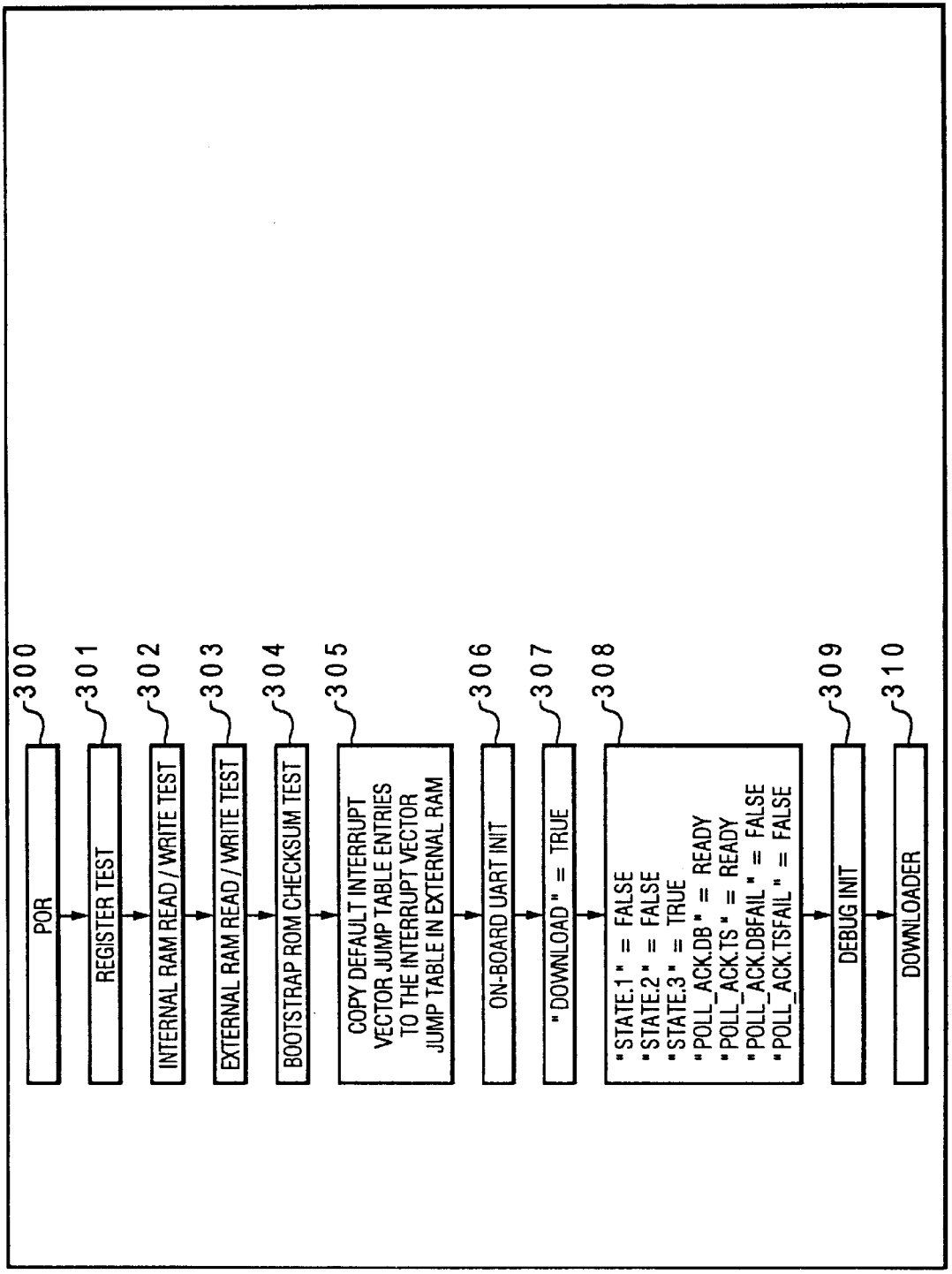
FIG. 13 is a flowchart of the Power On Reset Routine.

Code Flow Description:

Power On Reset routine (FIG. 13)

When the system under test is powered up, a Power On Reset (POR) routine as shown in FIG. 13 is executed. Referring now to FIG. 13, a few rudimentary functions are performed between steps 300 and 304, inclusive. These steps are recognized by those skilled in the art of microcontroller programming as standard procedure. In step 305, a default interrupt vector jump table stored in program space in the bootstrap ROM is copied to an external RAM location immediately following the bootstrap ROM at the 2k boundary as shown in FIG. 3. The long jumps contained in the interrupt vector jump table point back to default routines contained in the bootstrap ROM as shown in FIG. 3. Next, the on-board UART is initialized in step 306. In step 307, a "Download" flag is set TRUE. Next, in step 308, flags used by the serial interrupt routine are initialized. In step 309, the Debug Init routine is called followed by a code branch to the downloader routine in step 310. The Downloader routine flowchart is not shown since those skilled in the art of microcontroller programming can implement such a routine with ease. For the sake of completeness, the downloader routine may be implemented as follows. The downloader routine will query the communication API for Target System D-packet Available. When available, the downloader routine will obtain the target system D-packet via the communication API function "Get Target System D-packet". The debug switch field is checked for equality to type "Target System Code Download Command". The debug switch is shown in FIG. 30. If the debug switch field is equal to the type "Target System Code Download Command", the data length field is checked. If the data length field is zero, the "Download" flag is reset to a FALSE state and the downloader routine branches to the Target System entry point which is typically located immediately following the interrupt vector jump table and debug work area as shown in FIG. 3. If the data length field is not zero, the downloader routine will copy the target system program code bytes and/or data from the "data" field of the D-packet to external RAM beginning at an address specified by a "Load Address" field which is typically the first 2 bytes of the "data" field of the D-packet. Those skilled in the art of microprogramming can modify the algorithm just described to incorporate an algorithm that recognizes the existence of a target system program already loaded and can branch directly to the target system program entry point. If the RAM in the SUT is non-volatile, the target system program can remain present even after the SUT is powered down.

Figure 14:
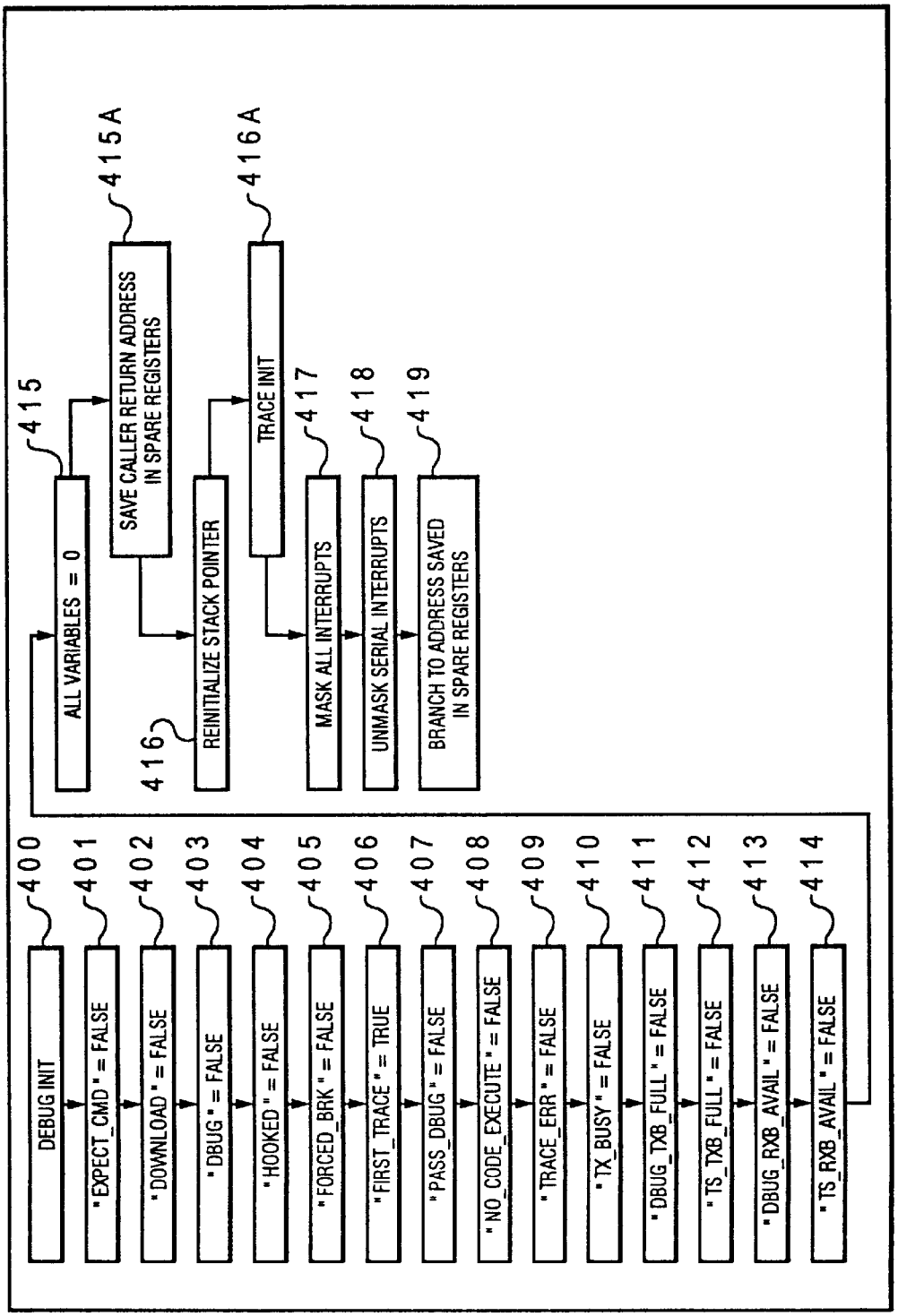
FIG. 14 is a flowchart of the Debugger Initialization Routine. This routine resets all boolean flags and variables used by the INT0 Handler.

Debugger Initialization Routine (FIG. 14)

The Debugger Initialization routine in FIG. 14 will initialize all debugger flags and serial communication flags as shown in steps 400 through 415 inclusive. In step 415A, the caller's return address is fetched from the stack and saved in 2 temporary registers. In step 416, the stack pointer is reinitialized. In step 416A, the Trace Init routine is called to initialize the trace table pointers. In step 417 and 418, all interrupts are masked off (i.e. disabled) except for the serial interrupt. In step 419, the routine branches to the address saved in the 2 temporary registers which contain the caller's return address. Since the Debug Init routine can also be called by the Command Processor, FIG. 16, during the handling of an INT0 interrupt when processing the "Restart" command from the host computer, the stack pointer must be reinitialized in the Debug Init routine to create a true restart of the target system code. Since the stack pointer is reinitialized, the return address of the caller must be saved in temporary registers.

Figure 18:
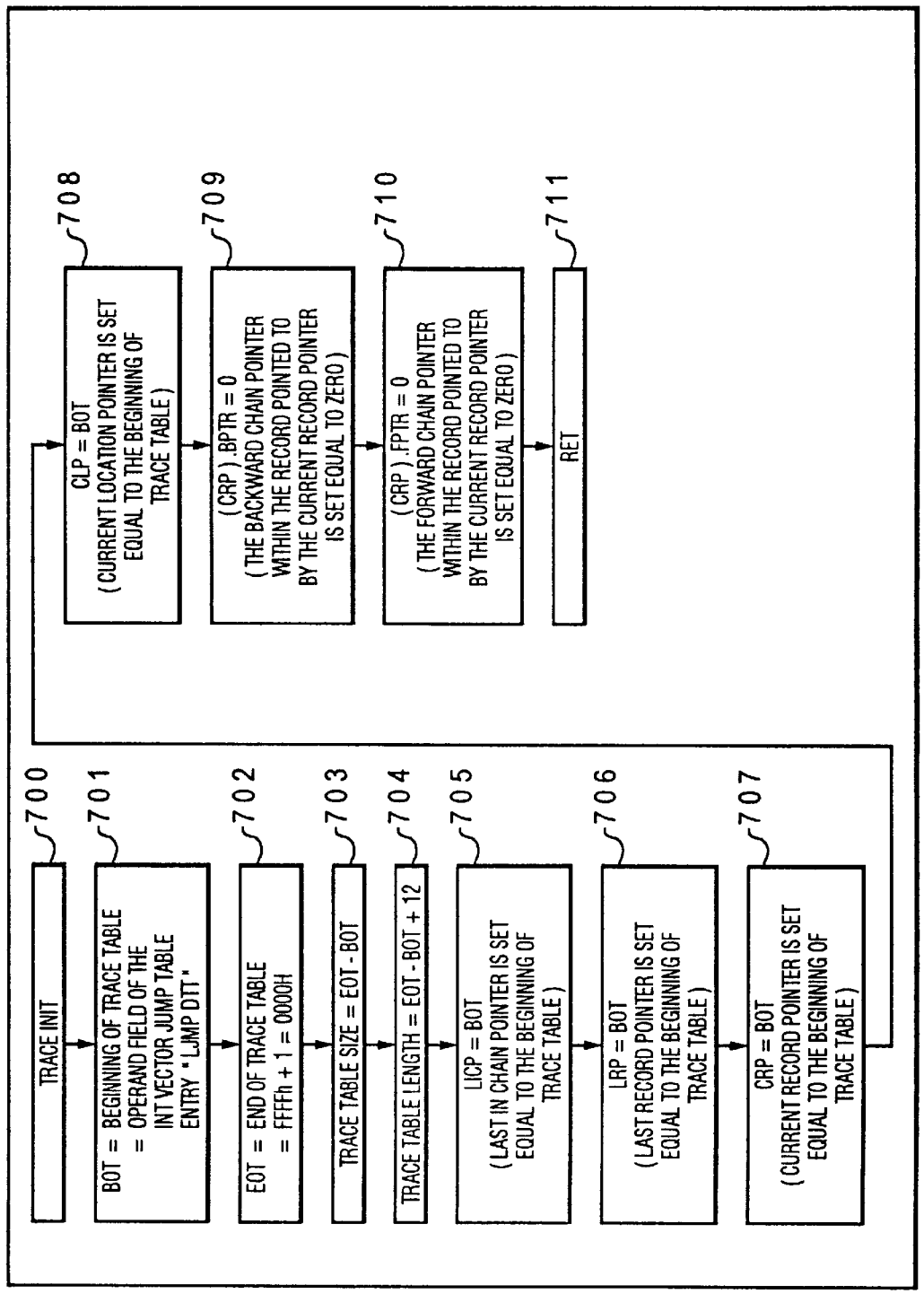
FIG. 18 is a flowchart of the Trace Table Initialization Routine.

Trace Table Initialization Routine (FIG. 18)

The Trace Init routine which is called by the Debug Init routine described above, is depicted in FIG. 18. In step 701, the Beginning of Trace Table pointer is initialized to the value of the sum of the operand field of the interrupt vector jump table entry "LJMP DTT" and the size of the trace table header. The trace table header is shown in FIG. 29. In step 702, the End of Trace Table pointer is initialized to the end of RAM plus 1. In step 703, the Trace Table Size is initialized to the difference between the End of Trace Table pointer and the Beginning of Trace Table pointer. This is the size allowed for trace record entries. In step 704, the Trace Table Length is initialized to the Trace Table Size plus the size of the trace table header which is 12 bytes. In step 705, the Last In Chain Pointer is initialized to the value of the Beginning of Trace Table pointer. In step 706, the Last Record pointer is initialized to the value of the Beginning of Trace Table pointer. In step 707, the Current Record pointer is initialized to the value of the Beginning of Trace Table pointer. In step 708, the Current Location pointer is initialized to the value of the Beginning of Trace Table pointer. In step 709, the backward chain pointer contained within the record pointed to by the Current Record pointer is initialized to zero. In step 710, the forward chain pointer contained within the record pointed to by the Current Record pointer is initialized to zero. In step 711, the routine returns to the Debug Init routine.

Figure 12:
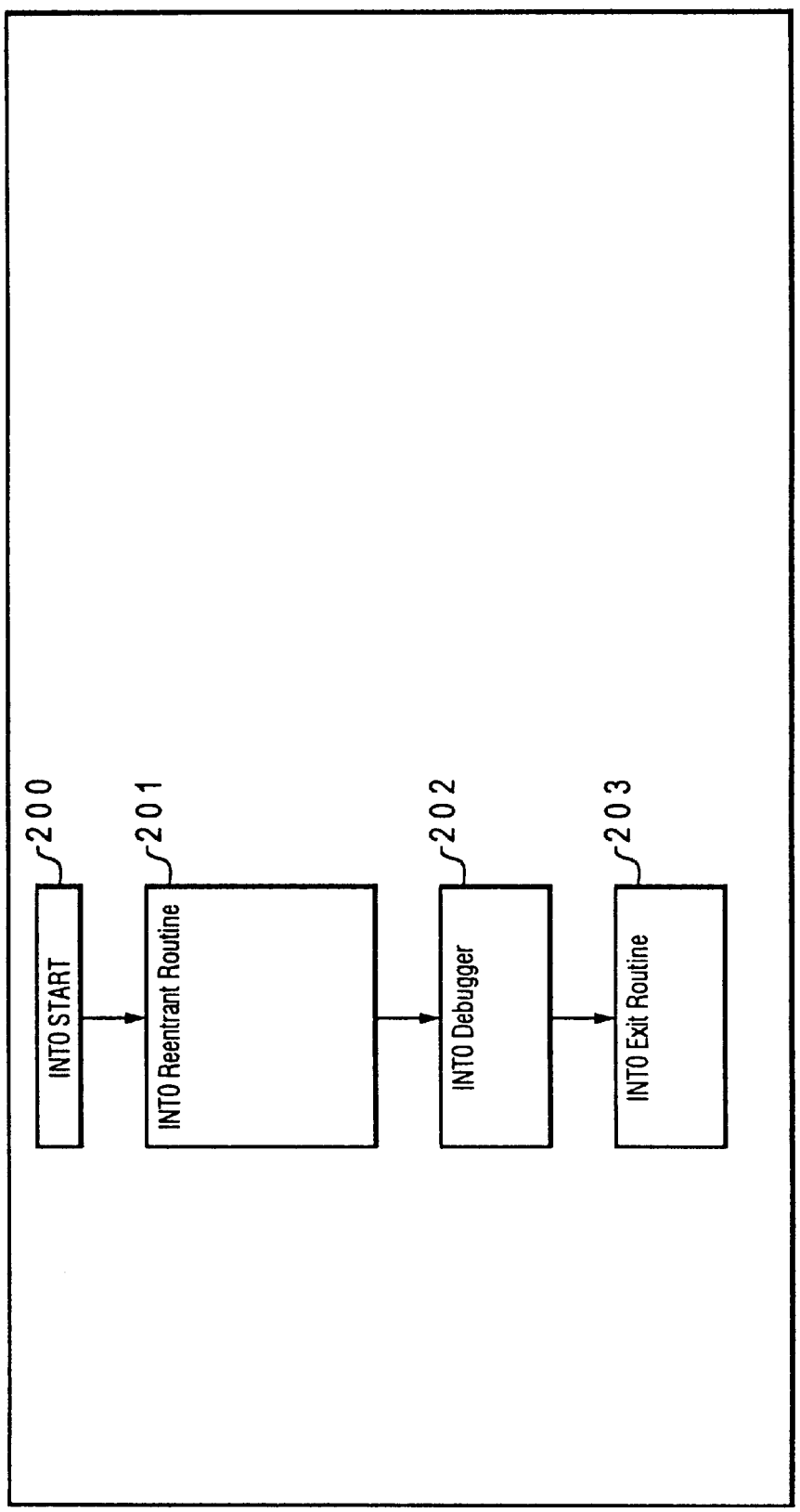
FIG. 12 is a flowchart of the INT0 Handler.

INT0 Handler routine (FIG. 12)

Referring now to FIG. 12, the INT0 interrupt handler routine is composed of 3 main functions: the INT0 Reentrant Routine 201, the INT0 Debugger Routine 202, and the INT0 Exit Routine 203. The INT0 Reentrant Routine is depicted in detail in FIG. 15 starting at step 100. The INT0 Debugger Routine is depicted in detail in FIG. 19 starting at step 800. The INT0 Exit Routine is depicted in detail in FIG. 28 starting at step 1000.

Figure 15:
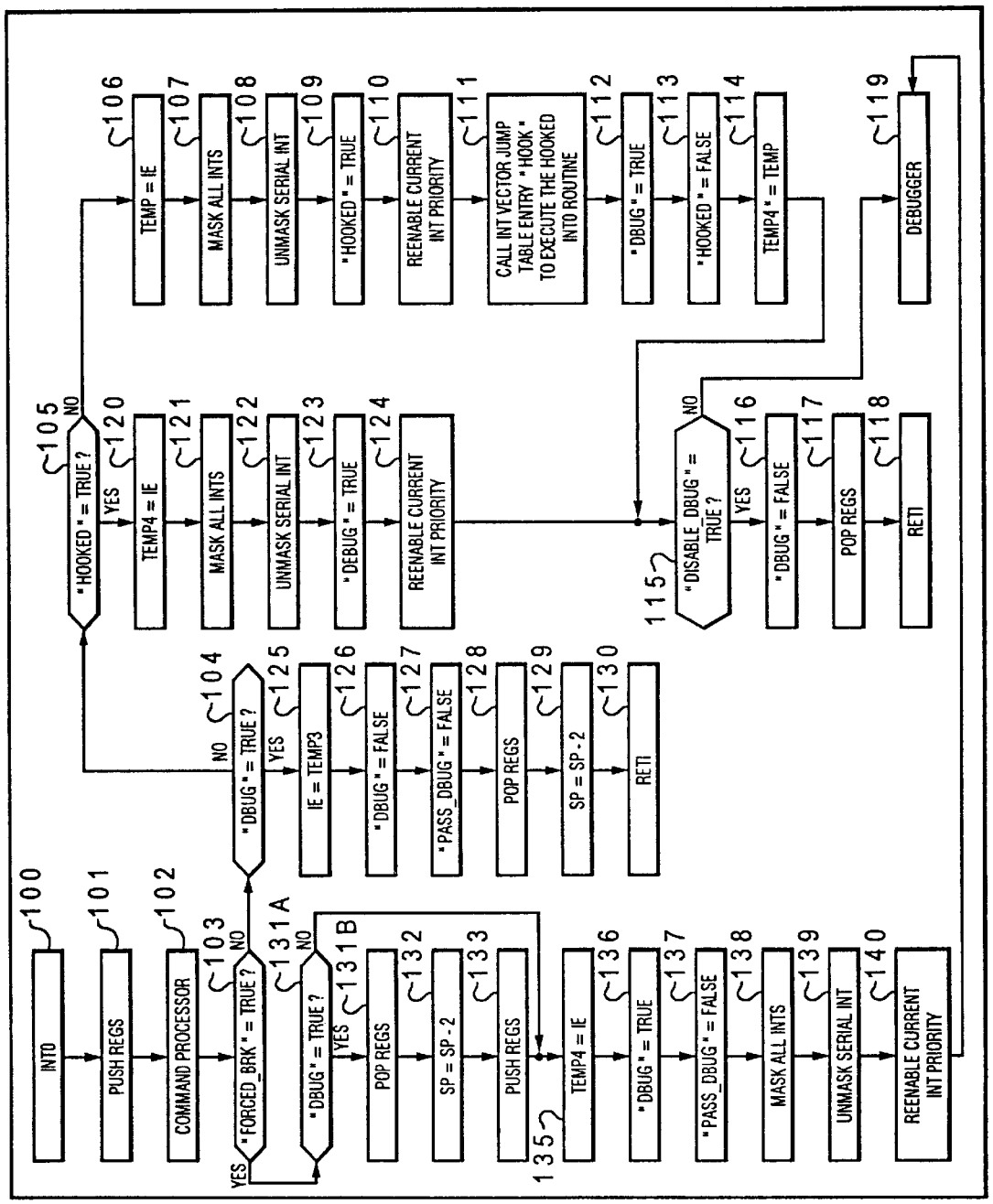
FIG. 15 is a flowchart of the INT0 Reentrant Routine.

INT0 Reentrant routine (FIG. 15)

Referring now to FIG. 15, the INT0 Reentrant Routine, step 100, is executed whenever an active enable debugger signal is present at the INT0 interrupt input pin of the microcontroller as shown in FIGS. 5 and 6, and INT0 interrupts are unmasked by a "SETB EX0" instruction. Alternately, the INT0 Reentrant Routine is executed whenever target system issues an active prototype interrupt signal as shown in FIGS. 5 and 6 and INT0 interrupts are unmasked by a "SETB EX0" instruction.

In step 101, all registers to be used by the INT0 reentrant routine and the Debugger routine are pushed onto the stack. In step 102, the Command Processor routine is called. The Command Processor processes any command received by the PC host Debugger Application.

In step 103, a flag (i.e. "FORCED_BRK") is tested for the presence of a forced break command received from the PC host Debugger Application.

If not true, in step 104 a test is performed on a flag (i.e. "DBUG") to determine whether or not a debug operation upon the target system just occurred.

If not true, in step 105 a test is performed on a flag (i.e. "HOOKED") to determine whether or not the hooked INT0 routine at entry "HOOK" within the interrupt vector jump table had been called.

If not true, in step 106 the contents of the IE register is saved in a temporary variable named TEMP.

In steps 107 and 108, all interrupts are masked off except for the serial interrupt.

In step 109, the "HOOKED" flag is set true indicating that the INT0 Reentrant routine will be calling the HOOK entry of the interrupt vector jump table.

In step 110 the current interrupt priority is reenabled by pushing the address of an instruction immediately following a RETI instruction, then executing the RETI instruction.

In step 111, a call is made to the HOOK entry of the interrupt vector jump table. The HOOK entry will either jump to the target system's INT0 handler if the target system hooked to INT0, or will jump to the INT0_HOOK routine located in the debugger bootstrap ROM. In the former case, the target system's INT0 handler when execution is completed, will jump to the INT0_HOOK routine. In either case, the function of the INT0_HOOK routine is to mask off INT0 interrupts and return to step 112 of FIG. 15.

In step 112, the "DBUG" flag is set true, indicating that the INT0 Reentrant routine will be branching to the INT0 Debugger routine.

In step 113, the "HOOKED" flag is reset to false, indicating that the call to the HOOK entry within the interrupt vector jump table is complete.

In step 114, the temporary variable, TEMP, which contains the original IE register value when the INT0 routine was first invoked, is copied to another temporary variable named TEMP4.

In step 115, a check is made to determine whether or not a Disable Debugger command was processed by the Command Processor routine. If "DISABLE_DBUG" is set true, the INT0 Reentrant routine will not branch to the INT0 Debugger routine. Instead, the "DBUG" flag will be reset to false as shown in step 116, registers will be restored from the stack as shown in step 117, and the routine will return to the target system code via a RETI instruction as shown in step 118.

In step 115, if the "DISABLE_DBUG" flag is true, the INT0 Reentrant routine will branch to the INT0 Debugger routine as shown in step 119.

Referring back to step 105 of FIG. 15, if the "HOOKED" flag is true, this indicates that the INT0 handler has been re-entered while the INT0 handler was executing step 111 and the IE register is saved in the temporary variable named TEMP4 as shown in step 120.

In steps 121 and 122, all interrupts are masked off except for serial interrupts.

In step 112, the "DBUG" flag is set true, indicating that the INT0 Reentrant routine will be branching to the INT0 Debugger routine.

In step 124 the current interrupt priority is reenabled by pushing the address of an instruction immediately following a RETI instruction, then executing the RETI instruction. The routine then executes step 115 as described above.

Referring back to step 104 of FIG. 15, if the "DBUG" flag is true, this indicates that the INT0 Debugger routine has just been executed and the INT0 Reentrant routine has been reentered to complete the exit back to the target system code.

In step 125, the IE register is restored from the TEMP3 variable. It 11 will be shown in FIG. 28 how the TEMP3 variable is set to the value of the TEMP4 variable in the Exit routine.

In step 126, the "DBUG" flag is reset to false indicating that the INT0 Debugger routine is complete.

In step 127, the "PASS_DBUG" flag is reset to false. This flag is set true by the serial interrupt handler when the serial interrupt handler is invoked, a command packet is received from the host, and the target system's code is being executed with INT0 interrupts masked off.

In step 128, registers are restored from the stack.

In step 129, the stack pointer is decremented by 2.

In step 130, the routine will return to the target system code via a RETI instruction.

Referring back to step 103 of FIG. 15, if the "FORCED_BRK" flag is true, this indicates that a forced break command packet was received by the PC Host Debugger Application.

In step 131A, if "DBUG" is true, this indicates that the INT0 Reentrant routine was reentered after the INT0 Debugger routine and INT0 Exit routine completed. In this case, steps 131B, 132, and 133 will adjust the stack, preparing the INT0 Reentrant routine for a second reentry. If in step 131A, "DBUG" is false, the routine will continue with step 135.

In step 135, the IE register value is saved in temporary variable TEMP4.

In step 136, the "DBUG" flag is set true, indicating that the INT0 Reentrant routine will be branching to the INT0 Debugger routine.

In step 137, the "PASS_DBUG" flag is reset to false because a forced break must be allowed to execute the INT0 Debugger routine algorithm.

In steps 138 and 139, all interrupts except for the serial interrupt are masked off.

In step 140 the current interrupt priority is reenabled by pushing the address of an instruction immediately following a RETI instruction, then executing the RETI instruction.

In step 119, the INT0 Reentrant routine branches to the INT0 Debugger routine.

Figure 16:
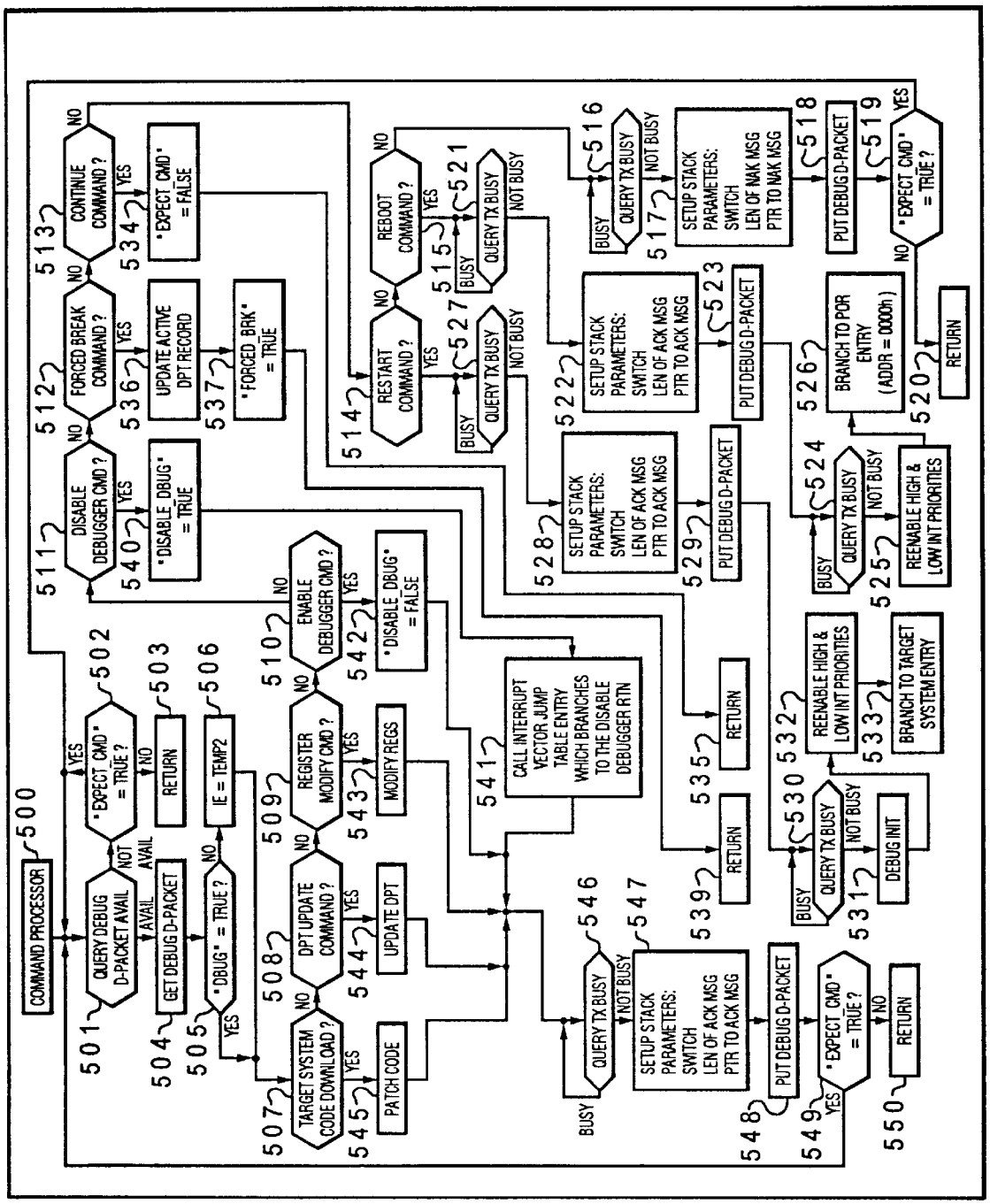
FIG. 16 is a flowchart of the INT0 Command Processor Routine.

INT0 Command Processor Routine (FIG. 16)

The Command Processor referred to in step 102 of FIG. 15 will now be described in detail. Referring now to FIG. 16, the Command Processor routine begins at step 500. The Command Processor is called by the INT0 Reentrant routine in FIG. 15 and in most cases, the Command Processor returns to the INT0 Reentrant routine.

Exceptions include the cases where a Restart command packet or a Reboot command packet are received from the PC Host Debugger application.

Referring now to step 501, the Command Processor routine queries the communication API for Debug D-packet Available. If a Debug D-packet is not available, step 502 tests the "EXPECT_CMD" flag to determine whether or not a Debug D-packet is expected. If "EXPECT_CMD" is true, then Debug D-packet is required and the Command Processor routine will loop between steps 501 and 502 until a D-packet from the PC Host Debugger Application is received. If "EXPECT_CMD" is false, the Command Processor routine returns to the INT0 Reentrant routine in FIG. 15 as shown in step 503.

If a Debug D-packet is available, step 504 will get the Debug D-packet using the communication API function Get Debug D-packet.

In step 505, if the "DBUG" flag is false, this indicates that a serial interrupt occurred and a D-packet was received from the PC Host Debugger Application. Furthermore, the serial interrupt saved the state of the IE register in a temporary variable named TEMP2 just before unmasking INT0 in order to force an INT0 reentrancy to process the D-packet just received. If "DBUG" is false in step 505, the IE register must be restored from the temporary variable TEMP2 as shown in step 506.

In step 507, if the D-packet is a "Target System Code Download" command, the code is patched in step 545. Patching code is not a unique concept to those skilled in the art of microcontroller programming. Thus the code patching procedure will not be discussed here.

If the D-packet is not a "Target System Code Download" command, then in step 508, if the D-packet is a "Debug Parameter Table Update" command, the debug parameter table is updated as shown in step 544. Updating tables is not a unique concept to those skilled in the art of microcontroller programming. Thus the debug parameter table update procedure will not be discussed here.

If the D-packet is not a "Debug Parameter Table Update" command, then in step 509, if the D-packet is a "Register Modify" command, the register or registers are modified as shown in step 543. Modifying registers is not a unique concept to those skilled in the art of microcontroller programming. Thus the modify registers procedure will not be discussed here.

If the D-packet is not a "Modify Registers" command, then in step 510, if the D-packet is an "Enable Debugger" command, the "DISABLE_DBUG" flag is reset to false in step 542. The serial interrupt handler will have already processed the Enable Debugger command by calling the interrupt vector jump table entry which jumps to the routine responsible for activating the "enable debugger" signal to the INT0 interrupt pin of the microcontroller.

If the D-packet is not an "Enable Debugger" command, then in step 511, if the D-packet is an "Disable Debugger" command, the "DISABLE_DBUG" flag is set true in step 540. Setting this flag true causes the INT0 Reentrant routine to bypass the INT0 Debugger routine as shown in step 115 of FIG. 15. Thus the Disable Debugger command allows the SUT to operate in real-time. In step 541 of FIG. 16, the Command Processor routine calls the interrupt vector jump table entry responsible for branching to the routine that deactivates the "enable debugger" signal to the INT0 interrupt pin of the microcontroller.

If the D-packet is not a "Disable Debugger" command, then in step 512, if the D-packet is a "Forced Break" command, the active debug parameters table record is updated as shown in step 536. Updating table records is not a unique concept to those skilled in the art of microcontroller programming. Thus the updating of the active debug parameter table record procedure will not be discussed here. Next, in step 537, the "FORCED_BRK" flag is set true and the Command Processor routine returns to the INT0 Reentrant routine as shown in step 539. The forced break D-packet is further processed by the INT0 Reentrant routine in FIG. 15 and the Debugger routine in FIG. 19.

If the D-packet is not a "Forced Break" command, then in step 513, if the D-packet is a "Continue" command, the flag "EXPECT_CMD" is reset to false in step 534, and the Command Processor returns to the INT0 Reentrant routine as shown in step 535.

If the D-packet is not a "Continue" command, then in step 514, if the D-packet is a "Restart" command, the Command Processor waits for transmitter not busy in step 527, then sets up the stack with the debug switch value indicating an Acknowledge message, the length of the Acknowledge message, and a pointer to the Acknowledge message as shown in step 528. In step 529, a call is made to the communication API function Put Debug D-packet. In step 530, the Command Processor waits for transmitter not busy, then calls the Debug Init routine as shown in step 531. In step 532, both high and low level interrupt priorities are reenabled. An interrupt priority is reenabled by pushing the address of an instruction immediately following a RETI instruction, then executing the RETI instruction. Next, in step 533, the Command Processor branches to the target system entry address which is typically located immediately after the interrupt vector jump table and Debugger work area in RAM.

If the D-packet is not a "Restart" command, then in step 515, if the D-packet is a "Reboot" command, the Command Processor waits for transmitter not busy in step 521, then sets up the stack with the debug switch value indicating an Acknowledge message, the length of the Acknowledge message, and a pointer to the Acknowledge message as shown in step 522. In step 523, a call is made to the communication API function Put Debug D-packet. In step 524, the Command Processor waits for transmitter not busy, then in step 525, reenables both high and low interrupt priorities. An interrupt priority is reenabled by pushing the address of an instruction immediately following a RETI instruction, then executing the RETI instruction. In step 526, the Command Processor branches to the Power On Reset vector at address 0.

If the D-packet is not a "Reboot" command, then in step 516, the Command Processor waits for transmitter not busy in step 516, then sets up the stack with the debug switch value indicating a Negative Acknowledge message, the length of the Negative Acknowledge message, and a pointer to the Negative Acknowledge message as shown in step 517. In step 518, a call is made to the communication API function Put Debug D-packet. In step 519, the Command Processor branches back to step 501 to query for Debug D-packet Available if the "EXPECT_CMD" flag is true. If the "EXPECT_CMD" flag is not true, then the Command Processor simply returns to the INT0 Reentrant routine as shown in step 520.

Referring now to step 546 of FIG. 16, if the D-packet is either a "Target System Code Download" command, "Debug Parameter Table Update" command, "Register Modify" command, "Enable Debugger" command, or "Disable Debugger" command, the Command Processor wait for transmitter not busy. Then, the Command Processor will set up the stack with the debug switch value indicating an Acknowledge message, the length of the Acknowledge message, and a pointer to the Acknowledge message as shown in step 547. In step 548, a call is made to the communication API function Put Debug D-packet. In step 549, the Command Processor branches back to step 501 to query for Debug D-packet Available if the "EXPECT_CMD" flag is true. If the "EXPECT_CMD" flag is not true, then the Command Processor simply returns to the INT0 Reentrant routine as shown in step 550.

Figure 19:
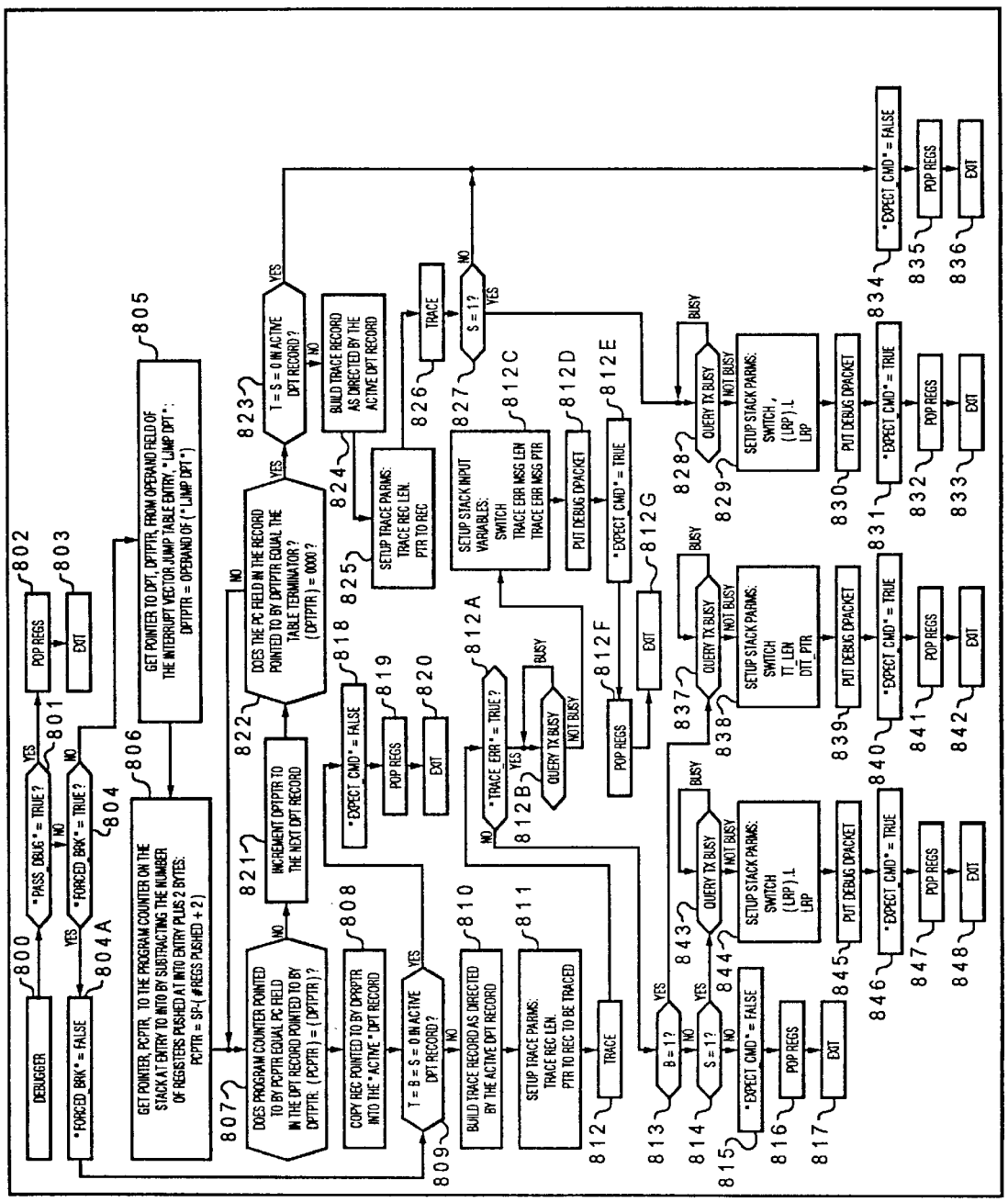
FIG. 19 is a flowchart of the INT0 Debugger Routine.

INT0 Debugger Routine (FIG. 19)

The Debugger routine shown in the high level INT0 Handler flowchart of FIG. 12, step 202, and also referred to in the INT0 Reentrant routine of FIG. 15, step 119, will now be described in detail. The INT0 Reentrant routine, FIG. 15, jumps to the Debugger routine at step 119. Referring now to the Debugger routine of FIG. 19, the Debugger routine begins at step 800.

At step 801, if the "PASS_DBUG" flag is true, this indicates that the serial interrupt handler received a Debug D-packet and recognized that the INT0 Debugger was not in progress. When "PASS_DBUG" is true, the Debugger algorithm is bypassed, registers are restored in step 802, and the routine branches to the Exit routine, in step 803. As an aside, when the serial interrupt routine recognizes that the INT0 Debugger is not in progress when a Debug D-packet is received from the PC Host Debugger Application, the serial interrupt handler sets "PASS_DBUG" to true and forces a reentrancy of INT0 so that the Command Processor routine called by the INT0 Reentrant routine will process the Debug D-packet, The method in which the serial interrupt handler forces a INT0 interrupt will be discussed in FIGS. 22 and 23.

If the "PASS DBUG" flag is false, the Debugger routine branches to step 804. If the "FORCED_BRK" flag is false, a pointer is fetched from the operand field of the interrupt vector jump table entry "LJMP DPT" which contains the pointer to the Debug Parameter Table, shown in step 805. This pointer is referred to as DPTPTR.

In step 806, the program counter, which was pushed onto the stack when the target system code was interrupted by INT0, is fetched from stack.

In step 807, the program counter that was fetched from the stack is compared to the program counter field of the Debug Parameter Table record pointed to by DPTPTR. If the pointers do not match, the DPTPTR is incremented to the next Debug Parameter Table record as shown in step 821. Next, the program counter field in the Debug Parameter Table pointed to by DPTPTR is compared to 0. If the comparison is not equal, the routine branches back to step 807. If the comparison is equal, this indicates that the end of the Debug Parameter Table has been reached and thus the active Debug Parameter Table record will not be changed, and the routine will branch to step 823.

In step 823, the T (trace) and S (Step) boolean flags within the active Debug Parameter Table record are tested for a true state. If both the T or S boolean flags are false, the "EXPECT_CMD" flag is reset to false in step 834, registers are restored in step 835, and the routine branches to the Exit routine as shown in step 836. If either the T or S boolean flags are true, a trace record is constructed according to the parameters set forth by the active Debug Parameter Table record, step 824. Next, in step 825, the trace record length and a pointer to the trace record are setup as parameters to a call to the Trace routine in step 826.

In step 827, if the S (step) boolean flag is false in the active Debug Parameter Table record, the "EXPECT_CMD" flag is reset to false in step 834, registers are restored in step 835, and the routine branches to the Exit routine as shown in step 836. If the S boolean flag is true in step 827, the Debugger routine will wait for the transmitter to become not busy by calling the communication API function Query TX Busy, as shown in step 828. When the transmitter is not busy, the parameters: debug switch field, the pointer (Last Record Pointer) to the trace record built in step 824, and the length field of the trace record pointed to by the Last Record Pointer; are pushed onto the stack as parameters as shown in step 829.

In step 830, the communication API Put Debug D-packet is called so that the trace table record can be transmitted to the PC Host. In step 831, "EXPECT_CMD" is set true, registers are restored in step 832, and the routine branches to the Exit routine in step 833.

Referring back to step 807, if the program counter that was fetched from the stack compares equal to the program counter field of the Debug Parameter Table record pointed to by DPTPTR, then the record pointed to by DPTPTR is copied into the active Debug Parameter Table record as shown in step 808.

From step 808, the Debugger routine branches to step 809. The Debugger routine also branches to step 809 as follows: Referring back to step 804, if the "FORCED_BRK" flag is true, then the "FORCED_BRK" flag is reset to false in step 804A and the routine branches to step 809.

In step 809, if the T (trace), B (break), and S (step) boolean flags are all false in the active Debug Parameters Table record, then the "EXPECT_CMD" flag is reset to false in step 818, registers are restored in step 819, and the routine branches to the Exit routine as shown in step 820.

In step 809, if either the T (trace), B (break), or S (step) boolean flags are true, then a trace record is constructed according to the parameters set forth by the active Debug Parameter Table record, step 81 0. Next, in step 811, the trace record length and a pointer to the trace record are setup as parameters to a call to the Trace routine in step 812.

In step 812A, if the "TRACE_ERR" flag was set true by the Trace routine, the Debugger routine will wait for the transmitter to become not busy by calling the communication API function Query TX Busy, as shown in step 812B. When the transmitter is not busy, the parameters: debug switch field, a pointer to the trace error message, and the length of the trace error message are pushed onto the stack as parameters as shown in step 812C. In step 812D, the communication API Put Debug D-packet is called so that the trace error message can be transmitted to the PC Host.

In step 812E, "EXPECT_CMD" is set true, registers are restored in step 812F, and the routine branches to the Exit routine in step 812G.

In step 812A, if the "TRACE_ERR" flag was reset to false by the Trace routine, the Debugger routine will test the B (break) boolean flag in step 813.

In step 813, if the B (break) boolean flag is true, the Debugger routine will wait for the transmitter to become not busy by calling the communication API function Query TX Busy, as shown in step 837. When the transmitter is not busy, the parameters: debug switch field, the trace table length (TT_LENGTH as defined in FIG. 29), and the Debug Trace Table pointer; are pushed onto the stack as parameters as shown in step 838. The Debug Trace Table pointer is fetched from the operand field of the "LJMP DTT" entry of the interrupt vector jump table depicted in FIG. 3.

In step 839, the communication API Put Debug D-packet is called so that the entire trace table can be transmitted to the PC Host. In step 840, "EXPECT_CMD" is set true, registers are restored in step 841, and the routine branches to the Exit routine in step 842.

Referring back to step 813, if the B (break) boolean flag within the active Debug Parameter Table record is false, the S (step) boolean is tested in step 814.

In step 814, if the S (step) flag within the active Debug Parameter Table record is true, then the Debugger routine will wait for the transmitter to become not busy by calling the communication API function Query TX Busy, as shown in step 843. When the transmitter is not busy, the parameters: debug switch field, the pointer (Last Record Pointer) to the trace record built in step 810, and the length field of the trace record pointed to by the Last Record Pointer; are pushed onto the stack as parameters as shown in step 844.

In step 845, the communication API Put Debug D-packet is called so that the trace table record can be transmitted to the PC Host. In step 846, "EXPECT_CMD" is set true, registers are restored in step 847, and the routine branches to the Exit routine in step 848.

Referring back to step 814, if the S (break) boolean flag within the active Debug Parameter Table record is false, then the "EXPECT_CMD" flag is reset to false in step 815, registers are restored from the stack in step 816, and the Debugger routine branches to the Exit routine as shown in step 817.

Figure 17:
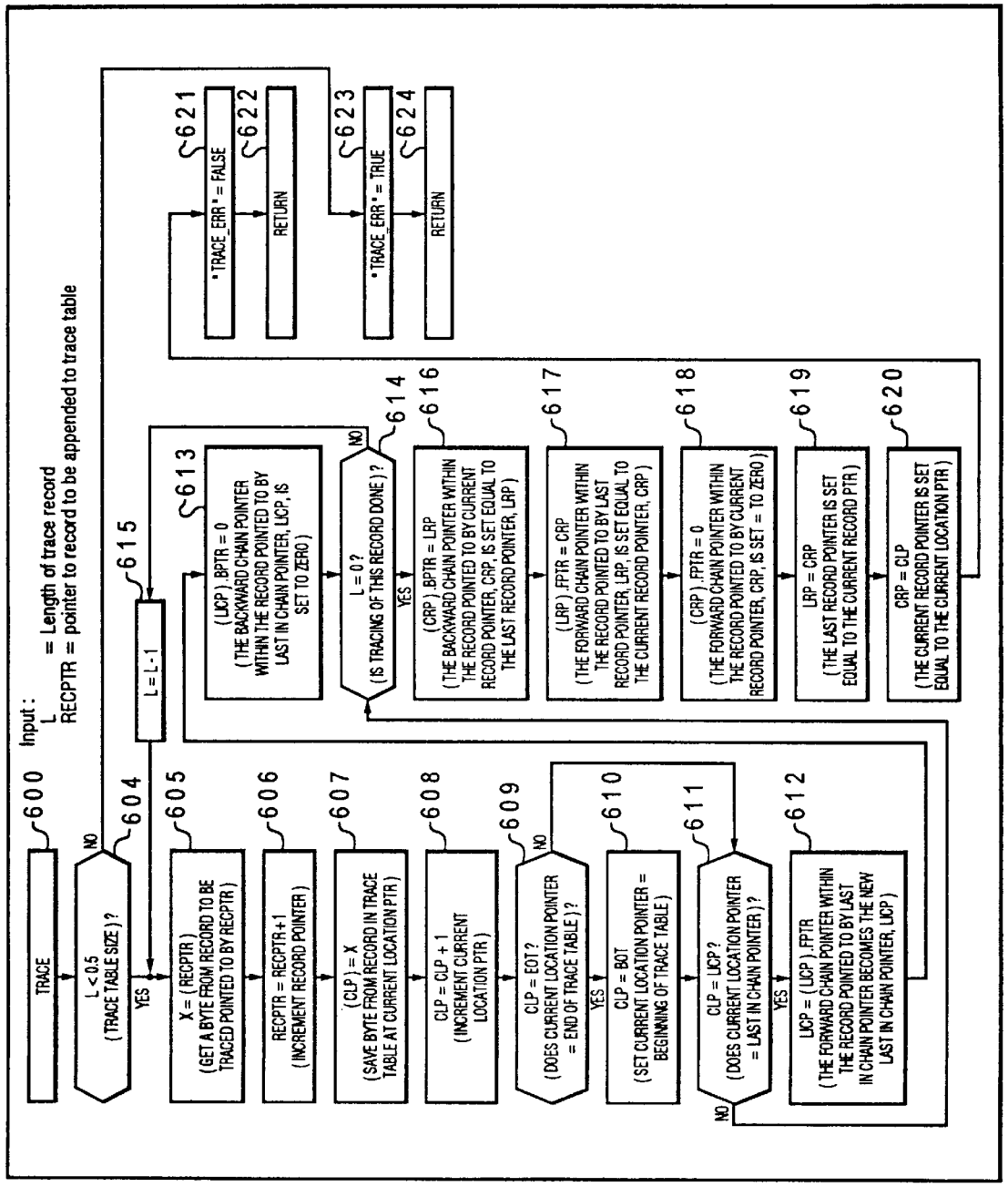
FIG. 17 is a flowchart of the INT0 Trace Routine.

INT0 Trace Routine (FIG. 17)

The Trace routine referred to in steps 812 and 826 in the Debugger routine of FIG. 19 will now be described in detail. Referring now to FIG. 17, the Trace routine begins at step 600.

In step 604, if the input length parameter, L, of the trace record to be traced is greater than or equal to one half of the trace table size, then the "TRACE_ERR" flag is set true in step 623 and the Trace routine returns to the Debugger routine as shown in step 624.

In step 604, if the input length parameter, L, of the trace record to be traced is less than one half of the trace table size, a byte is fetched from the record to be traced, in step 605. The record to be traced is pointed to by the input pointer parameter, RECPTR.

In step 606, the record pointer, RECPTR, is incremented to point to the next byte in the record to be traced.

In step 607, the byte fetched from step 605 is saved in the trace table at the location pointed to by the Current Location Pointer, CLP.

In step 608, the Current Location Pointer, CLP, is incremented.

In step 609, if the Current Location Pointer is equal to the End Of Trace pointer, EOT, then the Current Location Pointer is set equal to the Beginning Of Trace table, BOT, as shown in step 610.

If the CLP does not equal the EOT in step 609, or if the CLP was set equal to the BOT in step 610, then the CLP is compared to the Last In Chain Pointer, LICP, in step 611. If the CLP equals the LICP, then the forward chain pointer within the record pointed to by the Last In Chain Pointer becomes the new Last In Chain Pointer, as shown in step 612. In step 613, the backward chain pointer within the record pointed to by the Last In Chain Pointer is set to zero.

In step 614, the variable L is compared to zero. Step 614 is also branched to from step 611 if the Current Location Pointer did not equal the Last In Chain Pointer. If L does not equal zero, L is decremented by 1 as shown in step 615, and the Trace routine resumes at step 605. If L does equal zero in step 614, then the backward chain pointer within the record pointed to by the Current Record Pointer, CRP, is set equal to the Last Record Pointer, LRP, as shown in step 616.

In step 617, the forward chain pointer within the record pointed to by the Last Record Pointer, LRP, is set equal to the Current Record Pointer, CRP.

In step 618, the forward chain pointer within the record pointed to by the CRP is set equal to zero.

In step 619, the Last Record Pointer, LRP, is set equal to the Current Location Pointer, CLP.

In step 620, the CRP is set equal to the Current Location Pointer, CLP.

In step 621, the "TRACE_ERR" flag is reset to false and the Trace routine returns to the Debugger routine as shown in step 622.

Figure 20:
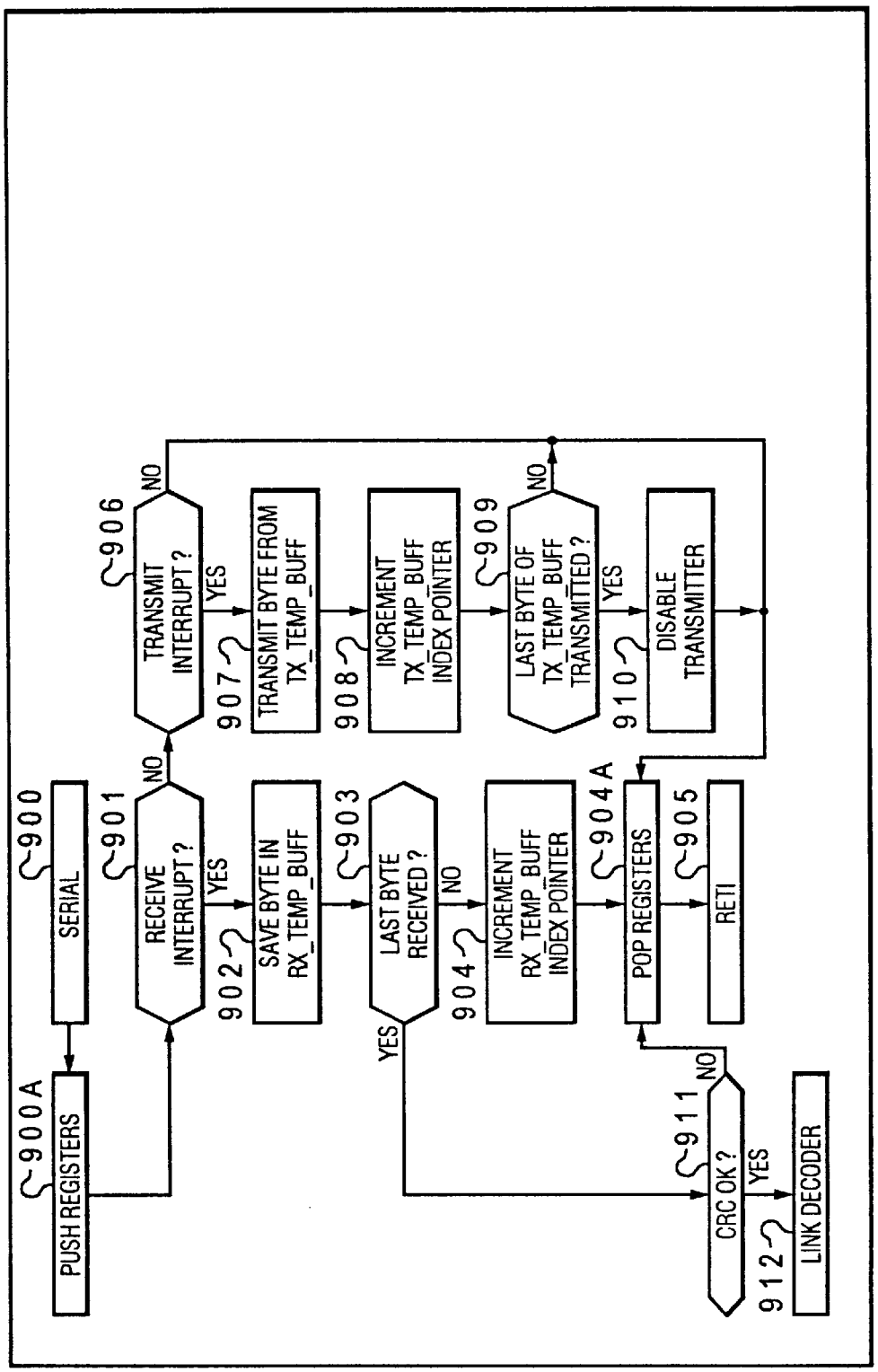
FIG. 20 is a flowchart of the Serial Link Interrupt Entry Routine.

Serial Link Interrupt Entry Routine (FIG. 20)

The serial link interrupt entry routine is depicted in FIG. 20. The entry point is at step 900. Any registers used by the serial interrupt handler are saved on the stack in step 900A.

In step 901, if the interrupt type is receive, the byte in the SBUF register is saved in a buffer named RX_TEMP_BUFF at a location pointed to by a RX_TEMP_BUFF index pointer. If this byte was not the last byte of a message, step 903, then the RX_TEMP_BUFF index pointer is incremented as shown in step 904. The serial interrupt routine then restores the registers saved on the stack, step 904A, returns from interrupt via a RETI instruction as shown in step 905. Referring back to step 903, if the byte just received is the last byte of a message, a Cyclic Redundancy Check is performed on the message, step 911. If the CRC is not good, then the serial interrupt handler restores the registers saved on the stack, step 904A, and returns from interrupt via an interrupt return instruction, RETI, as shown in step 905. If the CRC is good, then the serial link interrupt entry routine branches to the Link Decoder routine, as depicted in FIG. 21.

Referring back now to step 901, if the interrupt type was not receive, then interrupt type is checked for transmit in step 906. If the interrupt type is transmit, a byte is fetched from the TX_TEMP_BUFF at a location pointed to by the TX_TEMP_BUFF index pointer as shown in step 907 and transmitted. Next, the TX_TEMP_BUFF index pointer is incremented as shown in step 908. If the byte from the TX_TEMP_BUFF is the last byte of a message, step 909, then the transmitter is disabled as shown in step 910. Following step 910, or following step 909 if the byte from the TX_TEMP_BUFF is not the last byte of a message, the registers are restored from the stack, step 904A, and the serial interrupt handler returns from interrupt via an interrupt return instruction, RETI, as shown in step 905.

Referring back to step 906, if the interrupt type was not transmit, the registers are restored from the stack, step 904A, and the serial interrupt handler returns from interrupt via an interrupt return instruction, RETI, as shown in step 905.

Figure 21:
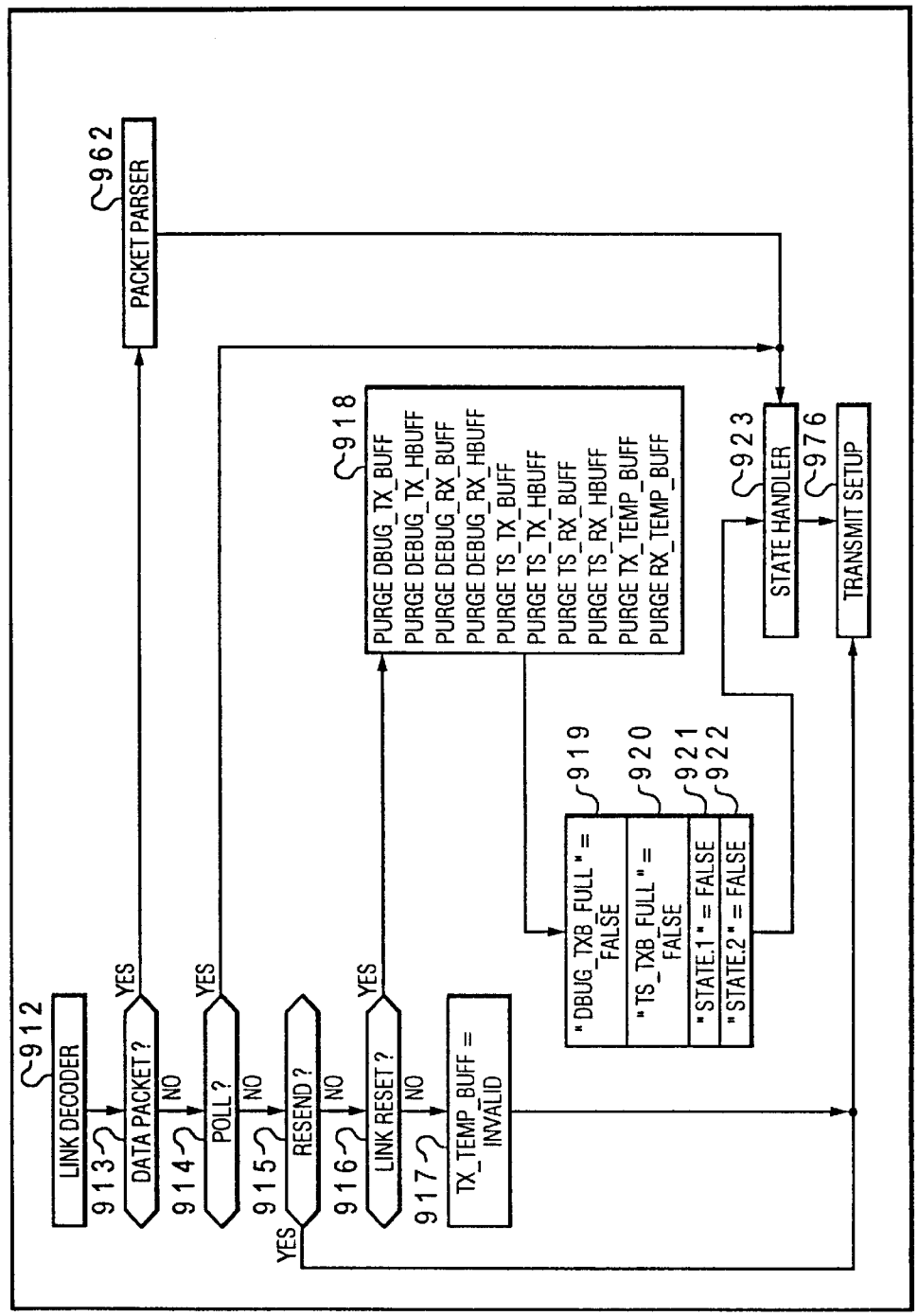
FIG. 21 is a flowchart of the Serial Link Decoder Routine.

Serial Link Decoder Routine (FIG. 21)

The Serial Link Decoder routine is depicted in FIG. 21 and is entered via a branch from the Serial Link Interrupt Entry routine, FIG. 20, step 912.

Referring now to FIG. 21, the Link Decoder routine determines whether or not the message just received is a Data packet (i.e. D-packet), as shown in step 913. If so, the Packet Parser routine is called in step 962, followed by a call to the State Handler in step 923, followed by a branch to the Transmit Setup routine in step 976.

If the message just received is not a D-packet, the Link Decoder determines whether or not the message is a Poll command in step 914. If so, the State Handler is called in step 923, followed by a branch to the Transmit Setup routine in step 976.

If the message just received is not a Poll command, the Link Decoder determines whether or not the message is a Resend command in step 915. If so, the Link Decoder routine branches to the Transmit Setup routine in step 976.

If the message just received is not a Resend command, the Link Decoder determines whether or not the message is a Link Reset command in step 916. If so, the following communications API buffers are purged in step 918: DBUG_TX_BUFF (debug transmit buffer), DBUG_TX_HBUFF (debug transmit holding buffer), DBUG_RX_BUFF (debug receive buffer), DBUG_RX_HBUFF (debug receive holding buffer), TS_TX_BUFF (target system transmit buffer), TS_TX_HBUFF (target system transmit holding buffer), TS_RX_BUFF (target system receive buffer), TS_RX_HBUFF (target system receive holding buffer), TX_TEMP_BUFF (serial link transmit buffer), and RX_TEMP_BUFF (serial link receive buffer).

Furthermore, in steps 919 through 922, the following flags are reset: DBUG_TXB_FULL (debug transmit buffer full), TS_TXB_FULL (target system transmit buffer full), STATE.1 (used by the Packet Parser routine to indicate a Debug D-packet has been received), and STATE.2 (used by the Packet Parser routine to indicate a Target System D-packet has been received). Next, the State Handler is called in step 923, followed by a branch to the Transmit Setup routine in step 976.

If the message just received is not a Link Reset command, the TX_TEMP_BUFF is loaded with an "invalid command" message in step 917, followed by a branch to the Transmit Setup routine in step 976.

Figure 22:
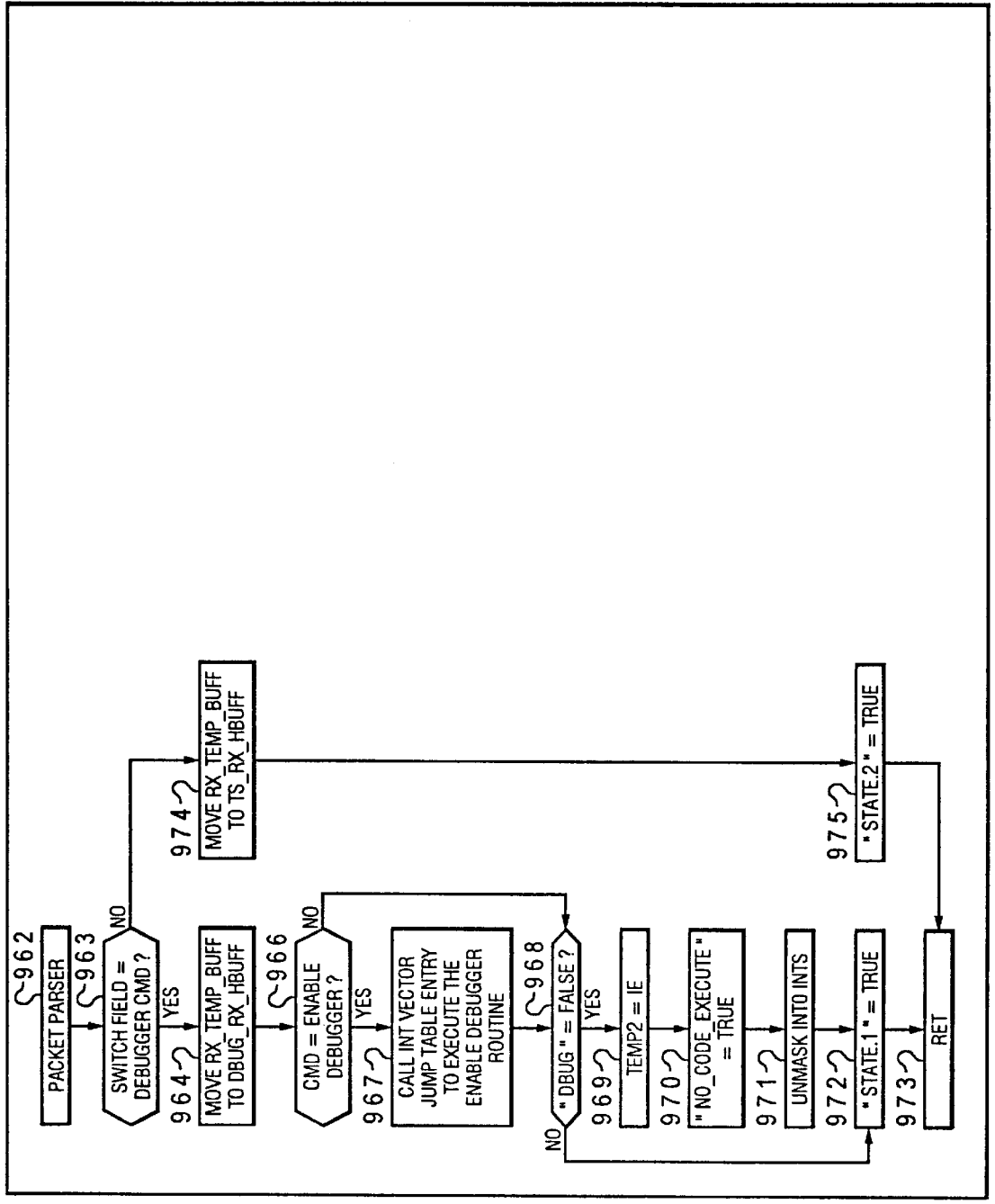
FIG. 22 is a flowchart of the Serial Link Packet Parser Routine.

Serial Link Packet Parser Routine (FIG. 22)

The Serial Link Packet Parser routine is depicted in FIG. 22 and is entered via a call from the Serial Link Decoder routine, FIG. 21, step 962.

Referring now to FIG. 22, the Packet Parser routine determines whether or not the debug switch field contained within the D-packet indicates that the message is a debugger command or a target system message as shown in step 963.

If in step 963, the Packet Parser routine determines that the D-packet is a target system D-packet, then the contents of the RX_TEMP_BUFF are copied to the target system receive holding buffer TS_RX_HBUFF in step 974, the STATE.2 flag is set true in step 975, and the Packet Parser routine returns to the Link Decoder routine in step 973.

If in step 963, the Packet Parser routine determines that the D-packet is a debug D-packet, then the contents of the RX_TEMP_BUFF are copied to the debug receive holding buffer DBUG_RX_HBUFF in step 964.

Next, in step 966, the Packet Parser routine determines whether or not the debug D-packet is an Enable Debugger command. If so, the Packet Parser routine calls the interrupt vector jump table entry "LJMP ED" to execute the enable debugger routine, as shown in step 967.

Following step 967, or following step 966 if the debug D-packet was not an Enable Debugger command, the Packet Parser routine determines whether or not the INT0 Debugger routine is in progress in step 968. If in step 968, the "DBUG" flag is false (indicating that the INT0 Debugger routine is not in progress), then the IE register is saved in a temporary variable, TEMP2, in step 969. Then in step 970, the "NO_CODE_EXECUTE" flag is set true. Then in step 971, INT0 interrupts are unmasked via a "SETB EX0" instruction.

Following step 971, or following step 968 if the "DBUG" flag is true, the Packet Parser routine sets the "STATE.1" flag true in step 972, which indicates that the RX_TEMP_BUFF was copied to the debug receive holding buffer, DBUG_RX_HBUFF. The Packet Parser routine then returns to the Link Decoder routine in step 973.

Figure 24:
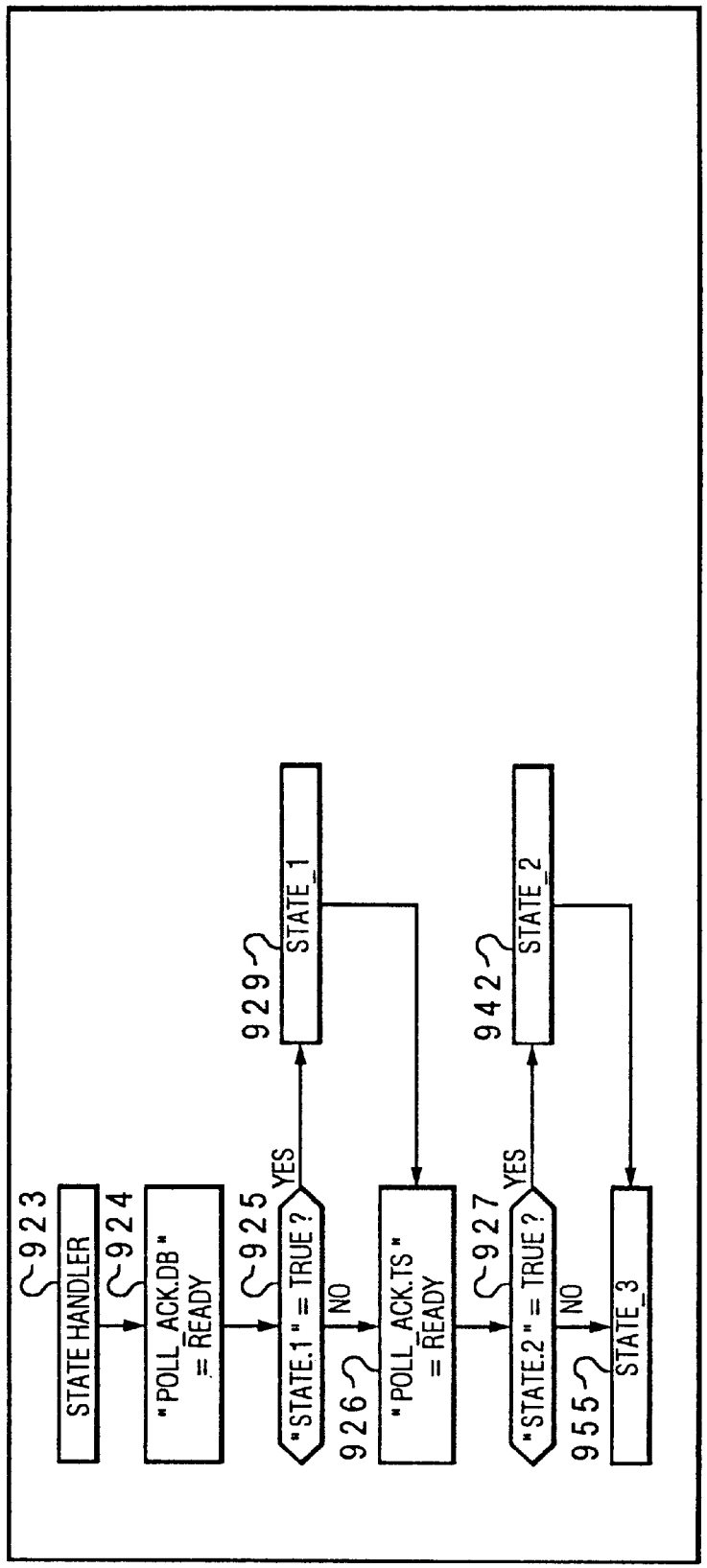
FIG. 24 is a flowchart of the Serial Link State Handler Routine.

Serial Link State Handler Routine (FIG. 24)

The Serial Link State Handler routine is depicted in FIG. 24 and is entered via a call from the Serial Link Decoder routine, FIG. 21, step 923.

Referring now to FIG. 24, the State Handler routine sets the Debug Poll Acknowledge flag "POLL_ACK.DB" to "READY" (i.e. true state) in step 924.

In step 925, the State Handler determines whether or not the "STATE.1" flag is true. If true, the State_1 routine is called in step 929.

Following step 929, or following step 925 if the "STATE.1" flag was false, the State Handler routine sets the target system Poll Acknowledge flag "POLL_ACK.TS" to "READY" (i.e. true state) in step 926.

In step 927, the State Handler determines whether or not the "STATE.2" flag is true. If true, the State_2 routine is called in step 942.

Following step 942, or following step 927 if the "STATE.2" flag was false, the State Handler routine branches to the State_3 routine in step 955.

Figure 25:
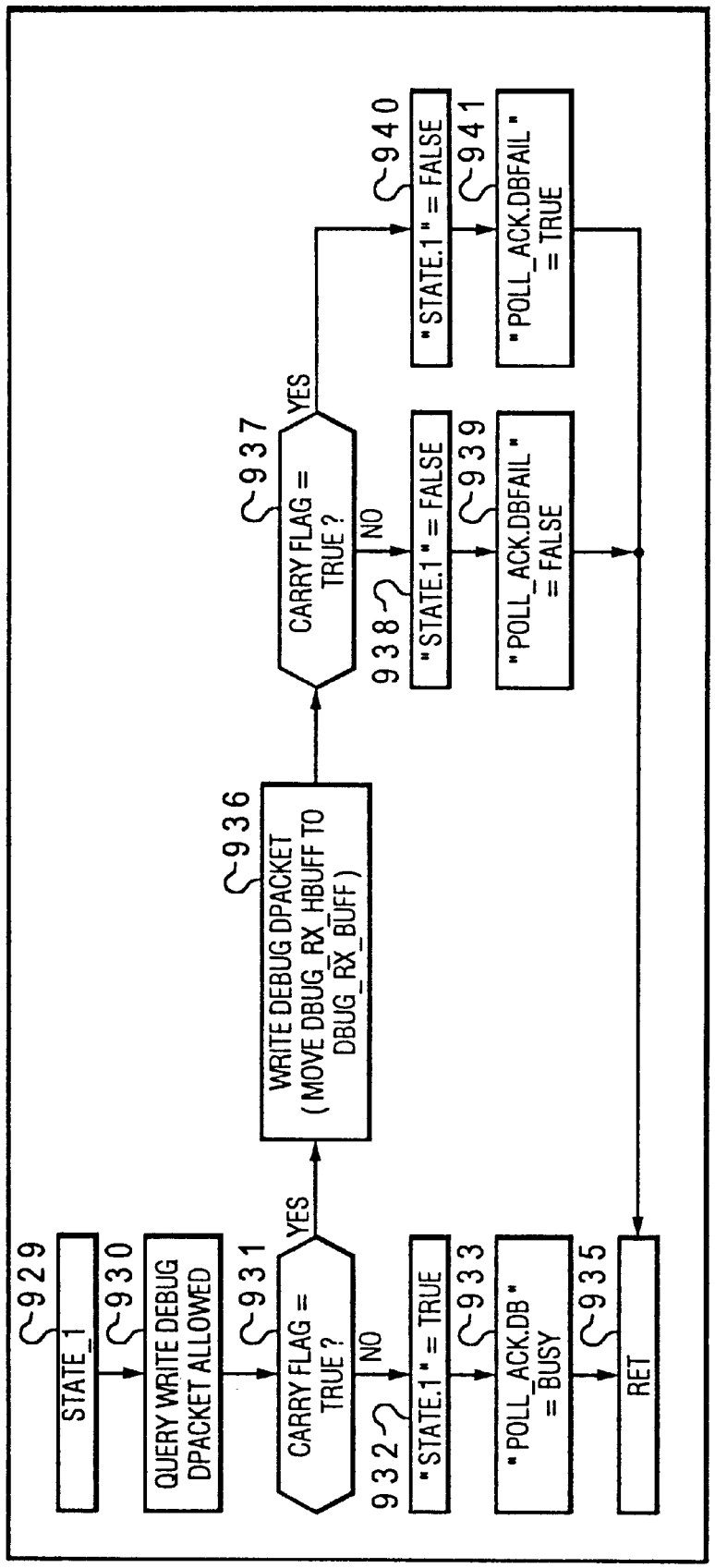
FIG. 25 is a flowchart of the Serial Link State 1 Routine.

Serial Link State-1 Routine (FIG. 25)

The Serial Link State-1 routine is depicted in FIG. 25 and is entered via a call from the Serial Link State Handler routine, FIG. 24, step 929.

Referring now to FIG. 25, the Serial Link State-1 routine determines whether or not the communication API can accept a debug D-packet received from the PC Host by calling the communication API function Query Write Debug D-packet Allowed, as shown in step 930. If this API function returns the carry flag false, in step 931, the State-1 routine will set the "STATE.1" flag true in step 932, set the Debug Poll Acknowledge flag "POLL_ACK.DB" to "BUSY" (i.e. false state) in step 933, then return to the State Handler routine as shown in step 935.

Referring back to step 931, if the Query Write Debug D-packet Allowed communication API function returned the carry flag true, then the State-1 routine calls the communication API function Write Debug D-packet in step 936. This API function will attempt to copy the DBUG_RX_HBUFF contents to the DBUG_RX_BUFF buffer. If this API function returns the carry flag true in step 937, the State-1 routine will reset the "STATE.1" flag to false in step 940, then set the Debug Poll Acknowledge Write Failure flag "POLL_ACK.DBFAIL" to true, in step 941, indicating that Write Debug D-packet API function failed to copy the contents of the DBUG_RX_HBUFF to the DBUG_RX_BUFF buffer. Next, in step 935, the State-1 routine returns to the State Handler routine.

Referring back to step 937, if the Write Debug D-packet API function returned the carry flag false, the State-1 routine will reset the "STATE.1" flag to false in step 938, then reset the Debug Poll Acknowledge Write Failure flag "POLL_ACK.DBFAIL" to false, in step 939, indicating that Write Debug D-packet API function successfully copied the contents of the DBUG_RX_HBUFF to the DBUG_RX_BUFF buffer. Next, in step 935, the State-1 routine returns to the State Handler routine.

Figure 26:
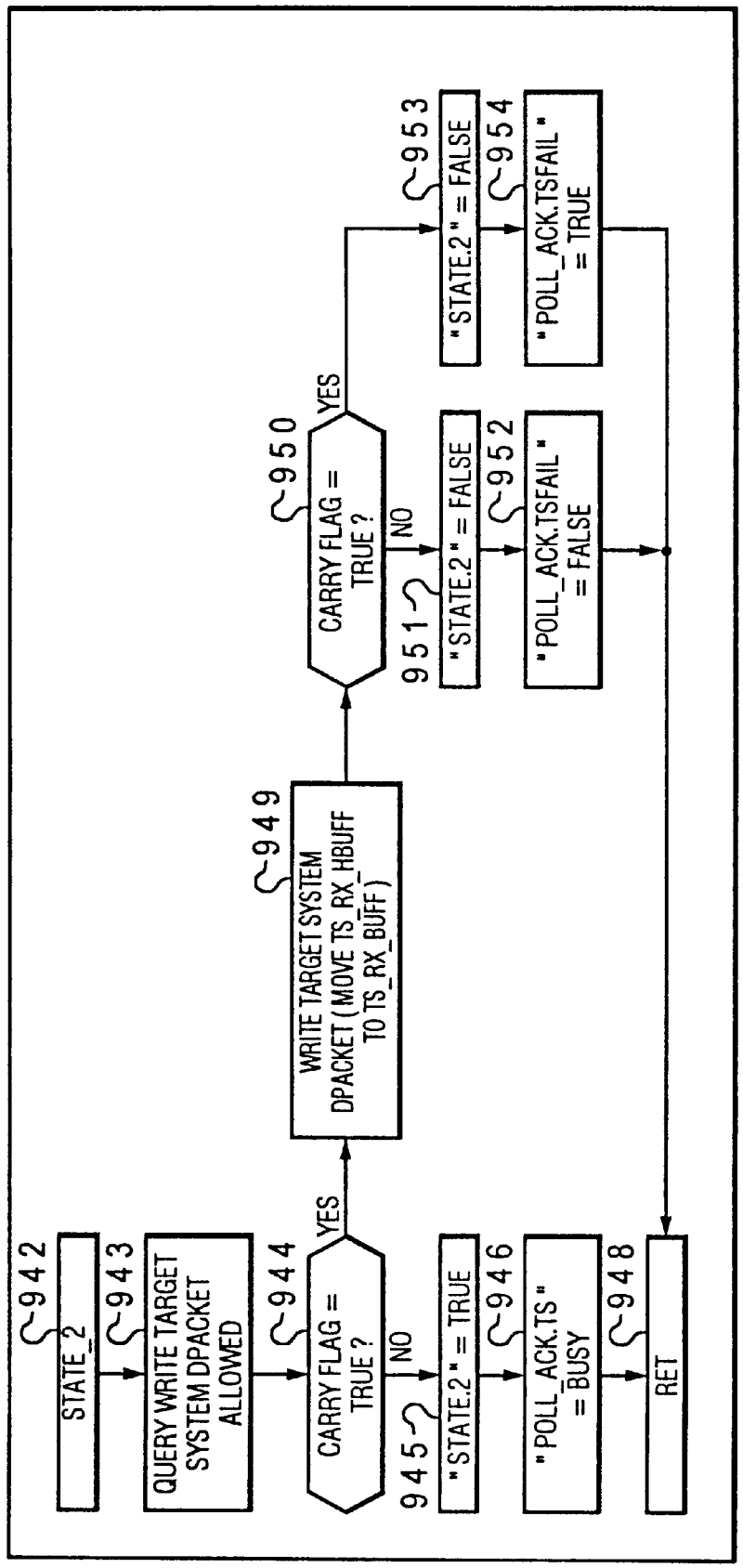
FIG. 26 is a flowchart of the Serial Link State 2 Routine.

Serial Link State-2 Routine (FIG. 26)

The Serial Link State-2 routine is depicted in FIG. 26 and is entered via a call from the Serial Link State Handler routine, FIG. 24, step 942.

Referring now to FIG. 26, the Serial Link State-2 routine determines whether or not the communication API can accept a target system D-packet received from the PC Host by calling the communication API function Query Write Target System D-packet Allowed, as shown in step 943. If this API function returns the carry flag false, in step 944, the State-2 routine will set the "STATE.2" flag true in step 945, set the Target System Poll Acknowledge flag "POLL_ACK.TS" to "BUSY" (i.e. false state) in step 946, then return to the State Handler routine as shown in step 948.

Referring back to step 944, if the Query Write Target System D-packet Allowed communication API function returned the carry flag true, then the State-2 routine calls the communication API function Write Target System D-packet in step 949. This API function will attempt to copy the TS_RX_HBUFF contents to the TS_RX_BUFF buffer. If this API function returns the carry flag true in step 950, the State-2 routine will reset the "STATE.2" flag to false in step 953, then set the Target System Poll Acknowledge Write Failure flag "POLL_ACK.TSFAIL" to true, in step 954, indicating that Write Target System D-packet API function failed to copy the contents of the TS_RX_HBUFF to the TS_RX_BUFF buffer. Next, in step 948, the State-2 routine returns to the State Handler routine.

Referring back to step 950, if the Write Target System D-packet API function returned the carry flag false, the State-2 routine will reset the "STATE.2" flag to false in step 951, then reset the Target System Poll Acknowledge Write Failure flag "POLL_ACK.TSFAIL" to false, in step 952, indicating that Write Target System D-packet API function successfully copied the contents of the TS_RX_HBUFF to the TS_RX_BUFF buffer. Next, in step 948, the State-2 routine returns to the State Handler routine.

Figure 27:
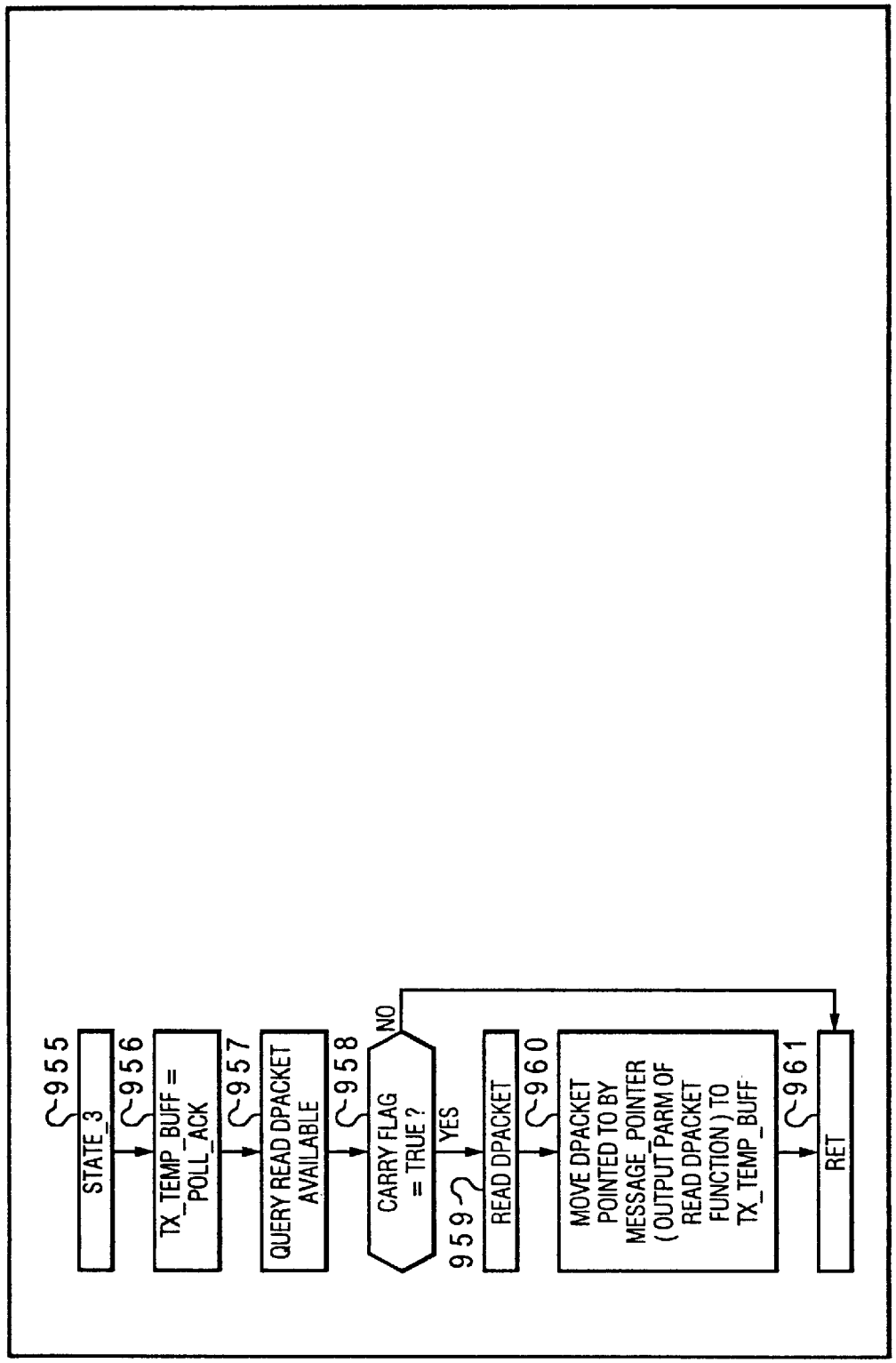
FIG. 27 is a flowchart of the Serial Link State 3 Routine.

Serial Link State-3 Routine (FIG. 27)

The Serial Link State-3 routine is depicted in FIG. 27 and is entered via a jump from the Serial Link State Handler routine, FIG. 24, step 955.

Referring now to FIG. 27, the Serial Link State-3 routine loads the TX_TEMP_BUFF buffer with the POLL ACK Link Control byte in step 956. This control byte contains the POLL_ACK.DB, POLL_ACK.DBFAIL, POLL_ACK.TS, and POLL_ACK.TSFAIL bits set or reset according to the outcome of the State-1 or State-2 routines.

In step 957, the State-3 routine determines whether or not a D-packet is available for transmission to the PC Host by calling the Query Read D-packet Available communication API function. If the API function returns the carry flag false in step 958, the State-3 routine simply returns to the Link Decoder routine from the call to State Handler in step 923 of FIG. 21. Otherwise, the State-3 routine will call the communication API function Read D-packet in step 959. This API function returns a pointer to a message to be transmitted to the PC Host. The State-3 routine then moves the D-packet pointed to by the return pointer of the Read D-packet API function to the TX_TEMP_BUFF buffer, as shown in step 960. Then the State-3 routine returns to the Link Decoder routine from the call to State Handler in step 923 of FIG. 21.

Figure 23:
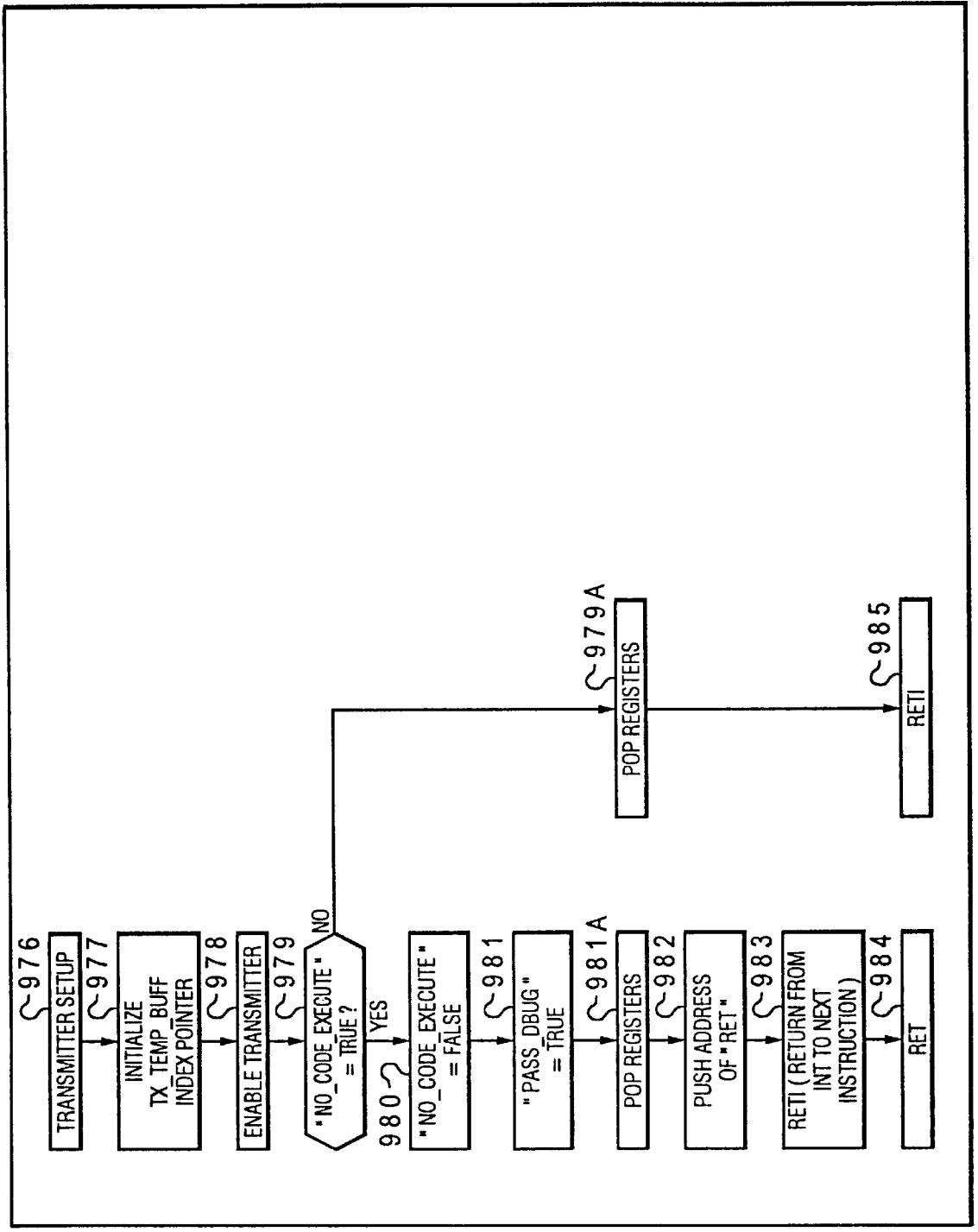
FIG. 23 is a flowchart of the Serial Link Transmitter Setup Routine.

The Serial Link Transmitter Setup Routine (FIG. 23)

The Serial Link Transmitter Setup routine is depicted in FIG. 23 and is entered via a jump from the Serial Link Decoder routine, FIG. 21, step 976.

Referring now to FIG. 23, the Serial Link Transmitter Setup routine initializes the TX_TEMP_BUFF index pointer in step 977 and enables the transmitter in step 978. Next, in step 979, the Transmitter Setup routine determines whether or not the "NO_CODE_EXECUTE" flag is true. If true, the "NO_CODE_EXECUTE" flag is reset to false in step 980, the PASS_DBUG" flag is set to true in step 981, the registers are restored from the stack in step 981A, and the current priority interrupt is reenabled in steps 982 and 983. This is accomplished by pushing the address of a return instruction onto the stack, step 982, then returning from interrupt to the RET instruction, step 983. Finally, in step 984, the Serial Interrupt Handler issues a return instruction. When the return instruction in step 984 completes, an immediate interrupt to the INT0 Handler is performed.

Referring back to step 979, if the "NO_CODE_EXECUTE" flag is false, then the registers are restored in step 979A, and the Transmitter Setup routine returns from interrupt with a RETI instruction in step 985 to complete the Serial Interrupt Handler.

Figure 28:
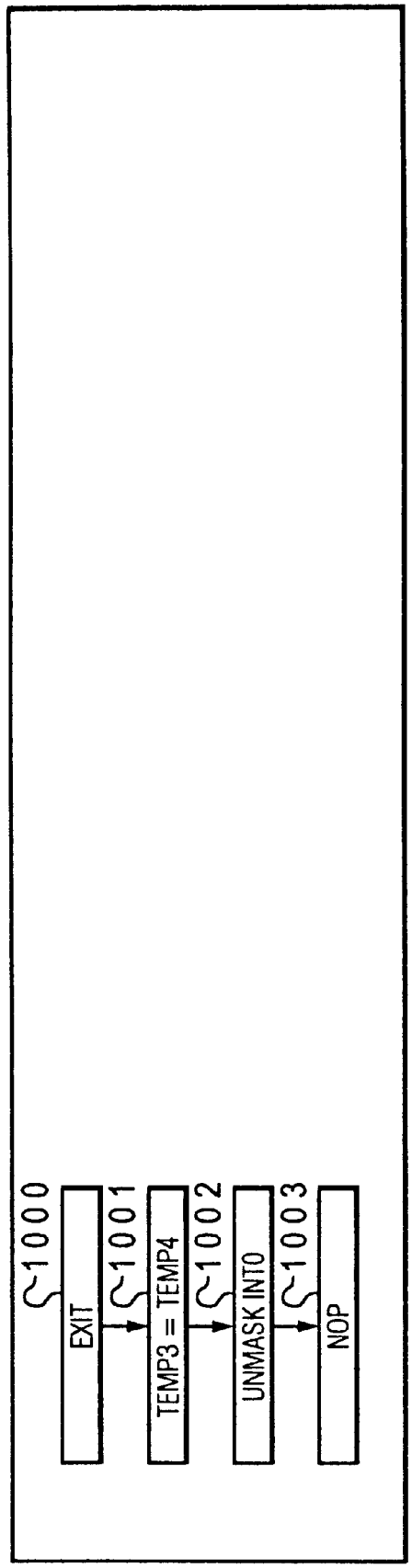
FIG. 28 is a flowchart of the INT0 Exit Routine.

INT0 Exit Routine (FIG. 28)

The INT0 Exit routine in step 203 of FIG. 12 is jumped to from the INT0 Debugger routine in step 202 of FIG. 12. FIG. 19 depicted in detail how the INT0 Debugger branches to the Exit routine.

Referring now to FIG. 28, the Exit routine will copy the temporary variable TEMP4 to temporary variable TEMP3 in step 1001, then unmask INT0 interrupts via a "SETB EX0" instruction in step 1002. Finally, a no-operation instruction, NOP, is performed in step 1003. This is necessary to allow the INT0 Handler to be reentered without returning to the target system code. The INT0 Reentrant routine will accomplish the actual return to the target system code.

The Communication API supports the following 13 functions:

1. Put Debug D-packet

Description

This function is used by the present invention INT0 Debugger Routine to send synchronous or asynchronous status to the PC host. Prior to invoking this function, the caller must first have received a "transmit not busy" response from the "Query Transmit Busy" API function. The caller of this function must push a 2 byte pointer to the message to be transmitted, a 2 byte length of the message to be transmitted, and a 1 byte value to be used in the Debug Switch field of the message.

Input 2 byte pointer to the message to be transmitted. This pointer is located at SP-3. The message will consist of the $Length_{Data}$ low and high bytes and the Data field.

The 2 byte length of the message to be transmitted. This value is located at SP-5.

The 1 byte Debug Switch field to be appended to the message. This value is located at SP-6. Bits 7 and 6 will indicate that the message is from the INT0 Debugger. In addition, bits 5 through 0 will further specify the type response contained within the Data field. (See FIG. 30 for details).

Function

This API procedure will first load the Link Control Byte (LCB) into the Debug Transmit Buffer. The message pointed to by the input pointer parameter is then copied to the Debug Transmit Buffer at byte offset 4. The Length Message field is set equal to the input length parameter and is copied to the Debug Transmit Buffer at byte offset 1. The input switch value is copied to Debug Transmit Buffer byte offset 3. Truncation of the message will occur if the message pointed to by the input pointer parameter contains either a trace record or trace table that is larger than the Debug Transmit Buffer. If this occurs, the Length Message field in the message will be decreased to reflect the truncated size while the Length Data field will remain as is. The amount of data truncated can be determined by the PC Host 10 using the formula: $Length_{Data} - (Length_{Message} - 3)$.

The Host can take appropriate steps to either reduce the amount of information that is contained in a trace record by changing the Debug Parameter Table (DPT) with an Update Debug Parameter Table command, or change the size of the trace table by reassembling the target system source code and rebooting so that further truncated messages do not occur. The operation of the present invention debugger will not be affected by truncation which might occur in this API procedure. The cyclic redundancy check (CRC) is computed by this procedure and appended to the end of the message in the Debug Transmit Buffer. This procedure also sets the Debug Transmit Buffer Full ("DBUG_TXB_FULL") flag.

Output

None

2. Put Target System D-packet.
   Description
   This function is used by the target system code 40 to send messages to the PC Host Target system 11 application. Prior to invoking this function, the caller must first have received a "transmit not busy" response from the "Query Transmit Busy" API function. The caller of this function must first push a 2 byte pointer to the message to be transmitted, a 2 byte length of the message to be transmitted, and a 1 byte value to be used in the Debug Switch field.

Input
   2 byte pointer to the message to be transmitted. This pointer is located at SP-3. The message will consist of the $Length_{Data}$ low and high bytes and the Data field.

The 2 byte length of the message to be transmitted. This value is located at SP-5.

The value of the 1 byte debug switch field to be appended to the message. This value is located at SP-6. Bits 7 and 6 will indicate that the message is from the target system code 40. In addition, user customizable bits 5 through 0 will further specify the type data contained within the Data field. (See FIG. 30 for details).

Function
   This API procedure will first load the Link Control Byte (LCB) into the Target System Transmit Buffer. The message pointed to by the input pointer parameter is then copied to the Target System Transmit Buffer at byte offset 4. The Length Message field is set equal to the input length parameter and is copied to the Target System Transmit Buffer at byte offset 1. Truncation of the message will occur if the target system code 40 message pointed to by the input pointer parameter is larger than the Target System Transmit Buffer. If this occurs, the Length Message field in the message will be decreased to reflect the truncated size while the Length Data field will remain as is. The amount of data truncated can be determined by PC host using the formula: $Length_{Data} - (Length_{Message} - 3)$. The output of this API will indicate whether a truncation occurred or not. The cyclic redundancy check (CRC) is computed by this procedure and appended to the end of the message in the Target System Transmit Buffer. This procedure also sets the Target System Transmit Buffer ("TS_TXB_FULL") flag.

Output
   Carry Flag=1 (truncation occurred)
   Carry Flag=0 (no truncation occurred)

3. Get Debug D-packet
   Description
   This function returns a pointer to the D-packet received by the serial link communications code. The D-packet will have the debug switch field set to "Command from PC Host Debugger Application". Prior to invoking this function, the caller must first have received a "Debug D-packet available" response from the "Query Debug D-packet Available" API function. When calling this function, the caller must first push 2 bytes onto the stack in order to create a "hole" in the stack for the return pointer parameter.

Input
   Any 2 bytes pushed onto the stack located at SP-3.

Function
   This API procedure copies the contents of the Debug Receive Buffer to the Debug Receive Working Buffer, then returns to the caller a pointer pointing to the Debug Receive Working Buffer. The Debug Receive Working Buffer will contain the Debug Switch Field (offset 0), $Length_{Data}$ low byte (offset 1), $Length_{Data}$ high byte (offset 2), and the Data field (offset 3). The Link Control Byte, the $Length_{Message}$ low and high bytes, and the CRC byte will have been removed by the serial link code prior to placing the data into the Debug Receive Buffer via the "Write Debug D-packet" API function. The "Get Debug D-packet" API procedure resets the Debug Receive Buffer Available ("DBUG_RXB_AVAIL") flag which frees the Debug Receive Buffer for use by the serial link code while the INT0 Handler processes the data within the Debug Receive Working Buffer.

Output
   Pointer to the Debug Receive Working Buffer

4. Get Target System D-packet
   Description
   This function returns a pointer to the D-packet received by the serial link communications code. The D-packet will have the debug switch field set to "Target System D-packet". Prior to invoking this function, the caller must first have received a "Target System D-packet available" response from the "Query Target System D-packet Available" API function. When calling this function, the caller must first push 2 bytes onto the stack in order to create a "hole" in the stack for the return pointer parameter.

Input
   Any 2 bytes pushed onto the stack located at SP-3.

Function
   This API procedure copies the contents of the Target System Receive Buffer into the Target System Receive Working Buffer, then returns a pointer to the Target System Receive Working Buffer. The Target System Receive Working Buffer will contain the Debug Switch Field (offset 0), $Length_{Data}$ low byte (offset 1), $Length_{Data}$ high byte (offset 2), and the Data field (offset 3). The Link Control Byte, the $Length_{Message}$ low and high bytes, and the CRC byte will have been removed by the serial link code prior to placing the data into the Target System Receive Buffer via the "Write Target System D-packet" API function. This function resets the Target System Receive Buffer Available ("TS_RXB_AVAIL") flag which frees the Target System Receive Buffer for use by the serial link code while the target system processes the data within the Target System Receive Working Buffer.

Output
   Pointer to the Target System Receive Working Buffer.

5. Query Transmit Busy
   Description
   This function is used by the INT0 Handler and the Target System code to determine whether a D-packet can be placed in the Communication API for transmission. The INT0 Handler or Target system code 40 must wait for a "transmit not busy" response from this API function before a D-packet can be "put" using the "Put Debug D-packet" API function or "Put Target System D-packet" API function respectively.

Input
  None
Function
  This API procedure will logical OR the Debug Transmit Buffer Full ("DBUG_TXB_FULL") flag and the Target System Transmit Buffer Full ("TS_TXB_FULL") flag together and place the result into the "TX_BUSY" flag. "TX_BUSY" is placed into the 8031 carry flag before returning to the caller.
Output
  Carry Flag=1 (transmitter busy, no "Put" API function allowed)
  Carry Flag=0 (transmitter not busy, "Put" API function allowed).

6. Query Debug D-packet Available
Description
  This function is used by the INT0 Handler to determine whether a Debug D-packet is available or not.
Input
  None
Function
  This API procedure will copy the "DBUG_RXB_AVAIL" flag into the 8031 carry flag. If this flag is true, the caller may invoke the "Get Debug D-packet" API function.
Output
  Carry Flag=1 (Debug D-packet available)
  Carry Flag=0 (Debug D-packet not available)

7. Query Target System D-packet Available
Description
  This function is used by the Target system code 40 to determine whether a Target System D-packet is available or not.
Input
  None
Function
  This API procedure will copy the "TS_RXB_AVAIL" flag into the 8031 carry flag. If this flag is true, the caller may invoke the "Get Target System D-packet" API function.
Output
  Carry Flag=1 (Target System D-packet available)
  Carry Flag=0 (Target System D-packet not available)

8. Query Write Debug D-packet Allowed
Description
  This function is used by the serial link level code 35 to determine whether the Debug Receive Buffer is available in the communication API for a Debug D-packet from the PC Host 10. If the Debug Receive Buffer is available, this function will return an "Allowed" response to the caller.
Input
  None
Function
  This API procedure will query the Debug Receive Buffer Available ("DBUG_RXB_AVAIL") flag. If "DBUG_RXB_AVAIL" is true, this implies that the INT0 Debugger has not yet issued a "Get Debug D-packet" API call to free the Debug Receive Buffer. As a result, this procedure will return a "not allowed" status in the 8031 carry flag. If "DBUG_RXB_AVAIL" is false, this function will return an "allowed" status in the 8031 carry flag indicating that the serial link code can copy a Debug D-packet from the host into the Debug Receive Buffer using the "Write Debug D-packet" API function.
Output
  Carry Flag=1 (Write to Debug Receive Buffer is allowed)
  Carry Flag=0 (Write to Debug Receive Buffer is not allowed)

9. Query Write Target System D-packet Allowed
Description
  This function is used by the serial link level code to determine whether the Target System Receive Buffer is available in the communication API for a Target System D-packet from the PC Host 10. If the Target System Receive Buffer is available, this function will return an "Allowed" response to the caller.
Input
  None
Function
  This API procedure will query the Target System Receive Buffer available ("TS_RXB_AVAIL") flag. If "TS_RXB_AVAIL" is true, this implies that the target system code 40 has not yet issued the "Get Target System D-packet" API call to free the Target System Receive Buffer. As a result, this procedure will return a "not allowed" status in the 8031 carry flag. If "TS_RXB_AVAIL" is false, this function will return an "allowed" status in the 8031 carry flag indicating that the serial link code can copy a Target System D-packet from the host into the Target System Receive Buffer using the "Write Target System D-packet" API function.
Output
  Carry Flag=1 (Write to Target System Receive Buffer allowed)
  Carry Flag=0 (Write to Target System Receive Buffer not allowed)

10. Write Debug D-packet
Description
  This function is used by the serial link level code to write a Debug D-packet into the Debug Receive Buffer in the communication API. This function can only be performed if the "Query Write Debug D-packet Allowed" function returns an "allowed" response. The caller of this function must first push a 2 byte pointer to the message to be copied to the Debug Receive Buffer and a 2 byte length of the message.
Input
  2 byte pointer to the message to be copied into the Debug Receive Buffer. This pointer is located at SP-3. The message will consist of the Debug Switch field, $Length_{Data}$ low and high bytes, and the Data field.
  2 byte length of the message to be copied to the Debug Receive Buffer. This length is located at SP-5 and is the $Length_{Message}$ bytes contained in the D-packet received from the host.
Function
  The input length parameter of the D-packet to be copied into the Debug Receive Buffer is first compared to the size of the Debug Receive Buffer. If the input length parameter is larger than the size of the Debug Receive Buffer, the Carry flag is set and the API function returns to the caller. The serial link code should then send a "Poll Ack Debug Write Failure" response to the host. If the length parameter is less than or equal to the size of the Debug Receive Buffer, the Debug D-packet from the PC Host 10 pointed to by the input pointer parameter is copied to the Debug Receive Buffer. The Debug Receive Buffer will contain the Debug Switch Field (offset 0), $Length_{Data}$ low byte (offset 1), $Length_{Data}$ high byte (offset 2), and the Data field (offset 3). The Link Control Byte, the $Length_{Message}$ low and high bytes, and the CRC byte are not copied to the Debug Receive Buffer. The Debug Receive Buffer Available ("DBUG_RXB_AVAIL") flag is set and the carry flag is cleared before returning to the caller.

Output
  Carry Flag=1 (Write to Debug Receive Buffer failed. D-packet too large.)
  Carry Flag=0 (Write to Debug Receive Buffer successful)

11. Write Target System D-packet
  Description
    This function is used by the serial link level code to write a Target System D-packet into the Target System Receive buffer in the communication API. This function can only be performed if the "Query Write Target System D-packet Allowed" function returns an "allowed" response. The caller of this function must first push a 2 byte pointer to the message to be copied to the Target System Receive Buffer and a 2 byte length of the message.
  Input
    2 byte pointer to the message to be copied into the Target System Receive Buffer. This pointer is located at SP-3. The message will consist of the Debug Switch field, $Length_{Data}$ low and high bytes, and the Data field.
    2 byte length of the message to be copied to the Target System Receive Buffer. This length is located at SP-5 and is the $Length_{Message}$ bytes contained in the D-packet received from the host.
  Function
    The input length parameter of the D-packet to be copied into the Target System Receive Buffer is first compared to the size of the Target System Receive Buffer. If the input length parameter is larger than the size of the Target System Receive Buffer, the Carry flag is set and the API function returns to the caller. The serial link code should then send a "Poll Ack Target System Write Failure" response to the host. If the length parameter is less than or equal to the size of the Target System Receive Buffer, the Target System D-packet from the PC Host 10 pointed to by the input pointer parameter is copied to the Target System Receive Buffer. The Target System Receive Buffer will contain the Debug Switch Field (offset 0), $Length_{Data}$ low byte (offset 1), $Length_{Data}$ high byte (offset 2), and the Data field (offset 3). The Link Control Byte, CRC, and the $Length_{Message}$ low and high bytes will have already been removed by the serial link level code prior to this API function call. This function sets the Target System Receive Buffer Available ("TS_RXB_AVAIL") flag then clears the carry flag before returning to the caller.

Output
  Carry Flag=1 (Write to Target System Receive Buffer failed. D-packet too large.)
  Carry Flag=0 (Write to Target System Receive Buffer successful)

12. Query Read D-packet Available
  Description
    This function is used by the serial link level code to determine whether an D-packet is available for transmission to the PC Host 10. If either the Debug Transmit buffer or the Target System Transmit Buffer is full, this API function will return an "available" response.
  Input
    None
  Function
    This API procedure will query the Debug Transmit Buffer Full flag ("DBUG_TXB_FULL") and the Target System Transmit Buffer Full flag ("TS_TXB_FULL"). If either is TRUE, this function will return an "D-packet available for transmission" status in the 8031 carry flag.
  Output
    Carry Flag=1 (D-packet available for transmission to PC Host 10)
    Carry Flag=0 (D-packet not available for transmission to PC Host 10)

13. Read D-packet
  Description
    This function is used by the serial link level code to retrieve a D-packet in the communication API which is ready for transmission to the PC host. Prior to invoking this function, the caller must first have received a "D-packet Available for Transmission" response from the "Query Read D-packet Available" API function. A D-packet available for transmission may be either a Debug D-packet or a Target System D-packet. When calling this function, the caller must first push 2 bytes onto the stack in order to create a "hole" in the stack for the return pointer parameter.
  Input
    Any 2 bytes pushed onto the stack located at SP-3.
  Function
    This API procedure will first query the Debug Transmit Buffer Full ("DBUG_TXB_FULL") flag. If true, then (1) the D-packet in the Debug Transmit Buffer is copied to the Debug Transmit Holding Buffer, (2) the DBUG_TXB_FULL flag is reset, and (3) a pointer to the Debug Transmit Holding Buffer is returned to the caller. If false, this API procedure will query the Target System Transmit Buffer Full ("TS_TXB_FULL") flag. If this flag is true, then (1) the D-packet in the Target System Transmit Buffer is copied to the Target System Transmit Holding Buffer, (2) the TS_TXB_FULL flag is reset, and (3) a pointer to the Target System Transmit Holding Buffer is returned to the caller. If both the Debug Transmit Buffer Full flag and the Target System Transmit Buffer Full flag are false, the pointer returned to the caller via the stack will be invalid.
  Output
    A 2 byte pointer to a D-packet to be transmitted to the PC Host 10.

Possible PC Host command D-packets include:
1. Target System Code Download
   If an initial program download is in progress, this command informs the Downloader routine to load a section of target system object code at the address specified in the D-packet with the program bytes or data specified in the D-packet. If the target system code is already in progress, this command informs the debugger to patch a section of target system code at the address specified in the D-packet, with new program bytes or data bytes specified in the D-packet.
2. Debug Parameter Table Update Command
   This command from the PC Host 10 informs the debugger to update the Debug Parameter Table with the new data contained in the D-packet.
3. Forced Break Command
   This D-packet contains a DPT record to be used to replace the current active Debug Parameter Table (DPT) record in the debugger. This new active DPT record has the Break (B) boolean flag set true and the "pc" field set to "don't care". "Don't care" will be defined as 0000h. This is not to be confused with the Debug Parameter Table's table terminator. This command causes the debugger to create and append a trace record on top of the chain of trace records for the current program address in the target system 20 that was interrupted.
   The current trace record is then transmitted to the PC Host 10.
4. Continue Command
   This command from the PC Host 10 informs the debugger to return to the routine which was interrupted by INT0. If a breakpoint or single step point has occurred, this is the only command that causes a return to the routine that was interrupted by INT0.
5. Register Modification Command
   This command from the PC Host 10 informs the debugger to modify the 8031 registers with new values as specified in the D-packet. The SBUF register cannot be modified. Other registers tied to the serial port operation can be modified with extreme caution. For example if timer 1 is being used to generate baud rates, the only bits that can be altered in the TMOD register are bits 0 through 3, corresponding to timer 0 mode control. Likewise, the bits associated with timer 1 control in the TCON register should be avoided.
6. Restart Command
   This command from the PC Host 10 informs the debugger to first clear the interrupt priority in-progress flip flop within the 8031 hardware for both the high and low interrupt priority levels. This is accomplished by performing the following code sequence twice: push the address of an instruction following a RETI (return from interrupt) instruction onto the stack then performing the RETI to the instruction following the RETI. Doing this sequence twice will free the microcontroller of any interrupt lock-outs, begin code execution at the entry point of the downloaded target system code just as if the Bootstrap ROM 30 where branching to it.
7. Reboot Command
   This command from the PC Host 10 informs the debugger to first clear the interrupt priority in-process flip-flops within the 8031 hardware for both the high and low interrupt priority levels, then, branch to the POR interrupt vector at program address 0000h, just as if a hardware power on reset occurred.
8. Enable Debugger Command
   This command from the PC Host 10 causes the Enable Debugger (ED) jump vector to be called by the serial interrupt handler. The ED routine activates the -Enable Debugger signal and returns to the serial interrupt handler. This is the only exception where the serial link interface takes specific action other than placing the debug D-packet into the debug buffer within the communication API. This is necessary because simply unmasking INT0 as with all other debug D-packets received from the PC Host 10 if the Debugger routine is not in progress, will not result in an INT0 interrupt if the -Enable Debugger signal is deactivated. The serial interrupt handler then puts the D-packet in the debug buffer within the communication API, unmasks INT0 if the Debugger routine is not in progress, and returns from interrupt. An INT0 interrupt will occur and the INT0 reentrant routine will query and read the debugger D-packet from the communication API. The Disable Debugger flag in the present invention Work Area in RAM will be reset and an "acknowledge" D-packet will be put to the communication API for transmission to the PC Host 10.
9. Disable Debugger Command
   The Disable Debugger D-packet causes the Disable Debugger (DD) jump vector to be called. The DD routine deactivates the -Enable Debugger signal and leaves the INT0 mask bit unchanged. A flag is also set in the present invention Work Area in RAM so that if the target system 20 has INT0 unmasked, an INT0 caused by the target system hardware will result in only the target system's hooked INT0 routine to execute and not the debugger routine.

Possible synchronous status D-packets include:
1. Acknowledge
   This D-packet is sent to the PC Host 10 in response to:
   Target System Code Download
   Debug Parameter Table Update Command
   Continue Command
   Register Modification Command
   Restart Command
   Reboot Command
   Enable Debugger Command
   Disable Debugger Command
2. Current Trace Table Record
   This D-packet is sent to the PC Host 10 in response to:
   Forced Break Command
3. Negative Acknowledge
   This D-packet is sent to the PC Host 10 in response to D-packets received from the PC Host 10 that have passed Cyclic Redundancy Check and parity check tests at the communications link level but have an error within the message protocol such as an invalid length field or an unrecognizable command.
4. Trace Error
   This D-packet is sent to the PC Host 10 in response to a Forced Break command if the record to be traced is greater than one half the size of the trace table defined by the formula "0.5(EOT-BOT)".

Possible asynchronous status D-packets include:
1. Complete Trace Table Record
   This D-packet is sent to the PC Host 10 when all conditions below are met:
   A match is found between the program counter at the top of the stack upon entry into the INT0 Interrupt Handler and a program counter field in a Debug Parameter Table record.
   Within this new active DPT record, the Break (B) boolean flag is set TRUE. The Trace (T) and Singlestep (S) boolean flags may be either TRUE or FALSE (i.e. T and S="don't care").
2. Current Trace Table Record
   This D-packet is sent to the PC Host 10 when all conditions below are met:
   A match is found between the program counter at the top of the stack upon entry into the INT0 Interrupt Handler and a program counter field in a Debug Parameter Table record.
   Within this new active DPT record, the Singlestep (S) boolean flag is set TRUE and the Break (B) boolean flag is set FALSE. The Trace (T) boolean flag may be either TRUE or FALSE (i.e. T="don't care"). If the Break (B) boolean flag is TRUE, the Complete Trace Table Record D-packet, is sent to the PC Host 10.
3. Trace Error
   This D-packet is sent to the PC Host 10 if the record to be traced is greater than one half the size of the trace table defined by the formula "0.5(EOT-BOT)".

If an asynchronous D-packet response is sent to the host, the host may send a sequence of commands back to the present invention debugger. The final command in the sequence must be a Continue command, Restart command, or Reboot command.

Figure 8:
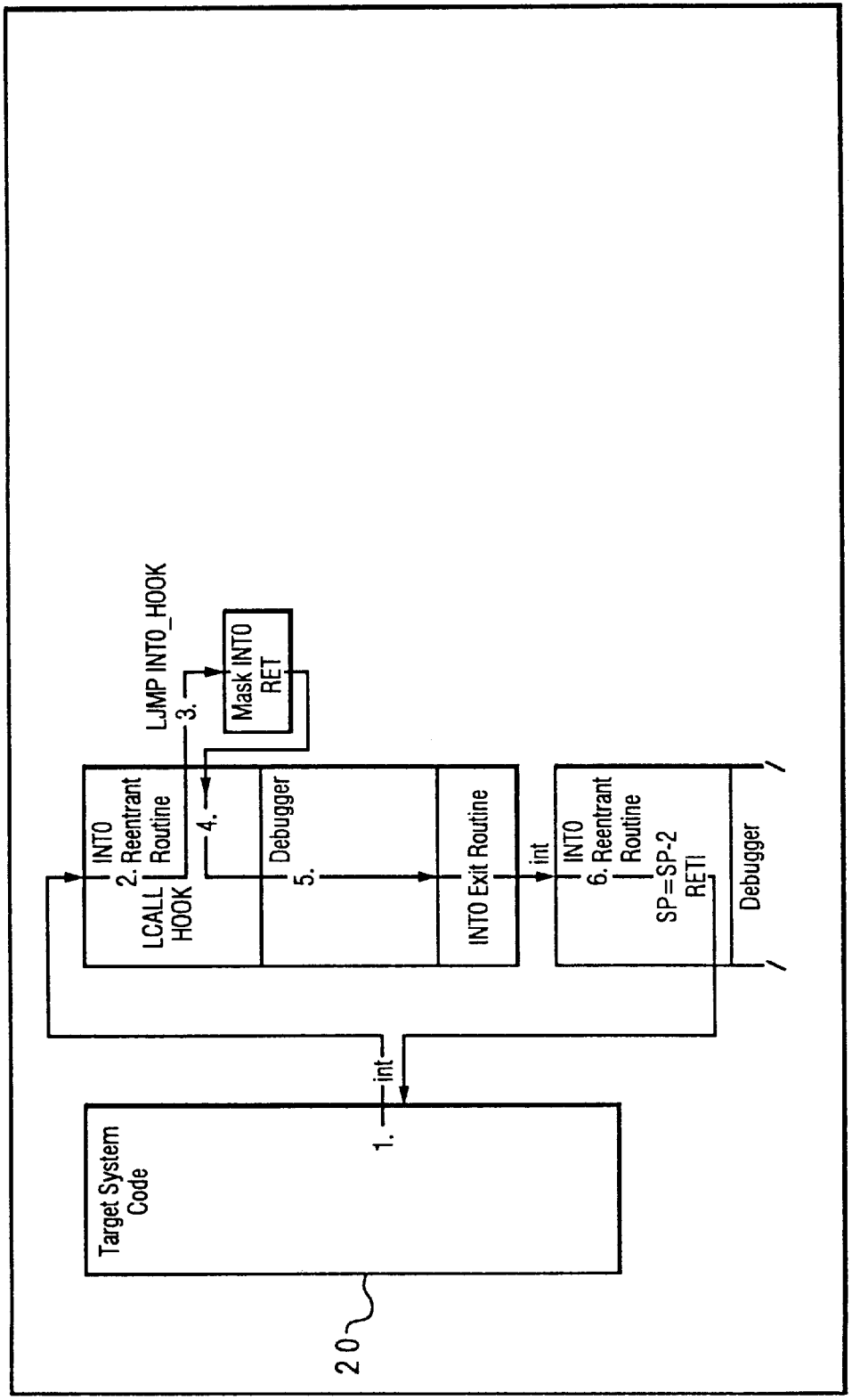
FIG. 8 is a code flow diagram depicting a debugpoint being executed on the Target system code.

One typical scenario of INT0 reentry occurs when the debugger interrupts the target system 20 background routine or lower level interrupt handler routine as shown in FIG. 8. Reentry occurs after the INT0 Exit Routine completes. As shown, the Reentry Routine transfers program execution to the target system 20. Referring now to FIG. 8, the execution flow proceeds as follows:
1. Interrupt out of target system 20.
2. Mask off INT0, set "Hooked" flag, reenable the current interrupt priority by getting off current interrupt level with a return from interrupt instruction, RETI, to the next instruction in the INT0 handler following the RETI, then call the INT0 Hook Interrupt Jump Vector.
3. Since the target system 20 did not hook to this interrupt jump vector, the default ROM INT0 Hook routine executes and returns to the Reentrant Routine.
4. Clear "Hooked" flag, then start the Debugger routine.
5. Perform debug operation, if any, on the target system 20 at debugpoint 1, as directed by the active Debug Parameter Table record. If a singlestep point or breakpoint occurred, send an asynchronous response to the PC Host 10 via the communication API using the "Put Debug D-packet" API function. Branch to the Exit Routine. The INT0 Exit Routine unmasks INT0 thereby permitting another INT0 interrupt to occur.
6. The INT0 Reentry Routine decrements the stack pointer by 2 so that the return from interrupt instruction, RETI, returns to the target system 20 at point 1 and not to the INT0 Exit Routine.

Figure 9:
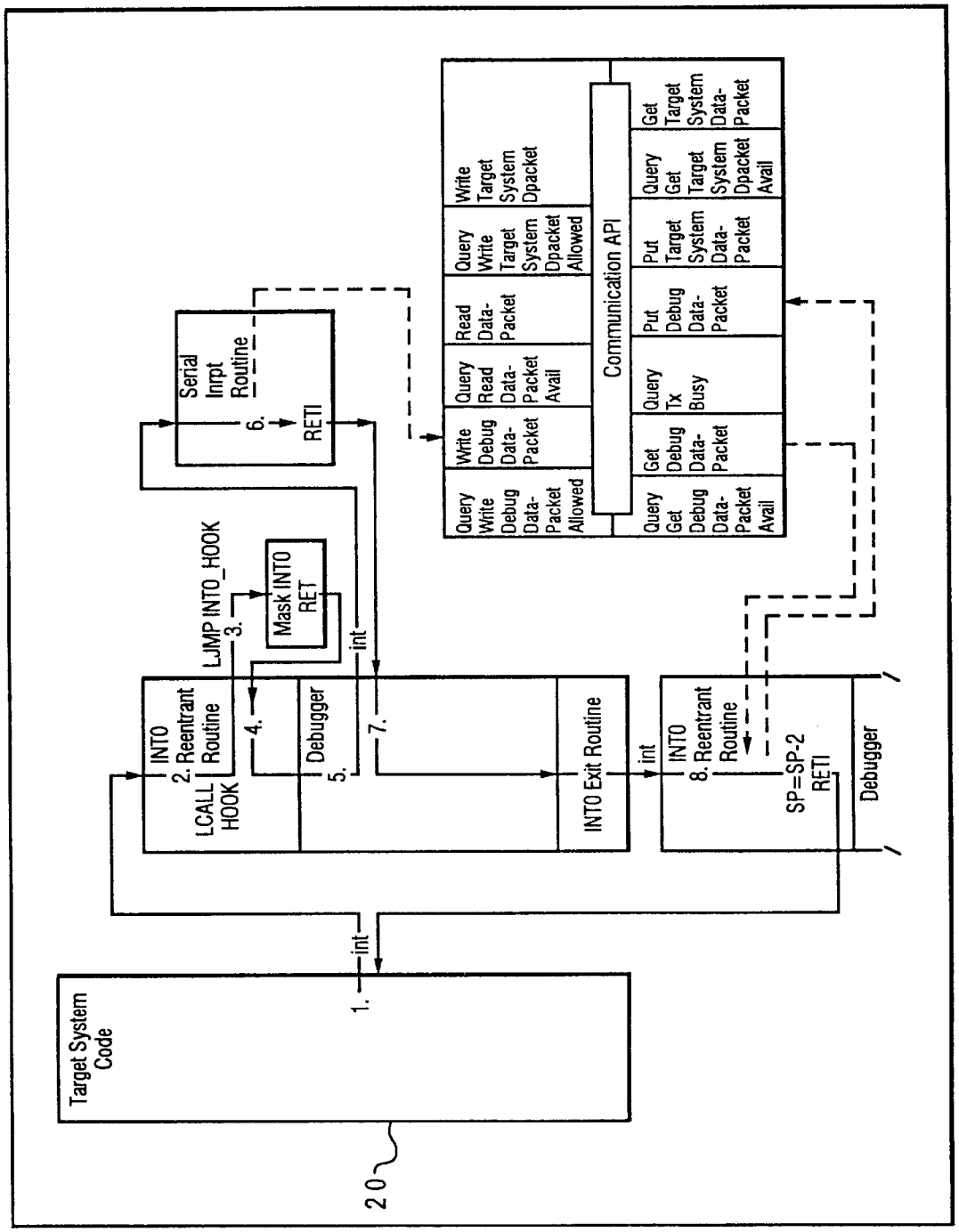
FIG. 9 is a code flow diagram depicting the target system code being interrupted by the INT0 Debugger, then subsequently interrupted by the serial link interrupt.

Another typical interrupt scenario of INT0 reentry occurs when the target system 20 background routine or lower level interrupt handler routine is interrupted by the INT0 debugger, then subsequently interrupted by the serial link interrupt. Referring now to FIG. 9, the execution flow proceeds as follows:
1. Interrupt out of target system 20.
2. Mask off INT0, set "Hooked" flag, reenable the current interrupt priority, call the INT0 Hook Interrupt Jump Vector.
3. Since the target system 20 did not hook to this Interrupt Jump Vector, the default ROM INT0 Hook routine executes and returns to the Reentrant Routine.
4. Clear "Hooked" flag, then start the Debugger routine.
5. Start performing debug operation, if any, on the target system 20 at debugpoint 1, as directed by the active Debug Parameter Table record.
6. A D-packet is received from the PC Host 10 for the debugger. When the debug switch indicates that the D-packet is owned by the debugger, the serial interrupt routine stores the D-packet into the communication API with a "Write Debug D-packet" request and returns from interrupt (RETI).
7. Finish performing debug operation, if any, on the target system at debugpoint 1, as directed by the active Debug Parameter Table record. If a singlestep point or breakpoint occurred, send an asynchronous response to the PC Host 10 via the communication API using the "Put Debug D-packet" API function. Branch to the Exit Routine. The INT0 Exit Routine unmasks INT0, thereby permitting another INT0 interrupt to occur.
8. The reentrant portion of INT0 performs a query of the communication API, sees Debugger D-packet available, reads the D-packet with a "Get Debug D-packet" request to the API, takes appropriate action on the D-packet, then sends a synchronous response to the API using the "Put Debug D-packet" function. The INT0 Reentry Routine decrements the stack pointer by 2 so that the return from interrupt instruction, RETI, returns to the target system 20 at debugpoint 1 and not to the INT0 Exit Routine.

Figure 10:
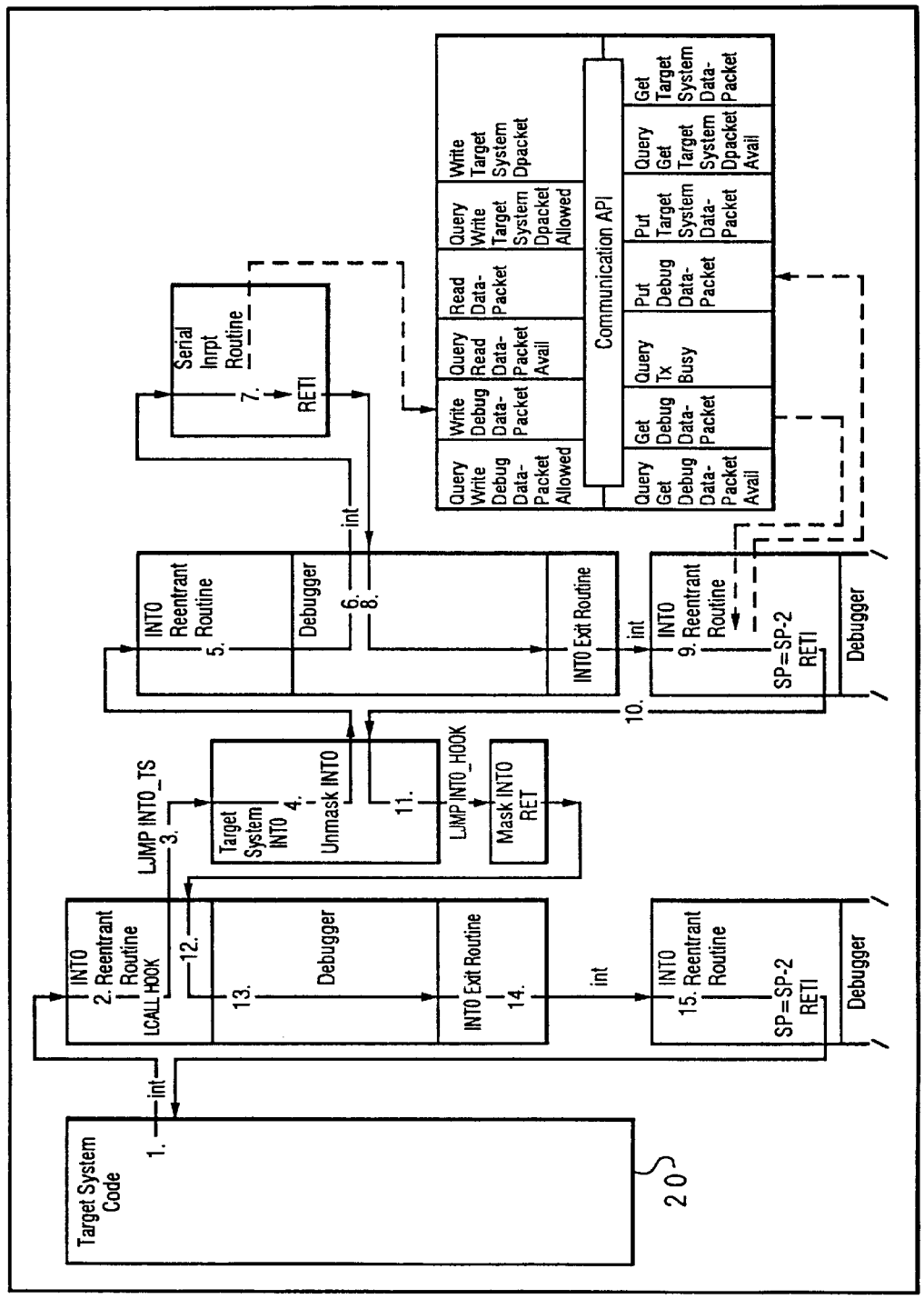
FIG. 10 is a code flow diagram depicting a serial interrupt occurring during the process of executing a debugpoint in the target system's INT0 handler, then subsequently executing a debugpoint in the target system's code when the target system's INT0 handler completes.

A more complex interrupt scenario occurs when the PC Host Application sends a D-packet to the present invention Debugger while in the process of debugging the target system's INT0 handler. Referring now to FIG. 10, the execution flow proceeds as follows:
1. Interrupt out of target system 20.
2. Mask off INT0, set "Hooked" flag, reenable the current interrupt priority, call the INT0 Hook Interrupt Jump Vector.
3. Since the target system 20 has hooked to the INT0 Hook Interrupt Jump Vector, the code branches to the target system's INT0 handler.
4. The target system's INT0 handler unmasks INT0 to enable the debugger. Unmasking INT0 causes an immediate reentry into the INT0 Handler.
5. Since the "Hooked" flag is set, the Reentrant Routine branches to the debugger routine without performing a call to HOOK as was done in step 2.
6. Start performing the debug operation, if any, on the target system's INT0 handler code as directed by the active Debug Parameter Table record. The debugger has serial interrupts enabled and a serial interrupt occurs.
7. An D-packet is received from the PC Host 10 for the debugger. If the debug switch indicates that the D-packet is owned by the debugger, the serial interrupt routine stores the D-packet into the communication API with a "Write Debug D-packet" request and executes a return from interrupt instruction (RETI) back to the debugger routine.

8. The debugger finishes performing the debug operation on the target system's INT0 handler code as directed by the active Debug Parameter Table record. If a singlestep point or breakpoint occurred, send an asynchronous response to the PC Host 10 via the communication API using the "Put Debug D-packet" API function. Branch to the Exit Routine. The INT0 Exit Routine unmasks INT0, thereby permitting another INT0 interrupt to occur.

9. The reentrant portion of INT0 performs a query of the communication API, sees Debugger D-packet available, reads the D-packet with a "Get Debug D-packet" request to the API, takes appropriate action on the D-packet, then sends a synchronous response to the API using the "Put Debug D-packet" function. The INT0 Reentry Routine decrements the stack pointer by 2 so that the return from interrupt instruction, RETI, returns to the target system INT0 handler and not to the INT0 Exit Routine.

10. Control is returned to the target system INT0 handler.

11. When the target system INT0 is complete, control is transferred to the default ROM INT0 Hook routine which masks off INT0, and returns to the INT0 handler.

12. Clear "Hooked" flag.

13. Perform debug operation, if any, on the target system 20 at point 1, as directed by the active Debug Parameter Table record. If a singlestep point or breakpoint occurred, send an asynchronous response to the PC Host 10 via the communication API using the "Put Debug D-packet" API function. Branch to the Exit Routine.

14. The INT0 Exit Routine unmasks INT0, thereby permitting another INT0 interrupt to occur.

15. The INT0 Reentry Routine decrements the stack pointer by 2 so that the return from interrupt instruction (RETI), returns to the target system Background Code at step 1, and not to the INT0 Exit Routine at step 14.

Figure 11:
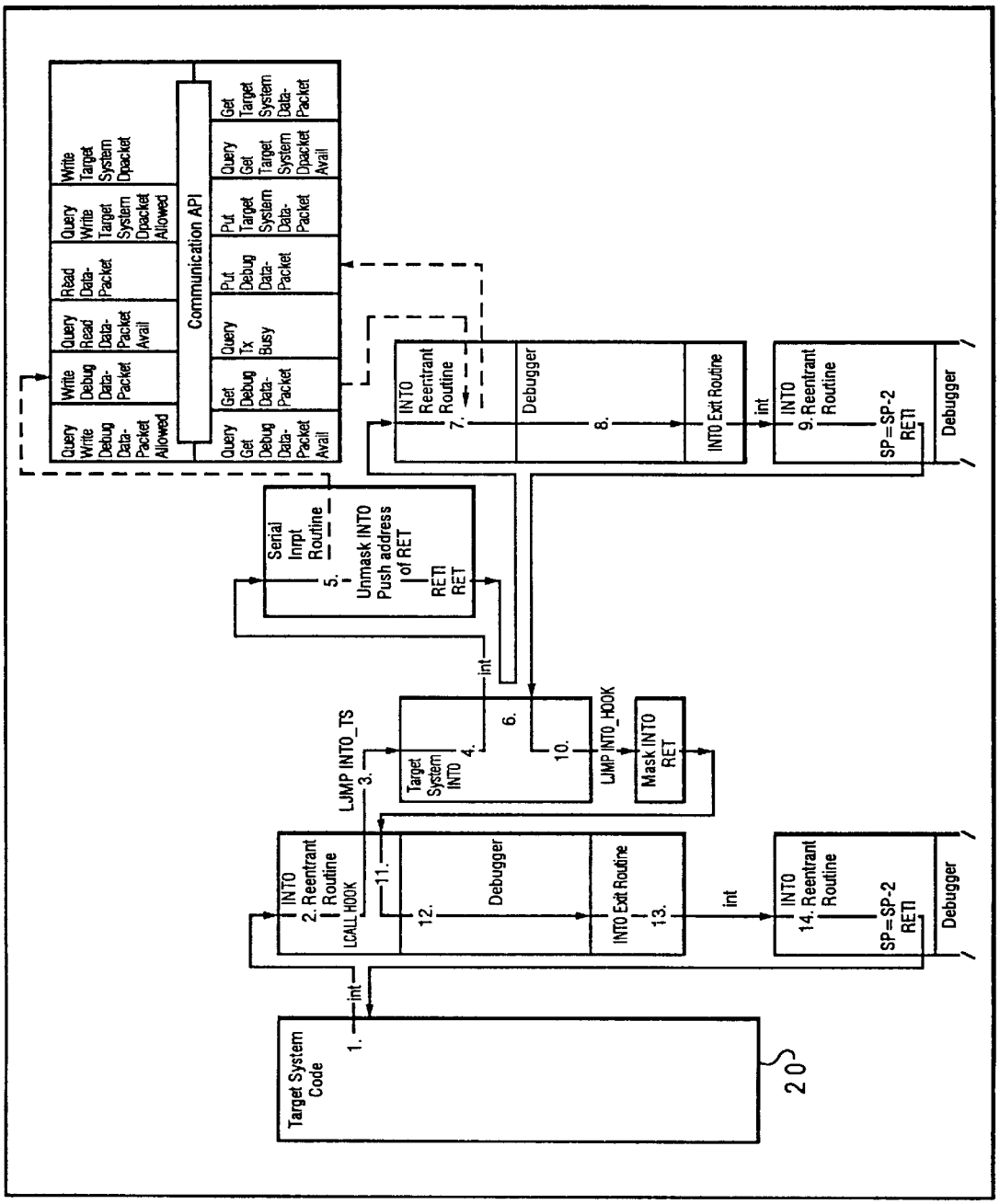
FIG. 11 is a code flow diagram depicting a serial interrupt occurring during the process of executing the target system's INT0 handler. An INT0 reentry follows serial interrupt completion. Subsequently, a debugpoint is executed in the target system's code, when the target system's INT0 handler completes.

Still another complex interrupt scenario occurs when the PC Host Application sends a D-packet to the present invention Debugger while in the process of executing the target system's INT0 handler with INT0 masked off. This is in contrast to the previous scenario in which the target system's INT0 handler executes with INT0 unmasked. In the current scenario, the serial interrupt routine unmasks INT0, thereby causing an INT0 reentry to occur after the serial interrupt handler is complete. Referring now to FIG. 11, the execution flow proceeds as follows:

1. Interrupt out of target system 20.
2. Mask off INT0, set "Hooked" flag, reenable the current interrupt priority, call the INT0 Hook Interrupt Jump Vector.
3. Since the target system 20 has hooked to the INT0 Hook Interrupt Jump Vector, the code branches to the target system's INT0 handler.
4. The target system's INT0 handler leaves INT0 masked off. A serial interrupt occurs.
5. An D-packet is received from the PC Host 10 for the debugger.

If the debug switch indicates that the D-packet is owned by the debugger, the serial interrupt routine stores the D-packet into the communication API with a "Write Debug D-packet" request and unmasks INT0 so that an INT0 interrupt can be reentered to "Get" the Debug D-packet from the API, with a "Get Debug D-packet" request, after the serial interrupt routine is complete. The serial interrupt routine returns back to the target system's INT0 handler using a technique that guarantees that not one instruction in the target system's INT0 handler will be executed.

6. No instruction is executed in the target system's INT0 handler before INT0 is reentered.

7. The INT0 Reentrant Routine gets the Debug D-packet via a "Get Debug D-packet" request to the communication API, takes appropriate action upon the D-packet, then sends a synchronous response to the API with a "Put Debug D-packet" request. Since the "Hooked" flag is set, the Reentrant Routine branches to the debugger routine without performing a call to HOOK as was done in step 2.

8. The Debugger routine bypasses its algorithm since the target system's INT0 handler had INT0 masked off. Branch to the Exit Routine. The INT0 Exit Routine unmasks INT0 thereby permitting another INT0 interrupt to occur.

9. The reentrant portion of INT0 performs a query of the communication API, sees Debug D-packet not available, decrements the stack pointer by 2 so that the return from interrupt instruction, RETI, returns to the target system INT0 handler and not to the INT0 Exit Routine. INT0 is restored to the masked off state as it was just prior to reception of the Debug D-packet from the PC Host 10 in step 5.

10. When the target system INT0 is complete, control is transferred to the default ROM INT0 Hook routine and returns to the INT0 Reentrant Routine which originally was invoked from the interrupt out of the target system 20 at step 1.

11. Clear "Hooked" flag.

12. Perform debug operation, if any, on the target system 20 at point 1, as directed by the active Debug Parameter Table record, then branch to the Exit Routine.

13. The INT0 Exit Routine unmasks INT0, thereby permitting another INT0 interrupt to occur.

14. The INT0 Reentry Routine decrements the stack pointer by 2 so that the return from interrupt instruction (RETI), returns to the target system Background Code at step 1, and not to the INT0 Exit Routine.

Programs running on the PC Host 10 in the preferred embodiment include a PC Host Debugger Application program, a PC Host Communication API, and a PC Serial Link Interrupt Handler. The PC Serial Link Interrupt Handler would support the present invention communication protocol. The PC Host Communication API would have functions identical to the those specified in the present invention communication API. The PC Host Debugger Application would have a user friendly screen which displayed registers, disassembled code which was executed up to breakpoints and single step points using the data provided in the trace records from the present invention Debugger.

While the invention has been particularly shown and described with reference to a preferred embodiment, it will be understood by those skilled in the art that various changes in form and detail may be made therein without departing from the spirit and scope of the invention.

What is claimed is:

1. A remote program monitor system using a system-under-test microcontroller for self-debug, said remote program monitor system comprising:

a host computer;

a system-under-test (SUT) that includes a read-only memory (ROM) and a microcontroller for executing a program under test, the microcontroller having an interrupt input, wherein one or more enable debugger signals received at the interrupt input causes the microcontroller to execute a debugger program contained in the ROM, said debugger program monitoring execution by the microcontroller of instructions within said program under test and selectively performing a debug operation in response to execution of a selected instruction in said program under test, and wherein one or more other enable debugger and disable debugger signals limit the debut functions of the debugger program such that interference with the real-time operation of the program under test is minimized; and a standard serial connection between the host computer and the SUT.

2. A system according to claim 1, wherein the serial connection transmits a disable debugger command to the debugger program to issue a disable debugger signal to an interrupt input of the microcontroller, wherein the microcontroller cancels execution of the debugger program to allow real-time target system operation to commence when a disable debugger signal is received on the interrupt input.

3. A system according to claim 1, wherein the serial connection transmits the program under test from the host computer to the SUT.

4. A system according to claim 1, wherein the host computer includes a debugger application that executes within the host computer and interacts with the debugger program to perform monitoring and debugging functions.

5. A system according to claim 1, wherein a packet of data transmitted over the serial connection to the SUT includes a field indicating whether the packet is directed to the debugger program or a program under test being executed by the SUT.

6. A system according to claim 1, wherein the SUT further comprises a memory for storing the program under test.

7. A system according to claim 1, wherein one or more debugger signals are strategically issued at key locations within the program under test to monitor portions of the program under test suspected of containing errors, thereby allowing full real-time operation of the remainder of the program under test.

8. A system according to claim 1, wherein one or more debugger commands transmitted by the host invoke the debugger program to issue enable debugger and disable debugger signals.

9. A system according to claim 1, wherein debug operations that can be performed by said debugger program include halting execution of said program under test by said microcontroller at a selected breakpoint.

10. A method of remote program monitoring using a system-under-test microcontroller for self-debug, said method comprising:

receiving one or more debugger signals as an interrupt input to a system-under-test (SUT) that includes a read-only memory (ROM) and a microcontroller for executing a program under test;

in response to receipt of said one or more debugger signals, executing a debugger program contained in the ROM utilizing said microcontroller, wherein the debugger program monitors execution by the microcontroller of instructions within said program under test and selectively performs a debug operation in response to execution of a selected instruction in said program under test; and in response to one or more other enable debugger and disable dubugger signal, limited the debug functions of the debugger program such that interference with the real-time operation of the program under test is minimized.

11. A method according to claim 10, further comprising the step of canceling execution of the debugger program to allow real-time target system operation to commence when a disable debugger signal is received.

12. A method according to claim 10, further comprising the step of transmitting the program under test from a host computer to the SUT over a serial connection.

13. A method according to claim 10, wherein a host computer includes a debugger application that executes within the host computer and interacts with the debugger program to perform monitoring and debugging functions.

14. A method according to claim 10, wherein a packet of data transmitted over a serial connection between a host computer and the SUT includes a field indicating whether the packet is directed to the debugger program or a program under test being executed by the SUT.

15. A method according to claim 10, further comprising the step of storing the program under test in a memory in the SUT.

16. A method according to claim 10, wherein one or more enable debugger and disable debugger signals are issued by the debugger program.

17. A method according to claim 10, wherein one or more enable debugger and disable debugger commands transmitted by a host computer invoke the debugger program to issue enable debugger and disable debugger signals.

18. A method according to claim 10, wherein selectively performing a debug operation can comprise halting execution of said program under test by said microcontroller at a selected breakpoint.

19. A program product for remote program monitoring using a system-under-test microcontroller for self-debug, said program product comprising:

a computer usable medium having instruction means embodied in the medium, the instruction means including:

instruction means for receiving one or more debugger signals as an interrupt input to a system-under-test (SUT) that includes a read-only memory (ROM) and a microcontroller for executing a program under test;

instruction means, responsive to receipt of said one or more debugger signals, for causing the microcontroller to execute a debugger program contained in the ROM, wherein the debugger program monitors execution by the microcontroller of instructions within said program under test and selectively performs a debug operation in response to execution of a selected instruction in said program under test; and instruction means, responsive to receipt of one or more other enable debugger and disable debugger signals, for causing the microcontroller To limit the debug functions of the debugger program such that interference with the real-time operation of the program under test is minimized.

20. A program product according to claim 19, further comprising instruction means for canceling execution of the debugger program to allow real-time target system operation to commence when a disable debugger signal is received.

21. A computer program product according to claim 19, further comprising instruction means for transmitting the program under test from a host computer to the SUT over a serial connection.

22. A program product according to claim 19, and further comprising a debugger application for execution within the host computer that interacts with the debugger program to perform monitoring and debugging functions.

23. A program product according to claim 19, wherein a packet of data transmitted over a serial connection between a host computer and the SUT includes a field indicating whether the packet is directed to the debugger program or a program under test being executed by the SUT.

24. A program product according to claim 19, further comprising instruction means for storing the program under test in a memory in the SUT.

25. A program product according to claim 19, wherein one or more enable debugger and disable debugger signals are issued by the debugger program.

26. A program product according to claim 19, wherein one or more enable debugger and disable debugger commands transmitted by a host computer invoke the debugger program to issue enable debugger and disable debugger signals.

27. A program product according to claim 19, wherein selectively performing a debug operation can comprise halting execution of said program under test by said microcontroller at a selected breakpoint.

* * * * *

UNITED STATES PATENT AND TRADEMARK OFFICE
CERTIFICATE OF CORRECTION

PATENT NO. : 5,903,718
DATED : May 11, 1999
INVENTOR(S) : *Marik*

It is certified that error appears in the above-identified patent and that said Letters Patent is hereby corrected as shown below:

On the cover page of the patent, after the "U.S. PATENT DOCUMENTS" and following list of references, please add the following references:

| | | |
|---|---|---|
| 5,313,618 | 5/1994 | PAWLOSKI |
| 4,674,089 | 6/1987 | PORET ET AL. |
| 5,228,039 | 7/1993 | KNOKE ET AL. |
| 4,788,683 | 11/1988 | HESTER ET AL. |
| 5,127,103 | 6/1992 | HILL ET AL. |

FOREIGN PATENT DOCUMENTS

| | | |
|---|---|---|
| 0378242-A2 | 7/1990 | KUNIOKA |
| 582392-A1 | 2/1994 | |
| GB2256296-A | 12/1992 | |
| 391173-A | 10/1991 | |

PUBLICATIONS OR OTHER INFORMATION

IBM Technical Disclosure Bulletin, "Built-In Self-Test Architecture", Jaber et al., Vol. 32, No. 12, May, 1990, pgs. 448-451.

Journal Paper, "Debug RAM as a development tool. Aid to software development in real time systems", Habel, Vol. 42, No. 6, March, 1993, pgs. 102-103, 108, 110-112 and 114-115.

Journal Paper, " Debugging with advanced processors", Smith, Vol. 14, No. 2, February, 1993, pg. 36.

ISMM International Conference, "WonderBug, a step forward in ROM-resident debugging systems", Pheanis et al, Los Angeles, CA, December 1989

Fifth Annual Embedded Systems Conference, "Using on-chip emulation in DSP designs", Gonzales, D., Santa Clara, CA, October, 1993

UNITED STATES PATENT AND TRADEMARK OFFICE
CERTIFICATE OF CORRECTION

PATENT NO. : 5,903,718
DATED : May 11, 1999
INVENTOR(S) : Marik

It is certified that error appears in the above-identified patent and that said Letters Patent is hereby corrected as shown below:

Col. 15, line 38, please delete "800 h" and insert instead --800h--.

Col. 20, line 50, please delete "handier" and insert instead --handler-- .

Col. 26, line 20, please delete "81 0" and insert instead --810--.

Col. 30, line 6, please delete "Handier" and insert instead --Handler--.

Col. 45, line 13, please delete "debut" and insert instead --debug--.

Signed and Sealed this

Twelfth Day of December, 2000

Attest:

Q. TODD DICKINSON

*Attesting Officer*     *Director of Patents and Trademarks*